(12) United States Patent
Amada et al.

(10) Patent No.: US 7,706,040 B2
(45) Date of Patent: Apr. 27, 2010

(54) OPTICAL SCANNING APPARATUS, ILLUMINANT APPARATUS AND IMAGE FORMING APPARATUS

(75) Inventors: Taku Amada, Kanagawa (JP); Seizo Suzuki, Kanagawa (JP); Satoru Itoh, Kanagawa (JP); Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/971,227

(22) Filed: Jan. 9, 2008

(65) Prior Publication Data

US 2008/0117487 A1    May 22, 2008

Related U.S. Application Data

(62) Division of application No. 10/386,654, filed on Mar. 13, 2003, now Pat. No. 7,333,254.

(30) Foreign Application Priority Data

| Mar. 15, 2002 | (JP) | ............................. 2002-072656 |
| Sep. 2, 2002 | (JP) | ............................. 2002-256704 |
| Nov. 29, 2002 | (JP) | ............................. 2002-348581 |

(51) Int. Cl.
G02B 26/08 (2006.01)
(52) U.S. Cl. .................................. 359/204.1
(58) Field of Classification Search ................ 359/196, 359/204.1
See application file for complete search history.

(56) References Cited

U.S. PATENT DOCUMENTS

| 5,130,839 | A | | 7/1992 | Tomita |
| 5,493,326 | A | * | 2/1996 | Andrews et al. ............. 347/257 |
| 5,753,907 | A | * | 5/1998 | Nakajima et al. ............ 250/234 |
| 5,999,345 | A | | 12/1999 | Nakajima et al. |
| 6,108,501 | A | * | 8/2000 | Nagai .......................... 399/116 |
| 6,163,333 | A | | 12/2000 | Kamioka |
| 6,226,029 | B1 | | 5/2001 | Lannom |
| 6,236,040 | B1 | | 5/2001 | Takemura et al. |
| 2001/0035999 | A1 | | 11/2001 | Saito et al. |

FOREIGN PATENT DOCUMENTS

| JP | 63-132563 | 6/1988 |
| JP | 63-240533 | 10/1988 |
| JP | 01-146748 | 6/1989 |
| JP | 1-239520 | 9/1989 |
| JP | 05-216076 | 8/1993 |
| JP | 06-208142 | 7/1994 |
| JP | 6-331913 | 12/1994 |

(Continued)

*Primary Examiner*—Euncha P Cherry
(74) *Attorney, Agent, or Firm*—Oblon, Spivak, McClelland, Maier & Neustadt, L.L.P.

(57) ABSTRACT

An optical scanning apparatus scans a surface to be scanned in a main scanning direction by simultaneously using a plurality of optical spots formed of a plurality of optical beams emitted from an illuminant, comprising: a light path deflecting part deflecting a light path of at least one of the optical beams, wherein the light path deflecting part is provided in light paths of the optical beams wherein the light path deflecting part may use a liquid crystal deflecting element formed of a liquid crystal element being controllable by an electronic signal to deflect the light path of the one of the optical beams.

52 Claims, 30 Drawing Sheets

FOREIGN PATENT DOCUMENTS

| | | |
|---|---|---|
| JP | 7-181410 | 7/1995 |
| JP | 7-218856 | 8/1995 |
| JP | 8-313941 | 11/1996 |
| JP | 9-80331 | 3/1997 |
| JP | 09-096841 | 4/1997 |
| JP | 9-189873 | 7/1997 |
| JP | 9-297274 | 11/1997 |
| JP | 9-325288 | 12/1997 |
| JP | 10-62705 | 3/1998 |
| JP | 10-215351 | 8/1998 |
| JP | 10-239939 | 9/1998 |
| JP | 10-260368 | 9/1998 |
| JP | 10-282531 | 10/1998 |
| JP | 11-212006 | 8/1999 |
| JP | 11-271653 | 10/1999 |
| JP | 11-277793 | 10/1999 |
| JP | 2000-3110 | 1/2000 |
| JP | 2000-47214 | 2/2000 |
| JP | 2000-227563 | 8/2000 |
| JP | 2000-318211 | 11/2000 |
| JP | 2000-347125 | 12/2000 |
| JP | 2001-235696 | 8/2001 |
| JP | 2001-264657 | 9/2001 |
| JP | 2001-270148 | 10/2001 |
| JP | 2001-356285 | 12/2001 |
| JP | 2001-356314 | 12/2001 |
| JP | 2002-303807 | 10/2002 |
| JP | 2002-341270 | 11/2002 |

* cited by examiner

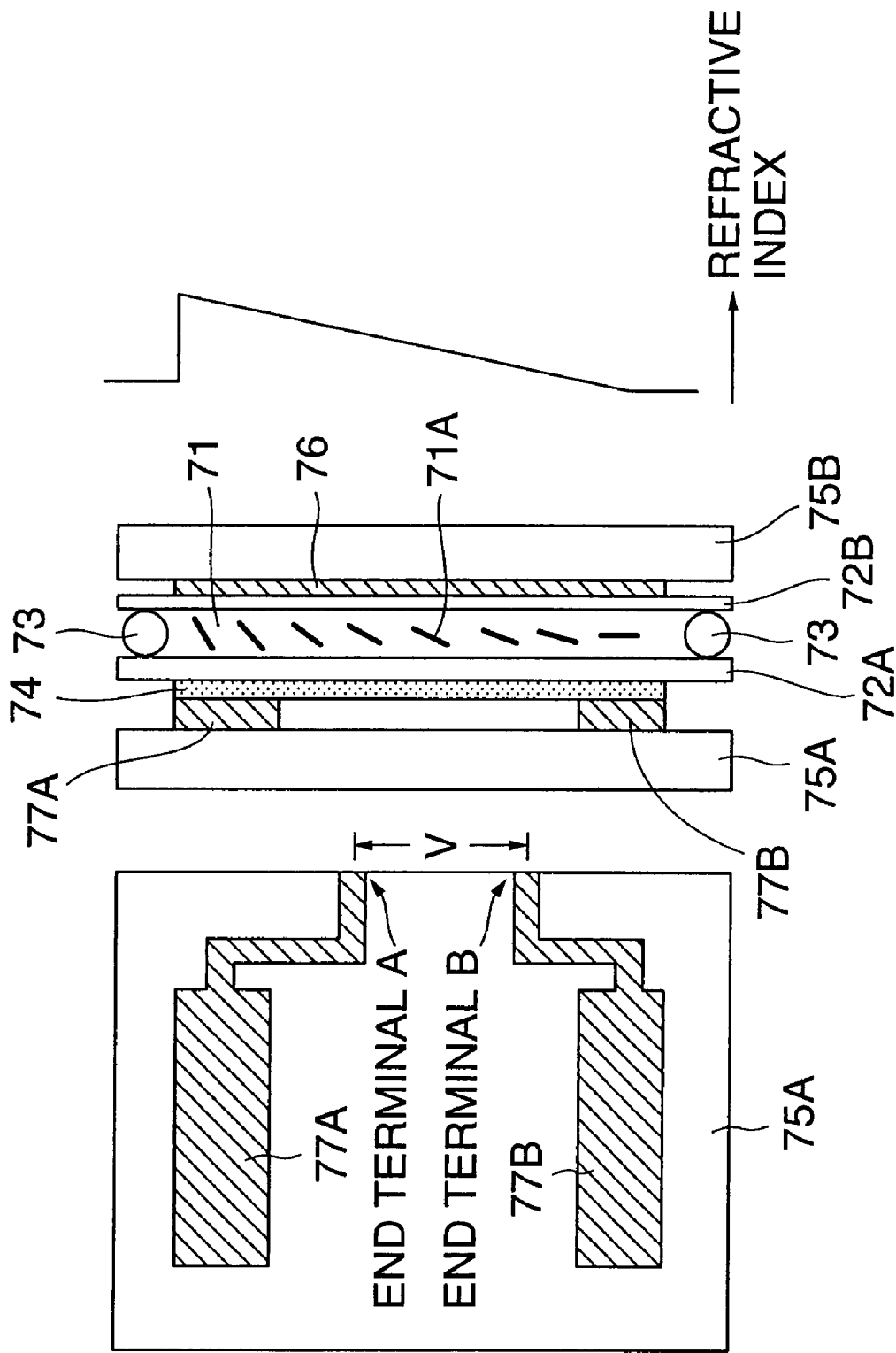

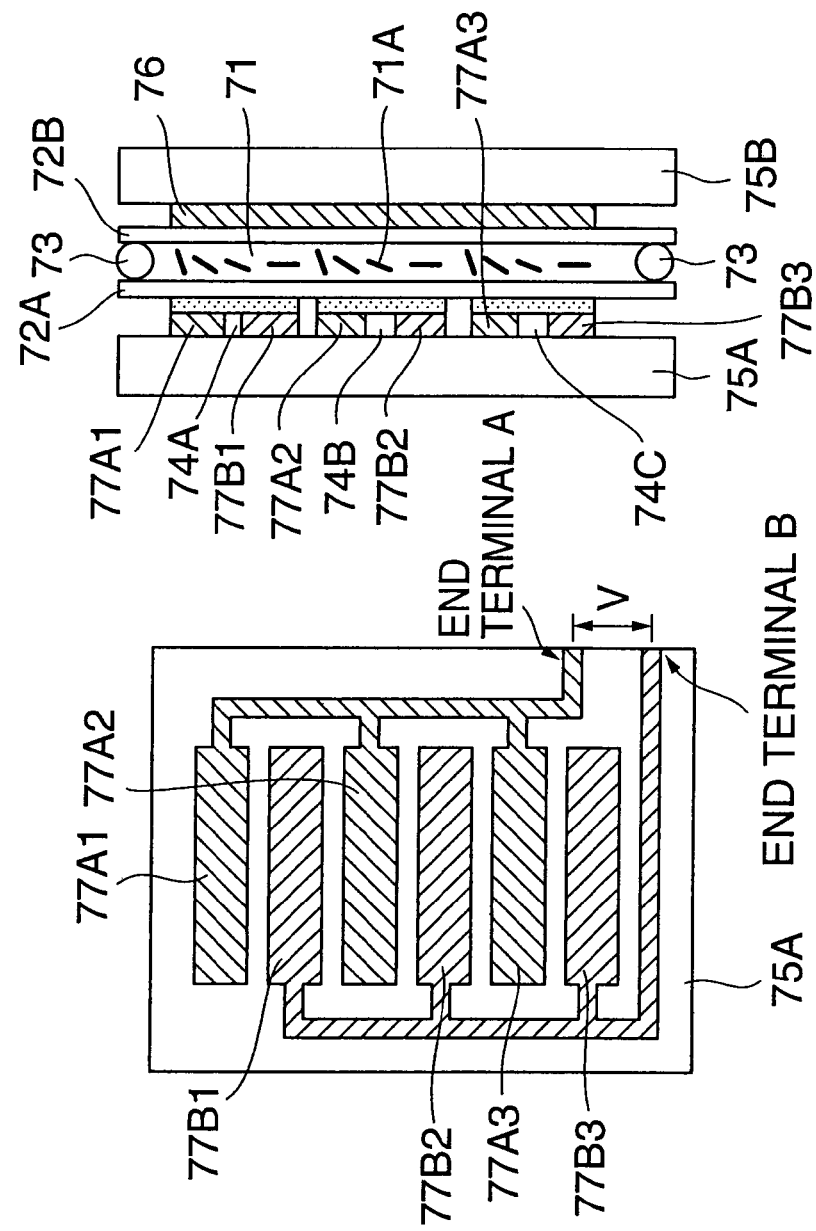

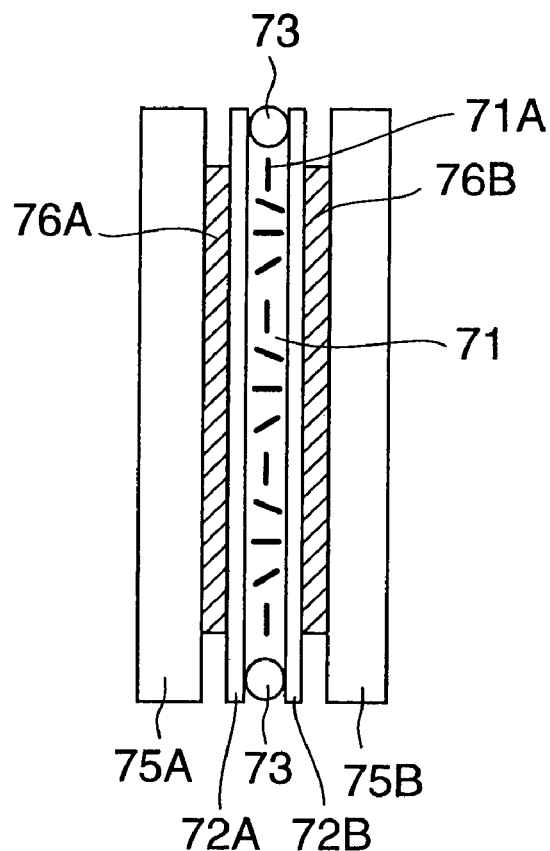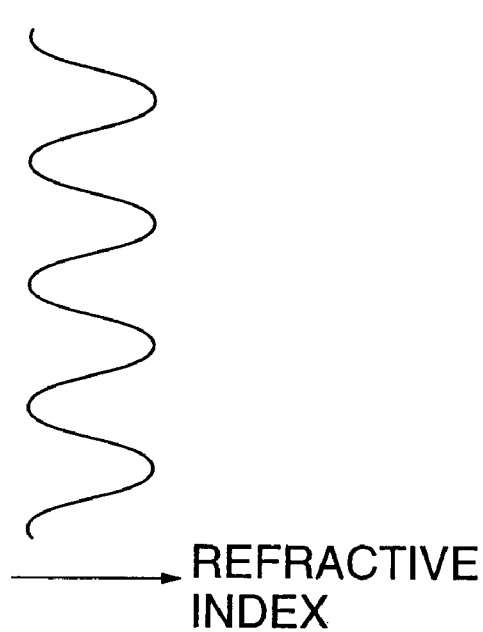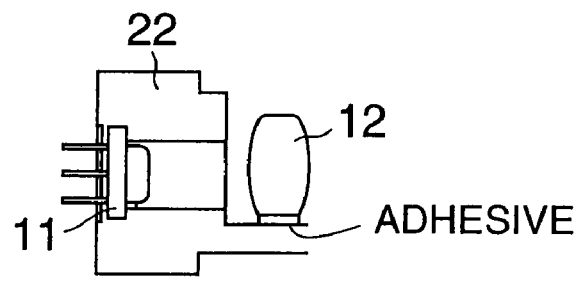

FIG. 22A
FIG. 22B
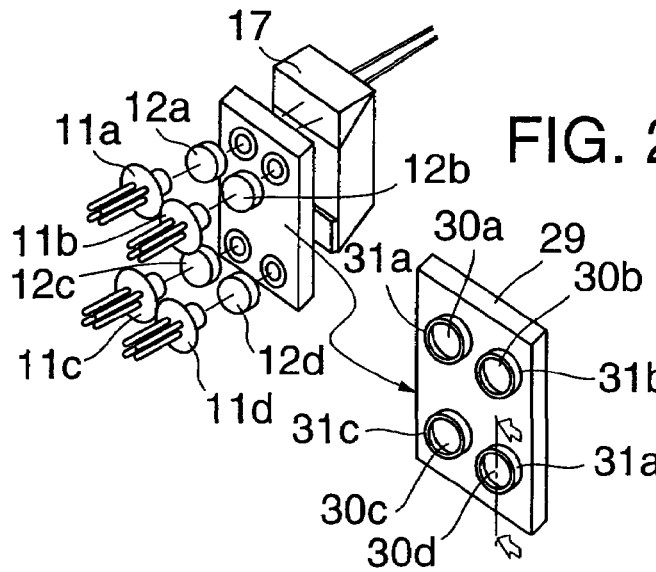
FIG. 23A
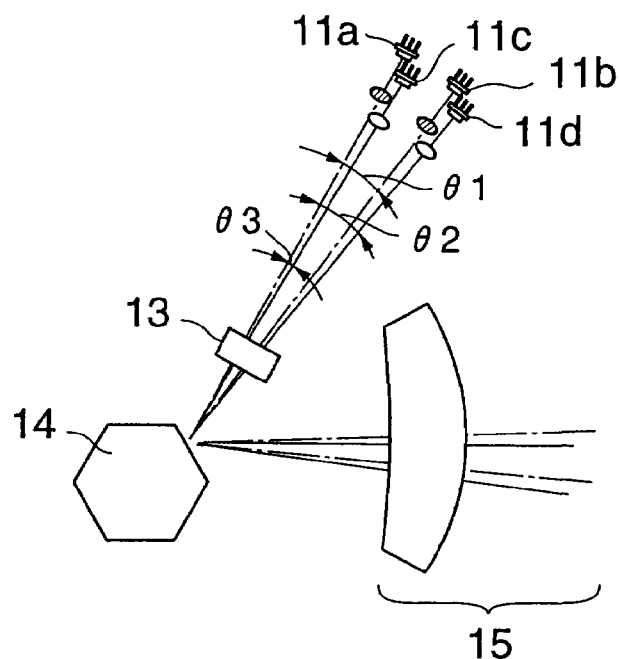
FIG. 23B
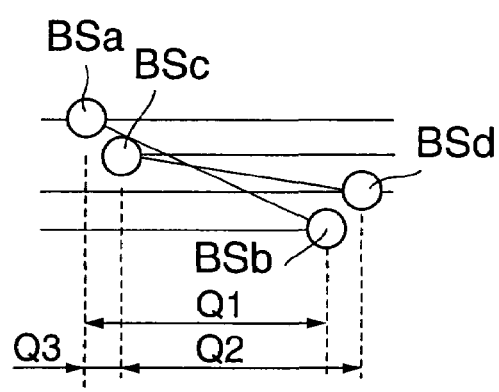

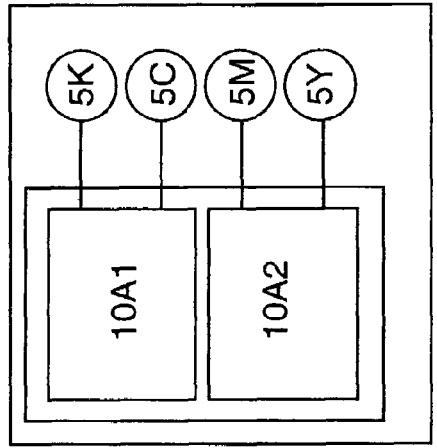
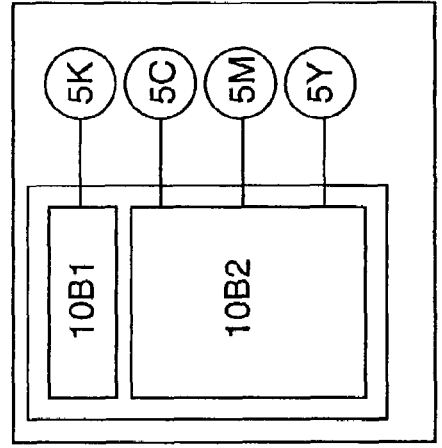
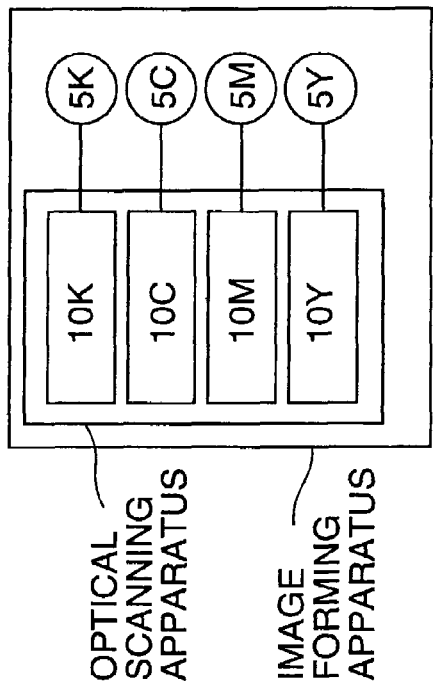
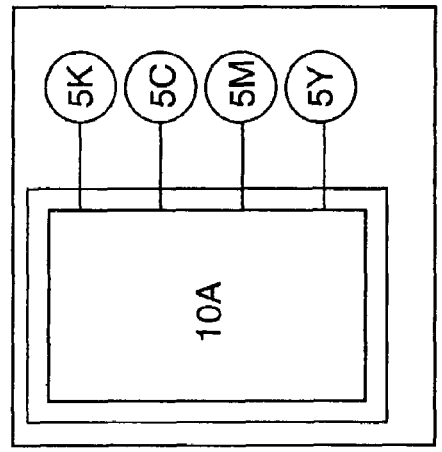

OPTICAL SCANNING APPARATUS, ILLUMINANT APPARATUS AND IMAGE FORMING APPARATUS

CROSS REFERENCE

This application is a division of and is based upon and claims the benefit of priority under 35 U.S.C. §120 for U.S. Ser. No. 10/386,654, filed Mar. 13, 2003, now U.S. Pat. No. 7,333,254 and claims the benefit of priority under 35 U.S.C. §119 from Japanese Patent Application No. 2002-348581, filed Nov. 29, 2002, Japanese Patent Application No. 2002-256704, filed Sep. 2, 2002, and Japanese Patent Application No. 2002-072656, filed Mar. 15, 2002, the entire contents of each which are incorporated herein by reference.

BACKGROUND OF THE INVENTION

1. Field of the Invention

The present invention generally relates to an optical scanning apparatus (multi-beam scanning apparatus) for using a plurality of optical beams projected from an illuminant to simultaneously scan a surface to be scanned in the main scanning direction, an illuminant apparatus prepared for the optical scanning apparatus, and an image forming apparatus that uses the optical scanning apparatus as an optical writing system such as a laser color printer, a digital color copier, a laser plotter and a laser facsimile.

2. Description of the Related Art

In order to improve the recording speed of an optical scanning apparatus that is used as an optical writing system in an image forming apparatus, there is an approach in which the rotational speed of a polygon mirror, which serves as a deflecting part, is increased. However, this approach has limited improvement with respect to the recording speed if motor durability, motor noise, motor vibration, laser modulation speed and the like are taken into account. Consequently, optical scanning apparatuses for simultaneously radiating a plurality of optical beams in order to record a plurality of lines have been proposed.

Some multi-beam illuminant apparatuses that can radiate a plurality of laser beams as an illuminant part of these optical scanning apparatuses have been also proposed. As such a multi-beam illuminant apparatus, there is a multi-beam semiconductor laser (for instance, a semiconductor laser array) that contains a plurality of illuminant points (illuminant channels). Regarding such a semiconductor laser array, however, it is extremely difficult to increase the number of the illuminant channels in course of fabrication thereof. In addition, it is hard to eliminate influences on thermal/electronic crosstalk and realize a short wavelength with respect to the semiconductor laser array. For these reasons, the semiconductor array is currently considered to be expensive as an illuminant part of an optical scanning apparatus.

On the other hand, a single-beam semiconductor laser is widely used in various industries because the wavelength of the single-beam semiconductor laser can be easily shortened and the fabrication cost thereof is affordable even in the current technology level.

An illuminant apparatus and a multi-beam scanning apparatus use such a single-beam semiconductor laser or the above-mentioned multi-beam semiconductor laser as an illuminant. In this case, the illuminant apparatus and the optical scanning apparatus need to have a beam synthesizing part for synthesizing a plurality of laser beams. With this background, a large number of illuminant apparatuses and optical scanning apparatuses for using a beam synthesizing part to synthesize a plurality of laser beams have been proposed.

However, when such a beam synthesizing part is used to synthesize a plurality of laser beams, a single-beam semiconductor laser has some problems in comparison with a semiconductor laser array in that environmental variations and time passage make alignment of beam spots on a surface to be scanned, for instance, the beam pitch and the scanning line interval, unstable.

Japanese Laid-Open Patent Application No. 2000-227563 discloses a multi-beam scanning optical device for using a beam synthesizing prism to synthesize optical beams emitted from a plurality of illuminants. In this multi-beam scanning optical device, projection directions of the optical beams are adjusted by shifting the beam synthesizing prism along a light path and adjusting gradient of the beam synthesizing prism in the main scanning section or the subscanning section. As a result, it is possible to adjust positions of beam spots on a surface to be scanned.

Japanese Laid-Open Patent Application No. 10-215351 discloses a light beam scanner for using a beam synthesizing prism to synthesize optical beams emitted from a plurality of illuminants. In this light beam scanner, projection directions of the optical beams are adjusted by shifting a cylindrical lens for forming a line image on a reflection surface of a polygon mirror in the subscanning direction. As a result, it is possible to adjust positions of beam spots on a surface to be scanned.

Japanese Laid-Open Patent Application No. 09-189873 discloses a device for scanning multi-beam for using a half mirror to synthesize optical beams emitted from a plurality of illuminants. In this device for scanning multi-beam, projection directions of the optical beams are adjusted by adjusting gradients of a galvanomirror in a light path and an illuminant apparatus. As a result, it is possible to adjust positions of beam spots on a surface to be scanned.

Japanese Laid-Open Patent Application No. 10-282531 discloses an optical deflector for deflecting a beam laser through varying refractive index of an electrooptic material (lithium niobate and so on) with electrooptic effect.

Japanese Laid-Open Patent Application No. 2000-003110 discloses an image forming device and control method thereof. In this image forming device, a light path deflecting element (a liquid crystal element) is used to adjust a scanning position on a surface to be scanned, and the pitch irregularity of scanning lines, which is caused by the rotational irregularity of a photoreceptor drum, is corrected. In addition, the image forming device has a detecting part for detecting the rotational speed of the photoreceptor drum.

Japanese Laid-Open Patent Application No. 2000-047214 discloses an optical path variable device and an image forming device. A light path deflecting element formed of a plurality of liquid crystal layers is provided to an image forming apparatus for forming an image. Like the image forming device according to Japanese Laid-Open Patent Application No. 2000-003110, the optical path variable device and the image forming device intends to correct the pitch irregularity of scanning lines caused by the rotational irregularity of a photoreceptor drum.

Many of existing inventions including the multi-beam scanning optical device according to Japanese Laid-Open Patent application No. 2000-227563, the light beam scanner according to Japanese Laid-Open Patent application No. 10-215351, and the device for scanning multi-beam according to Japanese Laid-Open Patent application No. 09-189873 use some mechanical systems to deflect a light path of an optical beam and adjust alignment of a beam spot on a surface to be scanned.

In the case where such a mechanical system is used to adjust the light path, however, since the number of parts thereof inevitably increases, the part increase not only undermines reliability and duration of the whole system but also increases the system size. In addition, there is a probability that hysteresis caused by backlash and others, vibration, noise and heat arise.

Also, some methods are presented along another approach. One method utilizes variations of the prism refractive index caused by electrooptical effect such as the optical deflector according to Japanese Laid-Open Patent application No. 10-282531. Also, in another method, an optical beam is deflected through diffraction caused by an acoustooptic element. However, since a high driving voltage is required to implement these methods, an apparatus thereof becomes complicated and includes risk of heat generation. Thus, these methods are considered to be impractical.

In the image forming device according to Japanese Laid-Open Patent application No. 2000-003110 and the optical path variable device and image forming device according to Japanese Laid-Open Patent application No. 2000-047214, such an image forming apparatus uses a liquid crystal element as a light path deflecting element so as to correct the pitch irregularity of scanning lines due to the rotational irregularity of a photoreceptor drum or more accurately superpose image information between photoreceptor drums in a tandem type optical scanning apparatus.

In a tandem type full color image forming apparatus, four photoreceptor drums corresponding to the four colors: cyan (C), magenta (M), yellow (Y) and black (K) are provided in a tandem form along the carrier surface of an intermediate transferring belt. When a beam scanning apparatus scans an image by using optical beams corresponding to the individual photoreceptors, electrostatic latent images are formed on the circumferential surfaces of the photoreceptor drums. The electrostatic latent images are developed by using the corresponding color toners. The color toner images are carried by the intermediate transferring belt, and then a color image is created by sequentially transferring the color toner images.

In the beam scanning apparatus, a scanning part is rotationally driven at a predetermined rotational speed by a polygon motor and so on. A line synchronization signal generating part detects an optical beam from the beam scanning apparatus at a predetermined position and then generates a line synchronization signal. Synchronously with the line synchronization signal, an optical beam is modulated in accordance with the image signal, and then the image is written for each line. An intermediate transfer reference signal generating part detects a mark on an intermediate transfer body at a predetermined position and then generates an intermediate transfer reference signal. Synchronously with the intermediate transfer reference signal, toner images corresponding to the individual colors are formed on the photoreceptor.

However, the intermediate transfer reference signal and the line synchronization signal are not synchronized with each other in the color image forming apparatus. Thus, as the number of optical beams increases, the phase difference between the intermediate transfer reference signal and the line synchronization signal tends to become larger. When the difference between the image writing start positions becomes large with respect to the subscanning direction, there arises color smear (misalignment of the individual toner images) and the resulting color image deteriorates.

Japanese Laid-Open Patent Application No. 10-239939 discloses a color image forming device that can eliminate the above-mentioned problems. The color image forming apparatus has a correcting part correcting a color smear by selecting the first optical beam for writing an image on a photoreceptor among a plurality of optical beams in accordance with phase relation between an intermediate transfer reference signal and a line synchronization signal and adjusting image writing start positions of individual colors with respect to the subscanning direction. However, even if this method is applied to color image forming apparatuses, there still is a probability that at most one line of misalignment arises with respect to the image writing start positions.

When a liquid crystal element is used to deflect a light path by an infinitesimal angle, it is necessary to coincide (parallel) an optical axis of the liquid crystal element with a plane of polarization of an optical beam having linear polarization. In order to enhance shading characteristic (light intensity distribution) on a surface to be scanned of a photoreceptor, a semiconductor laser (single beam) is inclined in the optical axis direction. Also, in order to set a subscanning beam pitch on a surface to be scanned to a predetermined value in a multi-beam scanning apparatus using a semiconductor laser array as an illuminant part thereof, the semiconductor laser array is inclined in the optical axis direction in accordance with the optical magnification. In these cases, there is a probability that the deflection direction of the light path does not always coincide with the polarization plane of the optical beam. If the deflection direction of the light path does not coincide with the polarization plane of the optical beam, it is impossible to effectively deflect the light path by means of the liquid crystal element.

SUMMARY OF THE INVENTION

It is a general object of the present invention to provide an optical scanning apparatus, an illuminant apparatus and an image forming apparatus in which the above-mentioned problems are eliminated.

A more specific object of the present invention is to provide an optical scanning apparatus for scanning a surface to be scanned in the main scanning direction by simultaneously using a plurality of optical beams emitted from an illuminant wherein the optical scanning apparatus can correct misalignment of the beam pitch of beam spots on the scanned surface caused by environmental variations and time passage.

Another more specific object of the present invention is to provide a small size illuminant apparatus that is installed suitably to the optical scanning apparatus capable of adjusting alignment of beam spots on a surface to be scanned.

Another more specific object of the present invention is to provide an image forming apparatus that can produce a high quality output image by using the above-mentioned optical scanning apparatus therein.

Another more specific object of the present invention is to provide an optical scanning apparatus using a liquid crystal element wherein the optical scanning apparatus can move a beam spot position on a surface to be scanned by using the liquid crystal element if the direction of an active layer of a semiconductor laser chip (the polarization plane of the optical beam) serving as an illuminant does not coincide with the optical axis direction of the liquid crystal element.

Another more specific object of the present invention is to provide an image forming apparatus that installs the above-mentioned optical scanning apparatus.

In order to achieve the above-mentioned objects, there is provided according to one aspect of the present invention an optical scanning apparatus for scanning a surface to be scanned in a main scanning direction by simultaneously using a plurality of optical spots formed of a plurality of optical beams emitted from an illuminant, comprising: a light path deflecting part deflecting a light path of at least one of the optical beams, wherein the light path deflecting part is provided in light paths of the optical beams.

According to the above-mentioned invention, since the light path deflecting part deflects a light path of at least one of optical beams, it is possible to adjust a position of a beam spot on the scanned surface.

In the above-mentioned optical scanning apparatus, the light path deflecting part may use a liquid crystal deflecting element formed of a liquid crystal element being controllable by an electronic signal to deflect the light path of the one of the optical beams.

According to the above-mentioned invention, it is possible to not only avoid the size increase of the optical scanning apparatus but also suppress vibration, noise and heat. In addition, it is possible to adjust beam spot alignment on the scanned surface by a low voltage.

In the above-mentioned optical scanning apparatus, the liquid crystal deflecting element may be capable of deflecting optical beams separately in two directions orthogonal to each other.

According to the above-mentioned invention, since the optical beams can be separately deflected toward two directions orthogonal with each other, it is possible to adjust positions of the beam spots separately with respect to the main scanning direction and the subscanning direction.

In the above-mentioned optical scanning apparatus, the liquid crystal deflecting element may have a plurality of effective areas each of which is separately modulated.

According to the above-mentioned invention, since each element has a plurality of effective areas, it is possible to reduce the number of parts and improve the positioning accuracy.

In the above-mentioned optical scanning apparatus, the illuminant may comprise at least a semiconductor laser serving as an illuminant point and a coupling lens coupling laser light emitted from the semiconductor laser.

According to the above-mentioned invention, when the illuminant is formed of at least a semiconductor laser and a coupling lens corresponding to the semiconductor laser, it is possible to easily adjust beam characteristics of an emitted optical beam such as collimate property and the optical axis direction in accordance with an optical system in the lower stream.

In the above-mentioned optical scanning apparatus, the above-mentioned optical scanning apparatus may further comprise a beam synthesizing part synthesizing optical beams emitted from a plurality of illuminants.

According to the above-mentioned invention, since a plurality of optical beams are emitted from a plurality of distinct illuminants, it is possible to flexibly position the illuminants and decrease a cross angle θ between two of the optical beams around a deflecting reflection surface of the deflector with respect to the main scanning direction.

In the above-mentioned optical scanning apparatus, each of the illuminants may comprise at least a semiconductor laser serving as an illuminant point and a coupling lens coupling laser light emitted from the semiconductor laser, and the semiconductor and the coupling lens may be arranged so as to correct a synthesis error by the beam synthesizing part.

According to the above-mentioned invention, since the relative position of the semiconductor laser to the coupling lens is adjusted, that is, the optical axis and collimate is adjusted, in accordance with synthesis errors, it is possible to efficiently correct the synthesis errors.

In the above-mentioned optical scanning apparatus, the optical scanning apparatus may further comprise an aperture member having an aperture for shaping an optical beam wherein the aperture member is provided in an upper stream side, that is, in an illuminant side, of the liquid crystal deflecting element in the light paths of the optical beams.

According to the above-mentioned invention, since the aperture is provided in the upper stream side of the liquid crystal element, it is possible to reduce the size of the effective area of the liquid crystal element.

In the above-mentioned optical scanning apparatus, the aperture for shaping an optical beam may be formed on one of an entrance surface and an exit surface of the liquid crystal deflecting element.

According to the above-mentioned invention, since the aperture is formed on the entrance surface or the exit surface, it is possible to reduce the number of parts and improve the positioning accuracy of the aperture and the effective area of the liquid crystal element.

In the above-mentioned optical scanning apparatus, the optical scanning apparatus may further comprise a detecting part detecting positions of the optical spots for simultaneously scanning the surface to be scanned and a driving part driving/controlling a liquid crystal deflecting element based on a detection result of the detecting part so as to adjust a position of at least one of the optical spots.

According to the above-mentioned invention, since positions of the beam spots are detected and are adjusted based on detection results, it is possible to efficiently suppress deterioration of the beam spot alignment caused by temperature fluctuation and time passage.

Additionally, there is provided according to another aspect of the present invention an illuminant apparatus for emitting a plurality of optical beams and serving an optical scanning apparatus for scanning a surface to be scanned in a main scanning direction by simultaneously using a plurality of optical spots formed of the optical beams emitted from a plurality of illuminants therein, wherein the optical scanning apparatus comprises a light path deflecting part, which is provided in light paths of the optical beams, deflecting a light path of at least one of the optical beams, comprising: a plurality of light path deflecting parts separately deflecting one of the optical beams corresponding to each of the light path deflecting parts, wherein the light path deflecting parts are integrally provided.

According to the above-mentioned invention, since positions of the beam spots are adjusted and a plurality of light path deflecting elements are integrally provided, it is possible to miniaturize the illuminant apparatus.

In the above-mentioned illuminant apparatus, the light path deflecting part may be formed of a transmission type optical element and may be provided in light paths of the optical beams.

According to the above-mentioned invention, it is possible to adjust positions of the beam spots with high revolving power.

In the above-mentioned illuminant apparatus, the light path deflecting part may be formed of a reflection type optical element and may be provided in light paths of the optical beams.

According to the above-mentioned invention, it is possible to adjust positions of the beam spots in a wide range.

In the above-mentioned illuminant apparatus, the transmission type optical element may be driven by a driving part using a piezoelectric element.

In the above-mentioned illuminant, the reflection type optical element may be driven by a driving part using a piezoelectric element.

According to the above-mentioned inventions, since the light path deflecting part is driven by a difference of the piezoelectric element in proportion to an applied voltage, it is possible to attain a desired adjustment value at high revolving power. Also, when a ring ultrasound motor is used to drive the light path deflecting element, it is possible to attain high retention even if the power supply is OFF. As a result, it is possible to suppress fluctuation of the adjustment value caused by vibration and shock from an image forming apparatus and so on.

In the above-mentioned illuminant apparatus, the transmission type optical element may be driven by a driving part using one of a pulse motor capable of rotating by a predetermined angle in accordance with an input pulse signal and a pulse motor capable of moving straight by a predetermined distance in accordance with an input pulse signal.

In the above-mentioned illuminant apparatus, the reflection type optical element may be driven by a driving part using one of a pulse motor capable of rotating by a predetermined angle in accordance with an input pulse signal and a pulse motor capable of moving straight by a predetermined distance in accordance with an input pulse signal.

According to the above-mentioned invention, since the light path deflecting element is driven by the pulse motor generating a difference in proportion to the number of an input pulse, it is possible to obtain a desired adjustment value. Also, since the illuminant apparatus is formed of an ordinary pulse motor, it is possible to fabricate the illuminant apparatus at low cost.

In the above-mentioned illuminant apparatus, the light path defecting part may be formed of a liquid crystal element driven by an electronic signal.

According to the above-mentioned invention, it is possible to provide a reliable illuminant apparatus that can reduce environmental loads. Also, the illuminant apparatus can freely deflect a plurality of laser beams having different wavelengths from each other.

In the above-mentioned illuminant apparatus, the illuminant apparatus may further comprise a first illuminant part integrally having a plurality of illuminants aligned in line in the main scanning direction, a second illuminant part integrally having a plurality of illuminants aligned in line in the main scanning direction, and a beam synthesizing part making optical beams emitted from the first illuminant part and the second illuminant part close to each other and emitting the close optical beams.

According to the above-mentioned invention, since the illuminant apparatus is divided into the first illuminant part and the second illuminant part and uses the beam synthesizing part to synthesize optical beams emitted from the first illuminant part and the second illuminant part, it is possible to easily adjust an initial setting, flexibly position the illuminant apparatus, and provide LD control and the driving substrate in common.

In the above-mentioned illuminant apparatus, the illuminants may comprise a plurality of semiconductor lasers and a plurality of coupling lenses corresponding to the semiconductor lasers.

According to the above-mentioned invention, it is possible to arbitrarily and easily adjust the beam characteristics of optical beams emitted from the illuminants.

In the above-mentioned illuminant apparatus, the illuminant apparatus may further comprise an aperture member having an aperture for shaping an optical beam, wherein the aperture member is provided in an upper steam side, that is, an illuminant side, of the light path deflecting parts.

According to the above-mentioned invention, it is possible to narrow the effective areas of the light path deflecting part.

Additionally, there is provided according to another aspect of the present invention an optical scanning apparatus for scanning a surface to be scanned in a main scanning direction by simultaneously using a plurality of optical spots formed of a plurality of optical beams emitted from a plurality of illuminants in an illuminant apparatus wherein the illuminant apparatus comprises a plurality of light path deflecting parts, which is integrally provided therein, deflecting one of the optical beams corresponding to each of the light path deflecting parts, comprising: a detecting part detecting positions of the optical spots for simultaneously scanning the surface to be scanned; and a driving part driving/controlling the light path deflecting parts based on a detection result of the detecting part so as to adjust a position of at least one of the optical spots.

According to the above-mentioned invention, since the positions of the beam spots are detected and the light path deflecting part is driven based on detection results, it is possible to correct misalignment of the beam spots caused by temperature fluctuation and time passage.

In the above-mentioned optical scanning apparatus, the optical scanning apparatus may further comprise a deflector deflecting the optical beams emitted from the illuminants and a scanning type imaging system scanning the surface to be scanned by using the optical spots formed of the optical beams deflected, wherein the optical beams from the illuminants enter the deflector non-parallel with each other with respect to the main scanning section.

According to the above-mentioned invention, it is possible to properly set the pitch of two optical beams with respect to the main scanning direction and obtain synchronization detecting signals separately.

In the above-mentioned optical scanning apparatus, the optical scanning apparatus may further comprise an illuminant apparatus formed of a plurality of illuminants, a beam synthesizing part synthesizing a plurality of optical beams emitted from the illuminant apparatus, a deflector deflecting the optical beams synthesized by the beam synthesizing part, and a scanning part leading the optical beams deflected by the deflector on the surface to be scanned, wherein the light path deflecting part is provided between the illuminants and the beam synthesizing part so as to adjust positions of the optical beams on the surface to be scanned.

According to the above-mentioned invention, it is possible to adjust positions of the beam spots on the scanned surface.

In the above-mentioned optical scanning apparatus, the light path deflecting part may be formed of a transmission type optical element that is eccentrically provided.

According to the above-mentioned invention, it is possible to adjust positions of the beam spots with high revolving power.

In the above-mentioned optical scanning apparatus, the light path deflecting part may be formed of a liquid crystal element controllable by an electronic signal.

In the above-mentioned optical scanning apparatus, the optical scanning apparatus may further comprise a ghost light removing part removing ghost light caused by the liquid crystal element, wherein the ghost light removing part is provided as a slit aperture between the liquid crystal element and the deflector.

According to the above-mentioned invention, it is possible to remove unnecessary optical beams.

In the above-mentioned optical scanning apparatus, the optical scanning apparatus may further comprise an aperture shaping an optical beam, wherein the aperture is provided in an upper stream side, that is, an illuminant side, of the light path deflecting part and the following formula is satisfied;

$$L > (1/2) \times \tan\theta \times (b+\Delta),$$

where b is a breadth of optical beams deflected by the liquid crystal element, $\Delta$ is a breadth of the slit aperture, L is a distance between the liquid crystal element and the slit aperture, and $2\theta$ is an angle between +1st-order light and −1st-order light of the ghost light caused by the liquid crystal element.

According to the above-mentioned invention, it is possible to efficiently interrupt harmful ghost light.

In the above-mentioned optical scanning apparatus, the optical scanning apparatus may further comprise an optical housing accommodating parts thereof, wherein the optical housing holds the illuminant apparatus on a side wall thereof and holds the light path deflecting part and the beam synthesizing part on a common holding part therein.

According to the above-mentioned invention, when the illuminant deteriorates, it is possible to easily replace the illuminant and reduce the number of parts.

Additionally, there is provided according to another aspect of the present invention an image forming apparatus for forming an image, comprising: an optical scanning apparatus for scanning a surface to be scanned in a main scanning direction by simultaneously using a plurality of optical spots formed of a plurality of optical beams emitted from an illuminant comprising a light path deflecting part deflecting a light path of at least one of the optical beams, wherein the light path deflecting part is provided in light paths of the optical beams; a photoreceptor forming an electrostatic latent image scanned by the optical scanning apparatus; a developing apparatus developing the electrostatic latent image as a toner image with a toner; and a transferring apparatus transferring the toner image in a recording medium.

Additionally, there is provided according to another aspect of the present invention an image forming apparatus for forming an image, comprising: an optical scanning apparatus for scanning a surface to be scanned in a main scanning direction by simultaneously using a plurality of optical spots formed of a plurality of optical beams emitted from a plurality of illuminants in an illuminant apparatus wherein the illuminant apparatus comprises a plurality of light path deflecting parts, which is integrally provided therein, deflecting one of the optical beams corresponding to each of the light path deflecting parts, comprising a detecting part detecting positions for simultaneously scanning the surface to be scanned and a driving part driving/controlling the light path deflecting parts based on a detection result of the detecting part so as to adjust a position of at least one of the optical spots; a photoreceptor forming an electrostatic latent image scanned by the optical scanning apparatus; a developing apparatus developing the electrostatic latent image as a toner image with a toner; and a transferring apparatus transferring the toner image in a recording medium.

According to the above-mentioned inventions, since the image forming apparatus uses the optical scanning apparatus capable of scanning a scanned surface by simultaneously using a plurality of optical beams, it is possible to achieve high-speed printing and produce a high-density image. Also, if the speed and the density are suppressed at the same levels as a single beam illuminant apparatus, it is possible to decrease rotation speed of a deflector such as a polygon mirror. As a result, it is possible to reduce electricity consumption, vibration, noise and heat.

In the above-mentioned image forming apparatus, the light path deflecting part may be driven/controlled by an operator based on an output image on the recording medium.

According to the above-mentioned invention, since the operator can determine the quality of an image based on the output image on the recording medium and control the light path deflecting element, it is possible to correct deterioration of the image including influences on the output image by the developing process, the transferring process and the fixing process. Also, since either or both of the beam spot alignment detecting part or/and the beam spot alignment control part may be omitted, it is possible to fabricate the image forming apparatus with low cost.

In the above-mentioned image forming apparatus, the image forming apparatus may further comprise a plurality of the photoreceptors serving as a plurality of surfaces to be scanned.

According to the above-mentioned invention, it is possible to produce a high-density monochrome or color image at high speed.

In the above-mentioned image forming apparatus, the image forming apparatus may further comprise a plurality of the optical scanning apparatuses wherein the optical scanning apparatuses are aligned in line in the main scanning direction for the photoreceptor.

According to the above-mentioned invention, it is possible to suppress color difference of an output image and image deterioration around a connection area between optical beams.

In the above-mentioned image forming apparatus, the image may have variable pixel density.

According to the above-mentioned invention, it is possible to change the pixel density by switching operation modes such as a printer mode and a copier mode in accordance with purposes of an operator.

Additionally, there is provided according to another aspect of the present invention an optical scanning apparatus for scanning a surface to be scanned by using a beam spot formed of an optical beam emitted from a semiconductor laser, comprising: a liquid crystal element deflecting a light path of the optical beam on the surface to be scanned; and a light rotating part rotating a polarization plane of the optical beam.

According to the above-mentioned invention, it is possible to efficiently deflect a light path of an optical beam by using the liquid crystal element and adjust positions of the beam spots.

In the above-mentioned optical scanning apparatus, the light rotating part may be formed of a ½ wavelength plate.

According to the above-mentioned invention, since such a small and reasonable ½ wavelength plate is used as the light rotating part, it is possible to avoid the size increase of the optical scanning apparatus and fabricate the optical scanning apparatus as low costs.

In the above-mentioned optical scanning apparatus, the ½ wavelength plate may be held by a rotation adjusting part and may be capable of rotating upon an optical axis.

According to the above-mentioned invention, it is possible to coincide the polarization plane of the laser beam with the optical axis of the liquid crystal element by rotating the polarization plane by a predetermined angle.

In the above-mentioned optical scanning apparatus, a position of the optical spot may be adjusted on the surface to be scanned by deflecting a light path of the optical beam in a subscanning section of the liquid crystal element.

According to the above-mentioned invention, it is possible to virtually adjust a position of the beam spot with respect to only the subscanning direction. As a result, it is possible to eliminate some problems caused by misalignment of the beam spot with respect to only the subscanning direction.

In the above-mentioned optical scanning apparatus, the semiconductor laser may be formed of a semiconductor laser array having a plurality of illuminant points.

According to the above-mentioned invention, it is possible to easily form a high-density image at high speed without increasing rotation speed of the polygon motor for rotating a polygon mirror serving as the deflector.

In the above-mentioned optical scanning apparatus, the semiconductor laser array may be inclined toward an optical axis of the optical beam emitted.

According to the above-mentioned invention, it is possible to obtain a desired beam pitch regardless of magnification of the optical scanning apparatus.

In the above-mentioned optical scanning apparatus, the surface to be scanned may be scanned by an optical beam synthesized from at least two optical beams emitted from at least two semiconductor lasers by using a PBS (Polarization Beam Splitter) surface, and the liquid crystal element may be arranged so as to convert an optical beam emitted from the liquid crystal element into one of an S-polarized optical beam or a P-polarized optical beam toward the PBS surface.

According to the above-mentioned invention, it is possible to suppress energy loss in the beam synthesizing part.

In the above-mentioned optical scanning apparatus, the surface to be scanned may be scanned by an optical beam synthesized from at least two optical beams emitted from at least two semiconductor lasers by using a half-mirror.

According to the above-mentioned invention, optical beams are synthesized independently of the directions of the polarization planes of the optical beams. Furthermore, since it is unnecessary to provide the light rotating part such as a ½ wavelength plate between the liquid crystal element and the beam synthesizing prism, it is possible to reduce the number of parts and fabricate the optical scanning apparatus at low costs.

Additionally, there is provided according to another aspect of the present invention an image forming apparatus for forming an image, comprising: an optical scanning apparatus for scanning a surface to be scanned by using an optical spot formed of an optical beam emitted from a semiconductor laser, the optical scanning apparatus comprising a liquid crystal element deflecting a light path of the optical beam on the surface to be scanned and a light rotating part rotating a polarization plane of the optical beam; a photoreceptor forming an electrostatic latent image scanned by the optical scanning apparatus; a developing part developing the electrostatic latent image as a toner image with a toner; and a transferring part transferring the toner image in a recording medium.

According to the above-mentioned invention, it is possible to obtain a high-quality image.

In the above-mentioned image forming apparatus, the optical scanning apparatus may scan the photoreceptor by using a plurality of beam spots formed of a plurality of optical beams and may be capable of adjusting a scanning line pitch on the photoreceptor.

According to the above-mentioned invention, since the misalignment of the scanning line interval is corrected, it is possible to obtain a high-quality image.

In the above-mentioned image forming apparatus, the optical scanning apparatus may scan the photoreceptor by using a plurality of optical beams and is capable of switching a pixel density of the image.

According to the above-mentioned invention, it is possible to provide the image forming apparatus that can switch the pixel density by incorporating two image forming apparatuses having different image densities from each other.

Additionally, there is provided according to another aspect of the present invention a tandem type image forming apparatus for forming an image, comprising: an optical scanning apparatus for scanning a surface to be scanned by using a beam spot formed of an optical beam emitted from a semiconductor laser, the optical scanning apparatus comprising a liquid crystal element deflecting a light path of the optical beam on the surface to be scanned; and a light rotating part rotating a polarization plane of the optical beam; a photoreceptor forming an electrostatic latent image scanned by the optical scanning apparatus; a developing part developing the electrostatic latent image as a toner image with a toner; and a transferring part transferring the toner image in a recording medium, wherein a plurality of the photoreceptors are provided, the optical scanning apparatus scans the photoreceptors with a plurality of optical beams, and misalignment of a write start position between the photoreceptors is corrected.

According to the above-mentioned invention, in order to obtain a high-quality image in a tandem type color image forming apparatus, it is possible to coincide write start positions among image stations.

Additionally, there is provided according to another aspect of the present invention a division scanning type image forming apparatus for forming an image, comprising: an optical scanning apparatus for scanning a surface to be scanned by using a beam spot formed of an optical beam emitted from a semiconductor laser, the optical scanning apparatus comprising a liquid crystal element deflecting a light path of the optical beam on the surface to be scanned and a light rotating part rotating a polarization plane of the optical beam; a photoreceptor forming an electrostatic latent image scanned by the optical scanning apparatus; a developing part developing the electrostatic latent image as a toner image with a toner; and a transferring part transferring the toner image in a recording medium, wherein a plurality of the optical scanning apparatuses are aligned in line with respect to a main scanning direction for each photoreceptor and misalignment of the beam spot with respect to a main scanning direction around a connection area between scanning beams from the optical scanning apparatuses is corrected.

In the above-mentioned division scanning type image forming apparatus, the misalignment of the beam spot around a connection area between scanning beams may be corrected with respect to a subscanning direction.

According to the above-mentioned inventions, it is possible to obtain a high-quality image by coinciding positions of the beam spots in a connection area between every two of the image stations.

Other objects, features and advantages of the present invention will become more apparent from the following detailed description when read in conjunction with the accompanying drawings.

BRIEF DESCRIPTION OF THE DRAWINGS

FIGS. 7A through 7C are diagrams for explaining a liquid crystal deflecting element for deflecting a light path of an optical beam by changing a refractive index;

FIGS. 8A through 8C are diagrams for explaining another liquid crystal deflecting element for deflecting a light path of an optical beam by changing a refractive index;

FIGS. 9A and 9B are diagrams for explaining further another liquid crystal deflecting element for deflecting a light path of an optical beam by changing a refractive index;

FIG. 10 is a perspective view of an illuminant of the optical scanning apparatus;

FIGS. 22A and 22B are diagram for explaining a 4-beam illuminant apparatus in which a wedge-shaped prism is used as a light path deflecting element;

FIGS. 23A and 23B are diagrams illustrating an optical system combined with the illuminant apparatus and beam spot alignment on a surface to be scanned;

FIGS. 33A through 33D are schematic diagram illustrating an image forming apparatus according to the present invention;

DETAILED DESCRIPTION OF THE PREFERRED EMBODIMENTS

In the following, embodiments of the present invention will be described with reference to the accompanying drawings.

A description will now be given of an optical scanning apparatus according to the present invention for scanning a surface to be scanned in the main scanning direction by simultaneously using a plurality of optical beams emitted from an illuminant wherein the optical scanning apparatus can correct misalignment of the pitch of beam spots on the surface to be scanned caused by environmental variations and time passage.

In the following description, X direction, Y direction and Z direction represent a direction along a light path (optical axis), a main scanning direction and a subscanning direction, respectively.

Furthermore, although the main scanning direction and the subscanning direction generally mean a direction where a beam spot scans a surface to be scanned and the direction orthogonal to the main scanning direction thereof, respectively, the main scanning direction and the subscanning direction in this embodiment mean the main scanning direction and the subscanning direction with respect to individual spots in a light path, respectively.

Figure 1:
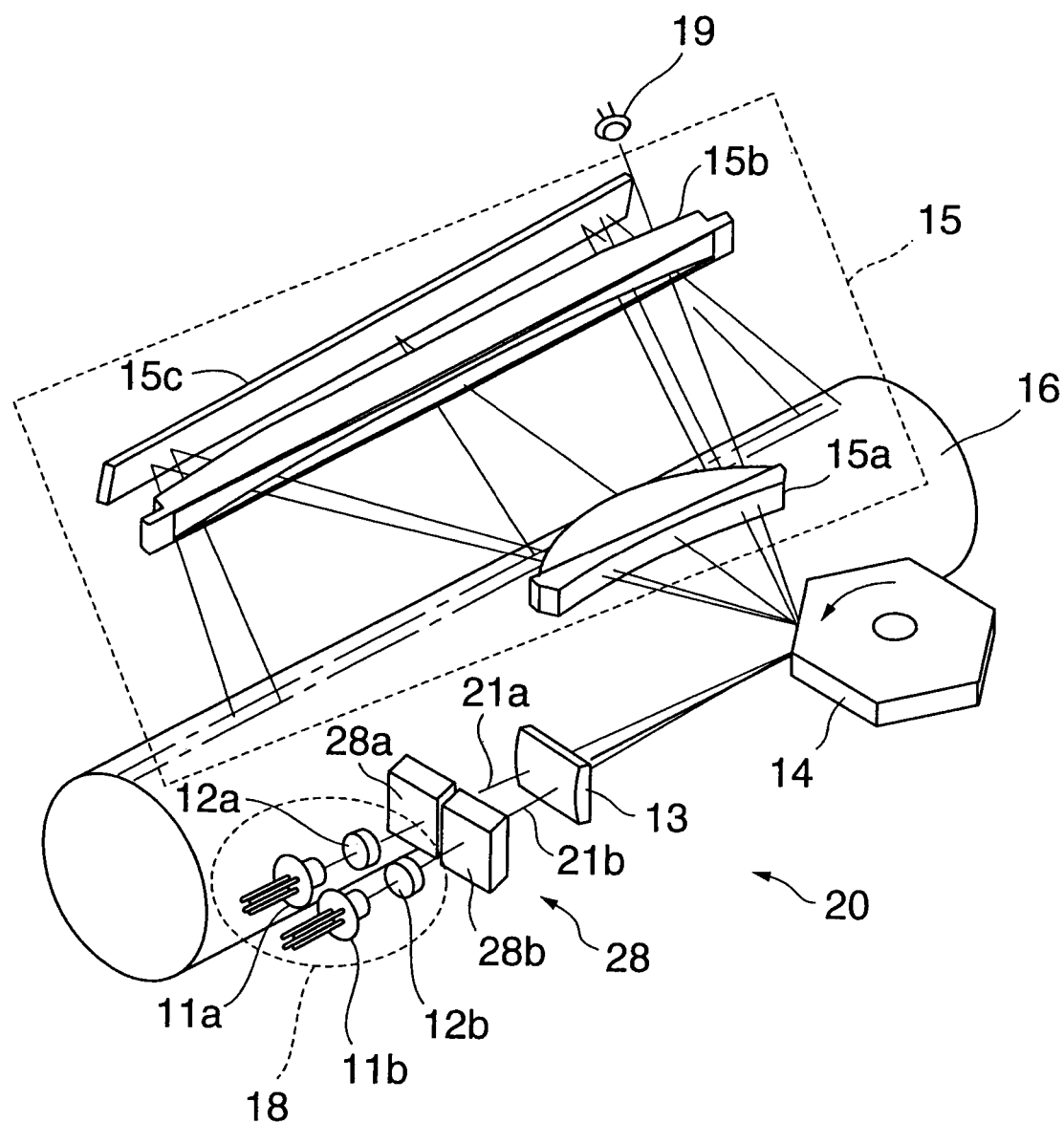
FIG. 1 is a perspective view of an optical scanning apparatus according to the present invention.

FIG. 1 is a perspective view of an optical scanning apparatus according to the first embodiment.

In FIG. 1, an illuminant apparatus 18 comprises at least two pairs of a semiconductor laser 11a and a coupling lens 12a and a semiconductor laser 11b and a coupling lens 12b. However, the illuminant apparatus 18 is not limited to this configuration. Also, the semiconductor lasers 11a and 11b may be single beam semiconductor lasers each of which has a single illuminant point or may be multi-beam semiconductor lasers (semiconductor laser arrays) each of which has a plurality of illuminant points.

The semiconductor lasers 11a and 11b emit laser light. The coupling lenses 12a and 12b couple the emitted laser light, and the coupled laser light results in two resulting optical beams (laser beams) 21a and 21b.

The optical beams 21a and 21b are shaped into the linear form by a cylindrical lens 13, and the linear optical beams are projected on a deflecting reflection surface of a polygon mirror 14, which serves as a deflecting system for producing optical beams that are focused on the subscanning direction and are linearly formed with respect to the main scanning direction. Then, the deflected linear optical beams are projected to an optical scanning system 15. The optical scanning system comprises two scanning lenses 15a and 15b and a reflecting mirror 15c and produces beam spots for scanning a scanned surface 16, for instance, a photoreceptor drum.

Here, an optical scanning apparatus 20 (a multi-beam scanning apparatus) scans the scanned surface 16 by using beam spots formed of a plurality of optical beams emitted from the illuminant apparatus 18.

When the optical scanning apparatus 20 is used as an optical writing system of an image forming apparatus, an optical beam is modulated in accordance with output image data. When the optical beam enters a synchronization detecting plate 19, an electronic signal (synchronization signal) is provided as the start modulation timing.

Figure 2:
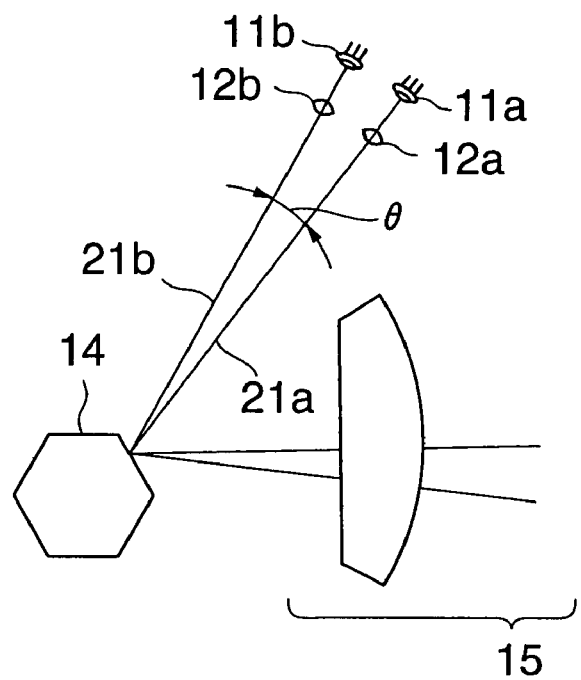
FIG. 2 is an outline plan view with respect to a main scanning section and light paths of the optical scanning apparatus.

FIG. 2 shows an optical structure and a light path of the optical scanning system according to the first embodiment with respect to a main scanning section parallel with the optical axis and the main scanning direction. The two optical beams 21a and 21b intersect by a cross angle θ in the vicinity of a deflecting reflection surface of the polygon mirror 14. As a result, it is possible to suppress influences caused by differences of optical characteristics such as field curvatures and magnification errors between the two optical beams 21a and 21b.

Figure 3:
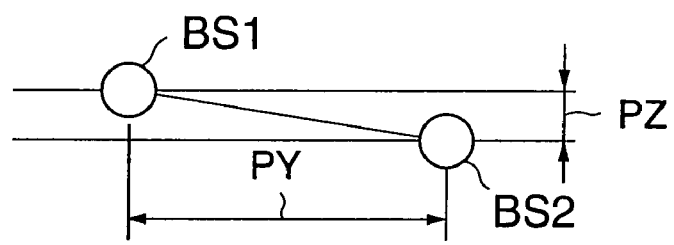
FIG. 3 is a diagram illustrating an example of alignment on a scanned surface of beam spots generated from two optical beams.

As is shown in FIG. 3, two beam spots BS1 and BS2 formed of the two optical beams 21a and 21b are provided on the scanned surface 16 in a predetermined interval (beam pitch: PY) with respect to the main scanning direction. In accordance with the scanning line density, the two beam spots BS1 and BS 2 need to have a predetermined interval (beam pitch: PZ) with respect to the subscanning direction. In order to provide the beam pitch PZ, the two optical beams 21a and 21b are projected at an angle φ between the outgoing directions thereof with respect to the subscanning section.

In FIG. 1, a liquid crystal deflecting element 28 is provided as a light path deflecting part between the coupling lenses 12a and 12b and the cylindrical lens 13 in light paths of the two optical beams 21a and 21b. The liquid crystal deflecting element 28 comprises two liquid crystal elements 28a and 28b. If the liquid crystal elements 28a and 28b are driven/controlled (modulated) by electronic signals, it is possible to separately deflect two optical axes of the optical beams 21a and 21b. As a result, it is possible to set the angle φ to a desired value.

Here, both of the optical beams 21a and 21b may be deflected, or one of the optical beams 21a and 21b may be deflected.

Conventional light path deflecting parts deflect an optical beam based on some methods. The first method is related to a mechanical approach. In this method, for instance, an optical beam is deflected by moving a mirror or a prism in the light path thereof. The second method is related to an approach using an electrooptic element. In this method, an optical beam is deflected by using material characteristics of an electrooptic element to change the refraction index of a prism. The third method is related to an approach using acousto-optic element. In this method, for instance, an optical beam is deflected by generating a diffraction grating in a piezoelectric body through an ultrasonic wave.

However, any of these methods has some disadvantages. For instance, even if any of the methods is applied to an optical scanning apparatus, it is impossible to avoid to scale up the structure of the optical scanning apparatus. Also, there arise vibration, noise and heat in the optical scanning apparatus. In addition, it is hard to drive the optical scanning apparatus to which these methods are applied at a low voltage.

However, if the liquid crystal deflecting element 28 according to the first embodiment is used as the light path deflecting part for deflecting an optical beam, it is possible to overcome the above-mentioned problems.

Figure 5A:
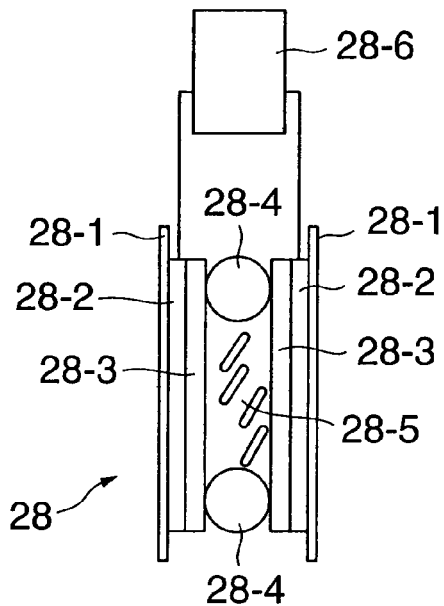
FIGS. 5A and 5B are diagrams illustrating the structure and the deflecting operation of a liquid crystal deflecting element of the optical scanning apparatus, respectively.
Figure 5B:
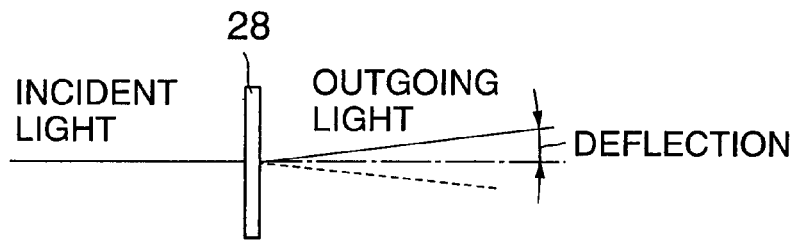

FIGS. 5A and 5B show examples of the structure and a deflecting operation of the liquid crystal deflecting element 28 according to the first embodiment, respectively. As is shown in FIG. 5A, the liquid crystal deflecting element 28 comprises two transparent glass substrates 28-1 on which transparent electrodes 28-2 and orientation films 28-3 are provided, spacers 28-4 and liquid crystal 28-5. The spacers 28-4 are provided between the two glass substrates 28-1 so that two orientation films 28-3 can be opposed to each other and the liquid crystal 28-5 can be filled between the two glass substrates 28-1. When the transparent electrodes 28-2 are connected to a driving control system 28-6 and a rectangular wave or a sine wave is supplied thereto as a driving voltage, an optical beam can be deflected as shown in FIG. 5B. Also, it is possible to adjust the deflection angle by varying duty or amplitude of the rectangular wave or the sine wave.

If an optical beam is required to increase deflecting response speed so that the optical beam can correspond to the rotational irregularity of a photoreceptor drum, the liquid crystal element 28 has to be formed of a plurality of liquid crystal layers. If the optical beam does not have to have such high deflecting response speed, the liquid crystal element 28 may be formed of a single liquid crystal layer.

Here, the beam pitch PY, which is an interval between beam spots with respect to the main scanning direction on the scanned surface 16, is given as follows;

$PY = FY \times \theta$, where FY represents focus length of the optical scanning system with respect to the main scanning direction. If the liquid crystal deflecting element 28 deflects both or either of the two optical beams 21a and 21b so as to change the angle θ between the two optical beams 21a and 21b as an angle Δθ in the main scanning section, the angle θ in the above formula is set as an angle θ+Δθ. As a result, it is possible to set the beam pitch PY with respect to the main scanning direction as a desired value.

In other words, if at least one of the two optical beams is independently deflected in the main scanning direction and the subscanning direction, it is possible to freely adjust alignment of beam spots on the scanned surface 16.

Here, the liquid crystal deflection element 28 may have a single body or may have a two-layer body.

In FIG. 1, the liquid crystal elements 28a and 28b of the liquid crystal deflecting element 28 are separately provided to the two optical beams.

Figure 6:
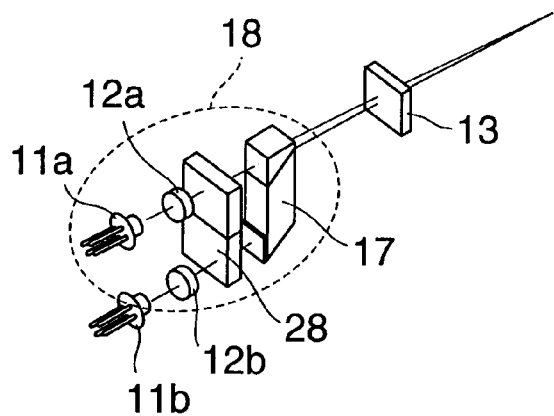
FIG. 6 is a perspective view of another optical scanning apparatus according to the present invention.

In contrast, as is shown in FIG. 6, when the liquid crystal deflecting element 28 formed of a single liquid crystal element is divided into a plurality of domains or effective areas (two domains in FIG. 6) as mentioned later, it is possible to modulate the effective areas separately. As a result, it is possible to reduce the number of parts of the liquid crystal deflecting element 28 and position the liquid crystal deflecting element 28 with high accuracy. Furthermore, it is possible to simplify wirings to input an electronic signal.

Here, a supplemental description will be given of the structure and a deflecting operation of a liquid crystal deflecting element that the optical scanning apparatus according to the first embodiment can adopt.

Typically, there are two types of liquid crystal deflecting elements. One is a liquid crystal deflecting element driven by an electronic signal. The other is a liquid crystal deflecting element driven by a magnetic signal. The following description concentrates on an electronic signal driven type liquid crystal deflecting element. The electronic signal driven type liquid crystal deflecting element is further classified into two types based on operations thereof. One is a liquid crystal deflecting element that changes the refractive index through an electronic signal. The other is a liquid crystal deflecting element that causes diffraction through an electronic signal.

Japanese Laid-Open Patent Application No. 63-240533 discloses an optical deflector related to the former type liquid crystal deflecting element for deflecting a light path by changing the refractive index.

FIGS. 7A through 7C are diagrams for explaining an example of a liquid crystal deflecting element for deflecting a light path by changing the refractive index through an electronic signal.

In FIG. 7B, liquid crystal 71 is formed of nematic liquid crystal having positive dielectric anisotropy. The liquid crystal 71 is sealed in a thin film between two transparent orientation films 72a and 72b that are located distantly at a predetermined interval by spacers 73. The form of a liquid crystal molecule 71a extends in the molecule axis direction. The orientation film 72a is processed so that the molecule axis of the liquid crystal molecule 71a can be orthogonal with respect to the surface of the orientation film 72a. In contrast, the orientation film 72b is processed so that the molecule axis of the liquid crystal molecule 71a can be parallel with respect to the surface of the orientation film 72b.

A transparent electronic resistor layer 74 formed of ZnO and others is provided on the opposite surface of the orientation film 72a toward the liquid crystal 71. As is shown in FIG. 7B, the electronic resistor layer 74, the orientation films 72a and 72b, and the liquid crystal 71 are sandwiched between transparent glass substrates 75a and 75b. A transparent electrode film 76 formed of ITO and others covers the orientation film 72b side surface on the glass substrate 75b.

On the other hand, two electrodes 77a and 77b having patterns as shown in FIG. 7A are provided on the orientation film 72a side surface of the glass substrate 75a. As is shown in FIG. 7B, the electrodes 77a and 77b have contacts with the electronic resistor film 74.

If the electrodes 77a and 77b are located in a transmission area of a luminous flux, the electrodes 77a and 77b need to be formed of ITO and others as transparent electrodes. However, if the electrodes 77a and 77b do not interrupt the luminous flux, the electrodes 77a and 77b may be formed of a metal film and others as opaque electrodes. FIGS. 7A through 7C handle the case where the electrodes 77a and 77b are formed of transparent electrodes.

If the electrode film 76 and the electrode 77b are grounded and a voltage V is applied between terminals A and B of the electrodes 77a and 77b as shown in FIG. 7A, an electric potential at the electronic resistor layer 74 linearly decreases from the electrode 77a to the electrode 77b as shown in FIG. 7C. Between the electronic resistor film 74 and the transparent electrode film 76, there arises a horizontal directional electric field that decreases linearly from the upper area to the lower area of FIG. 7B. This electric field influences the liquid crystal 71 and rotates the liquid crystal molecule 71a so that the molecule axis can be parallel with the electric field. The liquid crystal molecule 71a has a rotation angle linearly proportionate to the intensity of the electric field. As a result, at the electrode 71a side, the molecule axis of the liquid crystal molecule 71a is directed closely in the electric field direction, that is, the horizontal direction in FIG. 7B. On the other hand, at the electrode 71b side, the molecule axis of the liquid crystal molecule 71a persists almost parallel with the electrode film 76 because the electric field has substantially intensity 0 at the electrode 71b.

The dielectric constant of the liquid crystal molecule 71a becomes large in the direction parallel with the molecule axis and small in the direction orthogonal with the molecule axis. Thus, the refractive index becomes large in the direction parallel with the molecule axis. If there arises a distribution directing in the molecule axis direction under the influences by the electric field, the liquid crystal 71 has large refractive index in the electrode 71a side where the molecule axis is almost parallel with the electric field. In contrast, the liquid crystal 71 has small refractive index in the electrode 71b side. As is shown in FIG. 7C, the refractive index decreases linearly from the electrode 71a side to the electrode 71b side.

Therefore, if an illuminant flux from the right side enters the liquid crystal deflecting element having a refractive index distribution in order to transmit the liquid crystal deflecting element, the transmitted illuminant flux is deflected in the high refractive index side, that is, the upper direction in FIG. 7B, due to the influence of the refractive index distribution.

To the contrary, if the grounded electrode is replaced with the electrode 77a and a voltage V is applied between the two terminals A and B in the inverse direction, there arises a refractive index distribution where the electric potential at the electronic resistor film 74 decreases from the electrode 71b to the electrode 71a. As a result, it is possible to deflect the transmitted illuminant flux in the lower direction in FIG. 7B.

The principle of illuminant flux deflection by means of the liquid crystal deflecting element that changes the refractive index has been described in the above. However, a deflection angle, which is an amount of deflection, is saturated at an inherent value for the liquid crystal deflecting element. Once the deflection angle is saturated, the deflection angle never exceeds the saturated value. Although the liquid crystal deflecting element may be driven by an electronic signal of a direct voltage, it is preferable that the electronic signal is modulated in a pulse form or a sine wave form and the average voltage is approximate 0V from the viewpoint of the duration thereof.

Although the deflection angle is changed by adjusting the electric potential difference V between the terminals A and B, the deflection angle may be changed by adjusting the duty ratio of the pulse if the pulse signal is used as a driving signal as mentioned above.

If a liquid crystal deflection element as shown in FIG. 1 has the large interval between the electrodes 71a and 71b, there arises no diffraction light.

FIGS. 8A through 8C are diagrams for explaining another example of a liquid crystal deflecting element that changes the refractive index with an electronic signal wherein parts similar to those parts in FIGS. 7A through 7C are designated by the same reference numerals for simplicity. This liquid crystal deflecting element is a variation of that in FIGS. 7A through 7C. The liquid crystal deflecting element differs in that a transparent electronic resistor film on the glass substrate 75a is divided into three parts 74a, 74b and 74c and the transparent electrode has the pattern as shown in FIG. 8A. Here, the electronic resistor films 74a, 74b and 74c correspond to a pair of transparent electrodes 77a1 and 77b1, a pair of transparent electrodes 77a2 and 77b2, and a pair of transparent electrodes 77a3 and 77b3, respectively.

If a driving signal is applied between the terminals A and B, the refractive index distribution as shown in FIG. 8C is obtained. In this case, the rate of intensity change of the electric field to the voltage V between the terminals A and B becomes high. Thus, this liquid crystal deflecting element has a larger gradient of the refractive index and a larger deflection angle than that in FIGS. 7A through 7C.

In the liquid crystal deflecting element in FIGS. 8A through 8C, as the number of combinations of electronic resistors and electrodes associated with the electronic resistors, for instance, a combination of the electronic resistor film 74a and the pair of the electrodes 77a1 and 77a1, increases, the deflection angle becomes large. In this case, however, each period with respect to the combinations becomes shorter as shown in FIG. 8C. As a result, there arises diffraction light.

FIGS. 9A and 9B are diagrams for explaining an example of a liquid crystal deflecting element that causes diffraction by an electronic signal wherein parts similar to those parts in FIGS. 7A through 7C are designated by the same reference numerals for simplicity.

Japanese Laid-Open Patent Application No. 08-313941 discloses an optical deflector related to such a liquid crystal deflecting element in detail.

In FIG. 9A, the liquid crystal 71 is formed of nematic liquid crystal having a negative dielectric anisotropy wherein the liquid crystal molecule 71a therein has a smaller dielectric constant in the molecule axis direction than the direction orthogonal to the molecule axis. The liquid crystal 71 is sealed in a thin layer form between two transparent orientation films 72a and 72b that are provided distantly at a predetermined interval by means of spacers 73.

The orientation films 72a and 72b are sandwiched between the glass substrate 75a having the transparent electrode 76a and the glass substrate 75b having the transparent electrode 76b. The transparent electrodes 76a and 76b are formed of ITO and others in a thin film form. The transparent electrodes 76a and 76b are uniformly provided on the surfaces of the glass substrates 75a and 75b in a predetermined shape, respectively.

The orientation films 72a and 72b provides an orientation to the liquid crystal 71 so that the molecule axis direction of the liquid crystal molecule 71a can be orthogonal to the sheet of FIG. 9A.

In this configuration, if a direct voltage or a low-frequency voltage less than about 300 Hz is applied between the transparent electrodes 76a and 76b, the liquid crystal 71 has a diffraction lattice pattern of the vertical direction of FIG. 9A, that is, the direction orthogonal to the above-mentioned orientation. FIG. 9B shows the refractive index distribution in the diffraction lattice pattern.

Here, if an illuminant flux enters the liquid crystal deflecting element, the transmitted light causes diffraction light in the vertical direction in FIG. 9A under the influence of the diffraction lattice pattern. It is possible to change the lattice pitch of the diffraction lattice pattern and the diffraction angle by varying the level of the low-frequency voltage.

Thus, if the deflection angle of the first order diffraction light is adjusted, it is possible to deflect an illuminant flux at a desired deflection angle in a desired direction.

In contrast, if a high-frequency voltage is applied between the transparent electrodes 76a and 76b in the liquid crystal deflecting element in FIG. 9A, there arises a diffraction lattice pattern in the direction orthogonal to the orientation direction of the liquid crystal 71. As a result, it is possible to obtain diffraction light in the direction orthogonal to the sheet of FIG. 9A. In this case, it is possible to obtain various diffraction angles by changing an envelope voltage of the high-frequency voltage.

The conventional liquid crystal deflecting element for deflecting an illuminant flux by an electronic signal has been described in the above.

The optical scanning apparatus according to the first embodiment uses such a conventional liquid crystal deflecting element as the light path deflecting part thereof to adjust optical spots through deflection of an illuminant flux. However, the light path deflecting part according to the embodiment is not limited to such a conventional liquid crystal deflecting element for deflecting an illuminant flux by an electronic signal. The liquid crystal deflecting element may be driven by a magnetic signal, which is not described above.

FIG. 6 is a perspective view of only an optical system being in the upper stream of the optical deflector in the optical scanning apparatus according to the present invention. The other parts being in the lower stream of the optical deflector have the same structure as that of FIG. 1.

Like the optical scanning apparatus in FIG. 1, an illuminant apparatus 18 in FIG. 6 comprises at least semiconductor lasers 11a and 11b and coupling lenses 12a and 12b. However, the illuminant apparatus 18 is not limited to this configuration. Also, the semiconductor lasers 11a and 11b may be formed of a single beam semiconductor laser having only one illuminant point or a multi-beam semiconductor laser (semiconductor laser array) having a plurality of illuminant points.

Laser light emitted from the semiconductor lasers 11a and 11b is coupled by the coupling lenses 12a and 12b in order to form two optical beams (laser beams) 21a and 21b. The two optical beams approach to each other and then is synthesized by a beam synthesizing prism 17 serving as a beam synthesizing part of the optical scanning apparatus.

The optical scanning apparatus having this configuration has some advantages. First, it is possible to position the illuminant more flexibly. Second, it is possible to make a cross angle θ smaller wherein the cross angle θ of two optical beams is determined with respect to the main scanning section around a deflecting reflection surface of the polygon mirror 14. Third, it is possible to integrally provide a control substrate for driving/controlling two semiconductor lasers.

In addition, when the illuminant apparatus comprises the semiconductor lasers 11a and 11b and the coupling lenses 12a and 12b, it is possible to easily obtain optical beam characteristics such as collimate property and optical axis direction in accordance with an optical system being in the lower stream of the optical deflector.

As is shown in FIG. 10, it is possible to adjust positions of the coupling lens 12a and 12b toward the semiconductor lasers 11a and 11b and then is fixed to the retention member 22 by using an ultraviolet sensitive adhesive through visual examination of beam characteristics of the optical beam 21 emitted from the semiconductor laser 11 mounted to a holding member 22.

Figure 11:
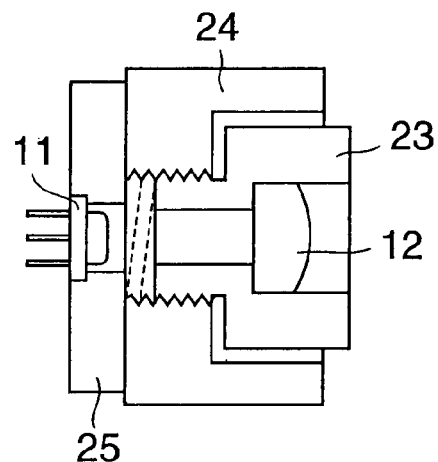
FIG. 11 is a perspective view of another illuminant of the optical scanning apparatus.

As is shown in FIG. 11, a male screw part of a lens cell 23 including the coupling lens 12 is joined to a female screw part of a holder member 24 so as to adjust positions of the semiconductors 11a and 11b with respect to the X direction (the horizontal direction in FIG. 11), that is, to adjust the collimate ratio. At the same time, positions of the semiconductor lasers 11a and 11b mounted to a base member 25 are adjusted with respect to the Y and Z directions (the vertical direction in FIG. 11 and the perpendicular direction to the sheet of FIG. 11). In other word, the projection direction of an optical beam is adjusted.

Such adjustment of the relative positions of the semiconductor lasers with the coupling lens is generally called "optical axis/collimate adjustment".

Figure 12:
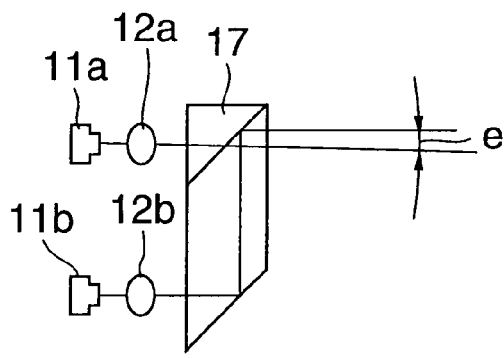
FIG. 12 is a diagram for explaining a synthesis error by a beam synthesizing prism.

As is shown in FIG. 12, there is a probability that there arises an error (an optical axis deviation: e) on synthesis accuracy of the optical beams 21a and 21b due to fabrication error and part error related to the inner refractive index of a beam synthesizing part (beam synthesizing prism 17). Furthermore, there may arise a difference between a desired value and an actual value with respect to the beam spot interval on the scanned surface 16 due to the optical axis deviation e.

For instance, it is assumed that the optical axis deviation e arises in the subscanning direction. In this case, the beam spot interval PZ with respect to the subscanning direction on the scanned surface 16 has the error ΔPZ in the following formula;

$$\Delta PZ = mZ \times fcol \times \tan(e),$$

where fcol is a focus distance of the coupling lens and mZ is a subscanning horizontal magnification of all the optical scanning systems from the illuminant to the scanned surface. In this formula, if mz=10, fcol=15 [mm] and e=2.9 [mrad], the error ΔPZ is obtained as follows;

$$\Delta PZ = 10 \times 15 \times \tan(2.9 \times 10-3) = 0.436 \text{ [mm]}.$$

Even if the beam synthesizing part has such synthesis accuracy, it is possible to perform the above "optical axis/collimate adjustment" for not only the illuminant but also the beam synthesizing part all together.

Figure 13:
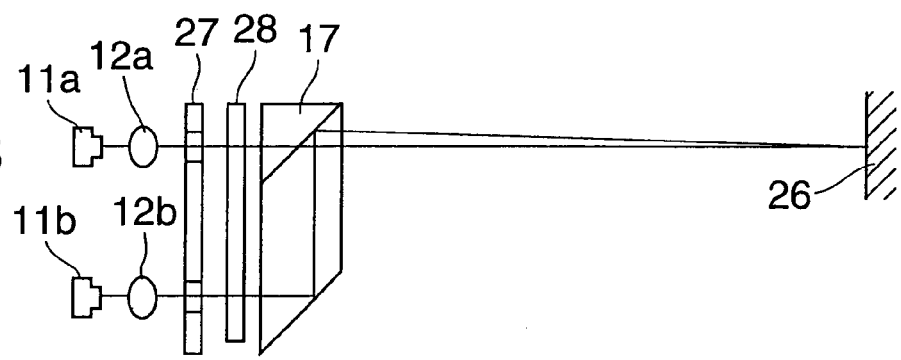
FIG. 13 is a diagram for explaining a correction method for correcting the synthesis error by the beam synthesizing prism.

As is shown in FIG. 13, when the optical axis/collimate adjustment is performed, for instance, the two optical beams 21a and 21b from the semiconductor lasers 11a and 11b are projected to a position sensor 26 for detecting the optical axis in a condition where the two optical beams 21a and 21b is passing through the beam synthesizing prism 17. As a result, it is possible to detect and correct an error caused by both the illuminant and the beam synthesizing prism 17.

Here, when the optical axis/collimate adjustment is performed, there often arises adjustment error. However, it is possible to correct the optical axis adjustment error by using the liquid crystal deflecting element 28 in the light path as mentioned above.

Figure 14:
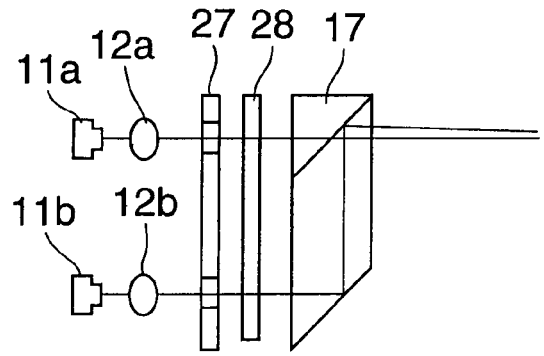
FIG. 14 is a diagram for explaining a position of an aperture member for shaping an optical beam.

In order to obtain a desired diameter of a beam spot on the scanned surface 16, an aperture for shaping the optical beam is often provided in the middle of the light path. For instance, an aperture member 27 having such apertures is provided in the upper stream (illuminant side) from the liquid crystal deflecting element 28 in the light path as shown in FIG. 13 and FIG. 14. As a result, it is possible to narrow an effective area of the liquid crystal deflecting element 28, that is, to miniaturize the size of parts therein. In addition, it is possible to narrow an optically satisfactory area in the liquid crystal deflecting element 28. As a result, it is possible to simplify the manufacturing process and improve the yield of the liquid crystal deflecting element 28.

Also, if the apertures for shaping the optical beam are formed on one of the entrance surface and the exit surface of the liquid crystal deflecting element 28, it is not necessary to separately provide an aperture member. As a result, it is possible to reduce the number of parts therein and position an aperture relatively to the effective area of the liquid crystal deflecting element 28 with accuracy.

Here, a silk screen process printing technique or the like is used to form the aperture on the entrance surface and the exit surface of the liquid crystal deflecting element 28.

The relative position of the semiconductor lasers 11a and 11b to the coupling lenses 12a and 12b fluctuates due to environmental changes (temperature, moisture and so on) and time passage. The fluctuation deteriorates alignment accuracy of beam spots on the scanned surface 16.

In this case, a beam spot array detecting part for detecting alignment of beam spots or scanning pitch on the scanned surface 16 is provided in the optical scanning apparatus 20. When the liquid crystal deflecting element 28 is driven/controlled (modulated) by an electronic signal based on detection results, it is possible to correct the fluctuation of the beam spot interval. For instance, the beam spot array detecting part is provided instead of the synchronization detection plate 19 in FIG. 1.

The liquid crystal deflecting element 28 is driven/controlled through a feedback system so that the detected alignment of beam spots can be located at a desired position. Also, if beam spot array fluctuation information due to the environmental variations and the time passage is available in advance, the liquid crystal deflecting element 28 may be driven/controlled based on a fluctuation table in a memory in the control system thereof.

Here, the beam spot array detecting part may be implemented with a detecting part of a multi-beam scanner according to Japanese Laid-Open Patent Application No. 09-325288.

Also, if a detecting part such as CCD (Charge Coupled Diode) is used instead of the beam spot array detecting part 19, it is possible to detect not only alignment of beam spots (relative positions between individual beam spots) on the scanned surface 16 but also absolute positions of the individual beam spots. As a result, it is possible to adjust the absolute positions of the beam spots by driving/controlling the liquid crystal deflecting element 28.

The optical scanning apparatus according to the first embodiment have been described heretofore. Although the description has concentrated on the 2-beam scanning apparatus, simultaneously emitted optical beams may be formed of a single beam or above three beams.

A description will now be given of an illuminant apparatus according to the present invention.

In the following, the X direction, the Y direction and the Z direction represent the direction along a light path (optical axis), the main scanning direction and the subscanning direction, respectively, like the above-mentioned optical scanning apparatus. Also, although the main scanning direction and the subscanning direction generally mean a direction where a beam spot scans a surface and a direction orthogonal to the main scanning direction, respectively, the main scanning direction and the subscanning direction according to this embodiment mean the main scanning direction and the subscanning direction with respect to individual spots in a light path, respectively.

Figure 15:
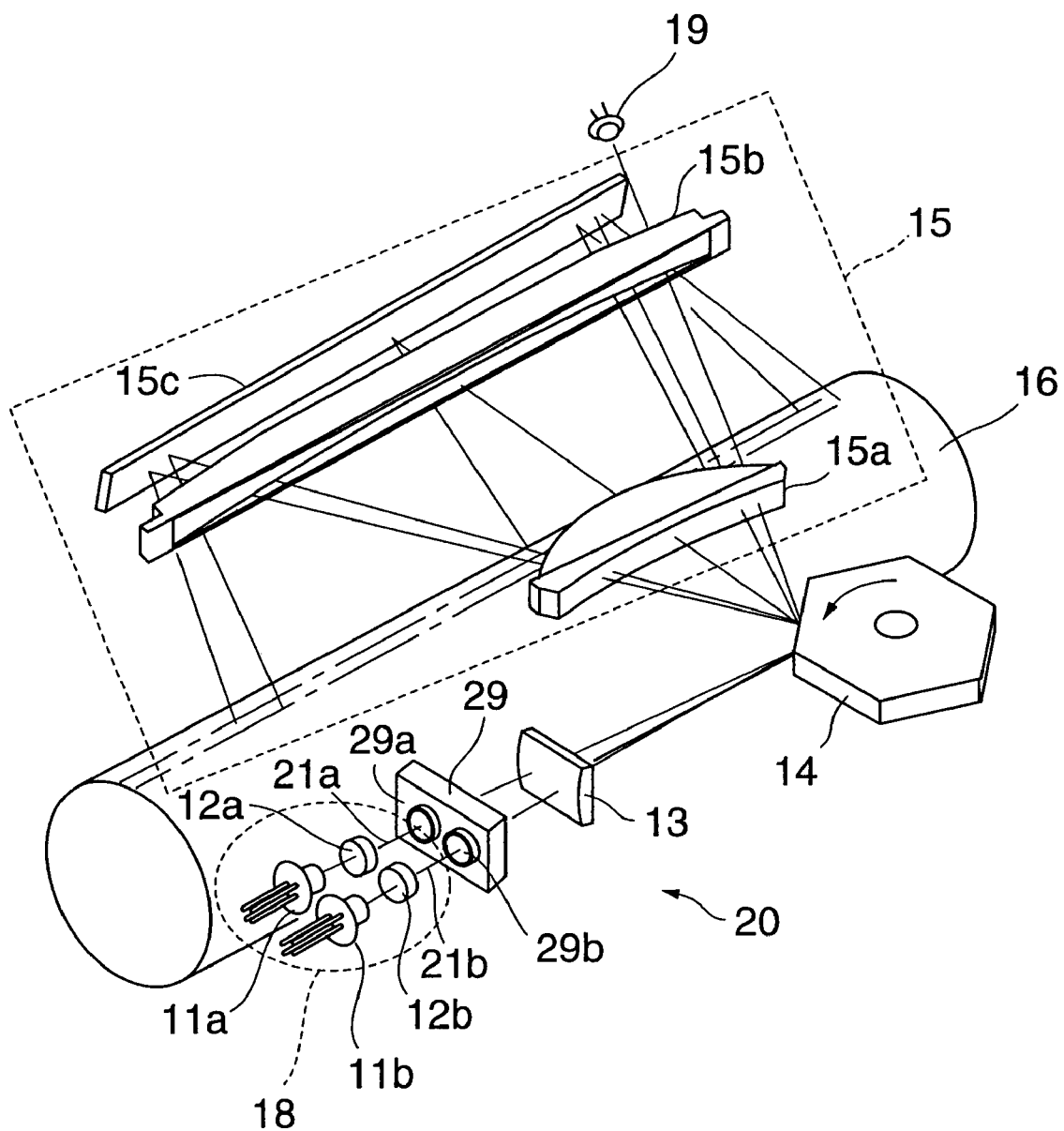
FIG. 15 is a perspective view of another optical scanning apparatus according to the present invention.
Figure 16:
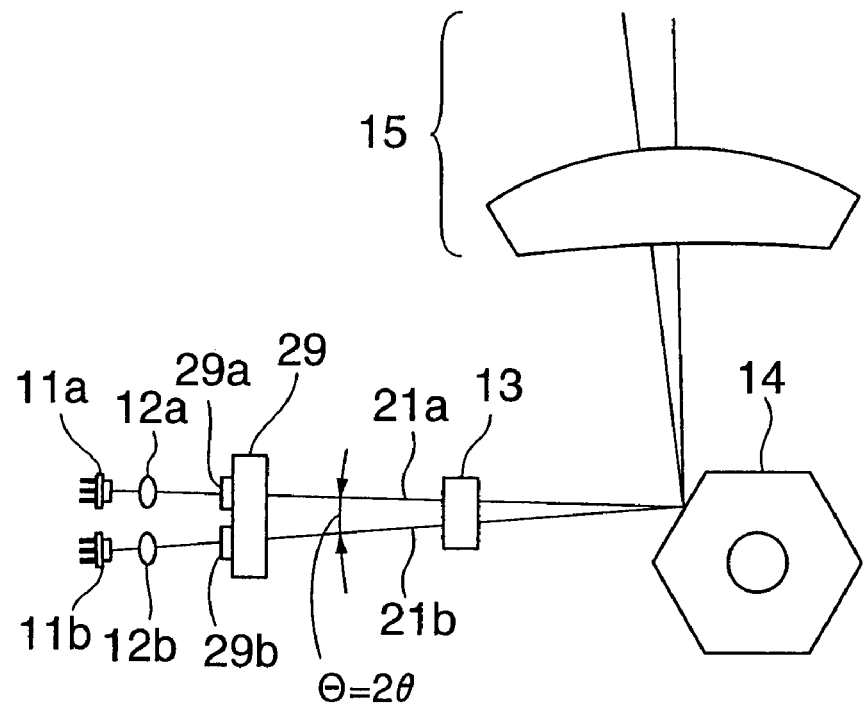
FIG. 16 is an outline plan view with respect to a main scanning section of the optical scanning apparatus.

FIG. 15 is a perspective view of the structure of an optical scanning apparatus according to this embodiment of the present invention. FIG. 16 is a plan view of primary parts in the optical scanning apparatus with respect to the main scanning section.

In FIG. 15 and FIG. 16, an illuminant apparatus 18 comprises two semiconductor lasers 11a and 11b, two coupling lenses 12a and 12b, and light path deflecting parts 29a and 29b. However, the illuminant apparatus 18 is not limited to this configuration. Also, the semiconductor lasers 11a and 11b may be formed of single beam semiconductor lasers having only one illuminant point or may be formed of multi-beam semiconductor lasers (semiconductor laser arrays) having a plurality of illuminant points.

The optical beams 21a and 21b are shaped into a linear form by a cylindrical lens 13, and the linear optical beam is projected on a deflecting reflection surface of a polygon mirror 14, which serves as a deflecting system for producing an optical beam that is concentrated on the subscanning direction and is linearly formed with respect to the main scanning direction. Then, the deflected linear optical beam is projected to a scanning optical system 15 comprising two scanning lenses 15a and 15b and a reflecting mirror 15c in order to provide beam spots for scanning a scanned surface 16, for instance, a photoreceptor drum.

In a case where an optical scanning apparatus 20 according to this embodiment is used as an optical writing part of an image forming apparatus, an optical beam is modulated corresponding to output image data. When the synchronization detection plate (synchronization detecting sensor) 19 detects the optical beam, an electronic signal (synchronization signal) is provided as the modulation start timing.

The two optical beams 21a and 21b entering a deflector (polygon mirror) 14 are not parallel with each other.

In this configuration, it is possible to obtain an interval PY of two beam spots on a scanned surface with respect to the main scanning direction. As a result, it is possible to detect the synchronization detection signals for the two optical beams separately through just the synchronization detection plate 19.

Conventionally, when the two optical beams are reflected on a deflecting reflection surface of the polygon mirror 14 and then enter an optical scanning system 15, the optical beams are formed as parallel optical fluxes, weak divergence optical fluxes or weak convergence optical fluxes. These optical fluxes serve to form beam waists in the vicinity of the scanned surface 16. Thus, in the case where the two optical beams entering the deflecting reflection mirror of the polygon mirror 14 are parallel with each other, that is, the case where the two optical beams entering the optical scanning system 15 are parallel with each other, the two optical beams cross around the scanned surface 16, that is, the beam pitch PY with respect to the main scanning direction becomes 0, under influences by the optical scanning system 15. As a result, it is impossible to separately obtain the synchronization detection signal.

In FIG. 16, the two optical beams cross by the angle Θ (=2θ) around the deflecting reflection surface of the polygon mirror 14, that is, the two optical beams are not parallel with respect to the main scanning section. Therefore, it is possible to not only separately detect the synchronization detection signal but also suppress differences of optical characteristics such as field curvature and magnification errors between the two optical beams.

Here, if the optical scanning system 15 can perform uniform scanning motion (fθ characteristic), the beam spot interval with respect to the main scanning direction PY is as follows;

$$PY = FY \times \Theta,$$

where FY is a focus distance with respect to the main scanning direction of the optical scanning system 15.

For instance, if FY=220 [mm] and E=1°=0.01745 [rad], the beam spot interval PY is given as follows;

$$PY = FY \times \Theta = 220 \times 0.01745 = 3.8 \text{ [mm]}.$$

Therefore, even if a reasonable synchronization detection sensor is used, it is possible to separately detect the synchronization detection signals of the two optical beams.

Figure 4:
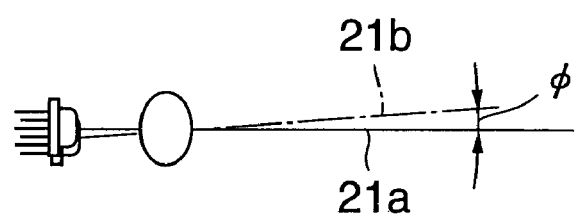
FIG. 4 is a diagram illustrating an angle between the two optical beams emitted from an illuminant of the optical scanning apparatus.

As mentioned above, the two beam spots BS1 and BS2 are required to maintain a predetermined interval (beam pitch: PZ) with respect to the subscanning direction on the scanned surface 16 in accordance with the scanning density. In order to set the beam pitch PZ, it is necessary to adjust an angle φ between the two optical beams 21a and 21b as shown in FIG. 4. It is supposed that subscanning magnification of the entire optical scanning system is notated by mZ and the focus distance of the coupling lens is notated by fcol. Then, the beam spot pitch PZ is given as follows;

$$PZ = mZ \times fcol \times \tan \phi.$$

Since the angle φ is enough small, tan φ may approximate the value φ. Thus, the above formula is rewritten as follows;

$$PZ = mZ \times fcol \times \phi.$$

Here, there is a probability that the beam spot pitch PZ varies under the influences by environmental fluctuations and time passage. The illuminant apparatus according to this embodiment intends to correct the beam spot pitch PZ.

As is shown in FIG. 15 and FIG. 16, an optical path deflecting part is integrally formed of optical deflecting elements 29a and 29b that can be individually controlled. The optical path deflecting part is provided in light paths of the two optical beams 21a and 21b. A wedge-shaped prism 30, which is to be mentioned later, is used as the light path deflecting element of the optical scanning apparatus shown in FIG. 15 and FIG. 16.

Figure 17:
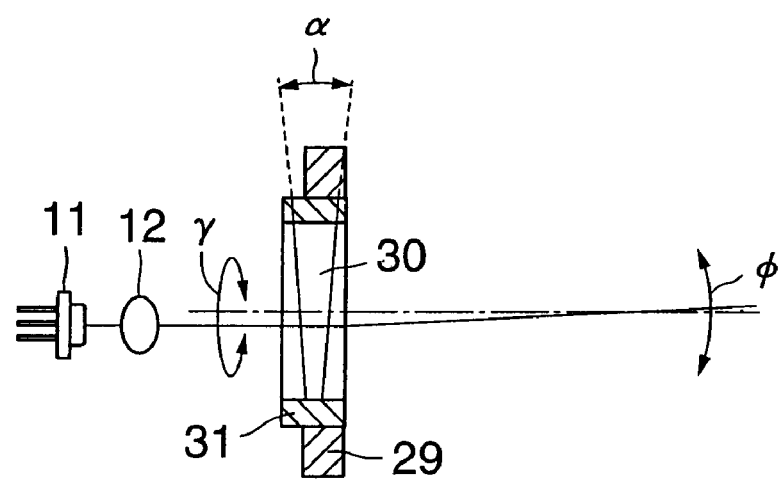
FIG. 17 is an outline sectional view of a light path deflecting element formed of a wedge-shaped prism in the optical scanning apparatus.

FIG. 17 is an enlarged view of the light path deflecting element (wedge-shaped prism unit) formed of the wedge-shaped prism 30 being a transmission optical element.

In the light path deflecting element, the wedge-shaped prism 30 is inserted into a ring ultrasound motor 31 driven by a piezoelectric element. When the ring ultrasound motor 31 causes rotation in the directions shown by the arrow γ in FIG. 17, it is possible to deflect optical beams in the directions as shown by the arrow φ, that is, to deflect the optical beams with respect to the subscanning direction. When two light path deflecting elements 29a and 29b formed of such a wedge-shaped prism unit are mounted to the common holding member 29 as shown in FIG. 15 and FIG. 16, the two light path deflecting elements 29a and 29b are integrated into the illuminant apparatus. As a result, it is possible to implement the illuminant apparatus 18 capable of deflecting an optical beam without increasing the size of the illuminant apparatus 18.

In the case where the above-mentioned ring ultrasound motor 31 is used, it is possible to not only adjust the light paths by the order of a nano meter nm or a micro meter µm but also maintain the adjusted condition even in power OFF because of strong retention of the holding member 29.

In the optical beam 21a, if an angle of the wedge-shaped prism 30, an internal refractive index, a rotational angle and a deflection angle are notated as αa, na, γa and φa, respectively, the deflection angle φa is computed as follows;

$$\phi a = (na-1) \times \alpha a \times \sin \gamma a.$$

Therefore, the moving distance Za of a beam spot on the scanned surface corresponding to the optical beam 21a is given as follows;

$$Za = mZ \times fcol \times \phi a = mZ \times fcol \times (na-1) \times \alpha a \times \sin \gamma a.$$

For instance, it is supposed that na=1.5, mZ=9.5, fcol=15 [mm], αa=1°=0.01745 [rad]. In this supposition, the moving distance Za is computed as follows;

$$Za = mZ \times fcol \times \phi a = mZ \times fcol \times (na-1) \times \alpha a \times \sin \gamma a$$
$$= 9.5 \times 15 \times (1.5-1) \times 0.01745 \times \sin \gamma a$$
$$= 1.24 \times \sin \gamma a.$$

If the angle γa changes from −90° to +90° here, the beam spot on the scanned surface moves by the distance ±1.24 [mm].

On the other hand, the moving distance Zb of a beam spot on the scanned surface corresponding to the optical beam 21b is computed as follows;

$$Zb = mZ \times fcol \times \phi b = mZ \times fcol \times (nb-1) \times \alpha b \times \sin \gamma b.$$

Here, if it is supposed that na=nb=n and αa=αb=α, the angle φ is given as follows;

$$\phi = \phi a - \phi b = (n-1) \times \alpha \times (\sin \gamma a - \sin \gamma b).$$

In the above formula, if the values γa and γb are appropriately provided, it is possible to set PZ as a desired value. Here, in order to deflect the resulting optical beam, both of the two optical beams may be deflected or one of the two optical beams may be deflected.

Figure 18A:
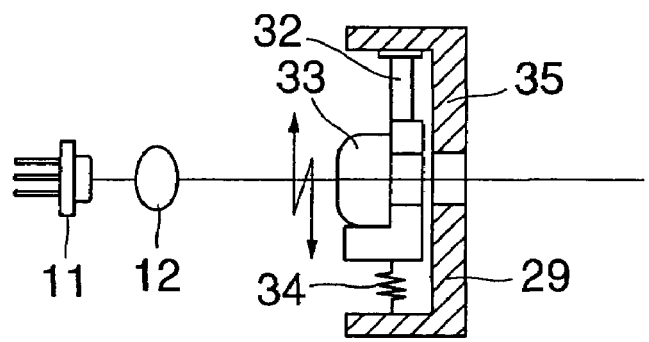
FIGS. 18A through 18C are diagram for explaining another light path deflecting element formed of a cylindrical lens in the optical scanning apparatus.
Figure 18B:
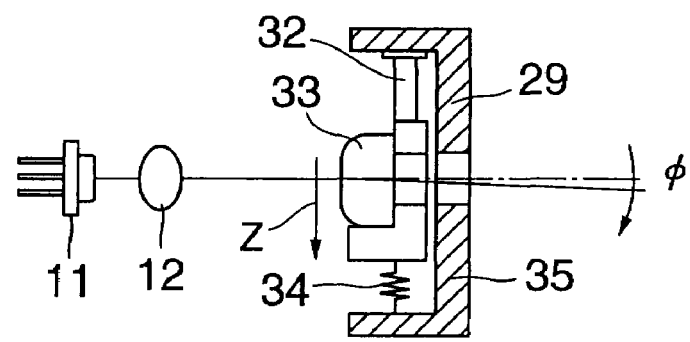
Figure 18C:
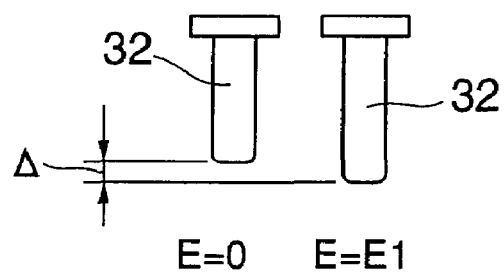

FIGS. 18A through 18C show an example where a cylindrical lens being the transmission optical element is used as the light path deflecting part of the optical scanning apparatus according to the present invention.

As is shown in FIG. 18A, a lens holder 35 is provided between an elastic member (coil spring) 34 and a piezoelectric element 32 in the inner side of the holding member 29, and a cylindrical lens 33 is mounted to the lens holder 35. If a voltage is applied to the piezoelectric element 32, there arises displacement Δ as shown in FIG. 18C. Here, if the cylindrical lens 33 is shifted along the subscanning section in the direction as shown by the arrow Z shown in FIG. 18B, it is possible to deflect an optical beam in the direction shown by the arrow φ.

When two light path deflecting elements 29a and 29b formed of the cylindrical lens units are mounted to the common holding member 29 as shown in FIG. 15 and FIG. 16 and are integrally provided to the illuminant apparatus 18, it is possible to implement the illuminant apparatus 18 capable of deflecting an optical beam without increasing the size of the illuminant apparatus 18.

In the above-mentioned two examples related to the wedge-shaped prism and the cylindrical lens, a piezoelectric element works as an actuator of the light path deflecting element. However, a pulse motor that rotates by a predetermined angle through an input pulse signal may be used as the actuator of the light path deflecting element, or another type pulse motor that moves straight at a predetermined distance through an input pulse signal may be used as the actuator thereof.

In such a pulse motor, since the angle can be changed proportionately to the step number of the input pulse signal, it is possible to easily obtain a desired adjustment value, in some cases, under open-loop control. In addition, since a pulse motor is more popularly used than an ultrasound motor at present, the pulse motor is available at reasonable cost. Thus, if the pulse motor is used as the actuator instead of the ultrasound motor, it is possible to reduce fabrication cost of the illuminant apparatus.

A description will now be given, with reference to FIGS. 19A and 19B, of another light path deflecting element according to the present invention. A reflection optical element is used in the light path deflecting element of the optical scanning apparatus according to this embodiment.

Figure 19A:
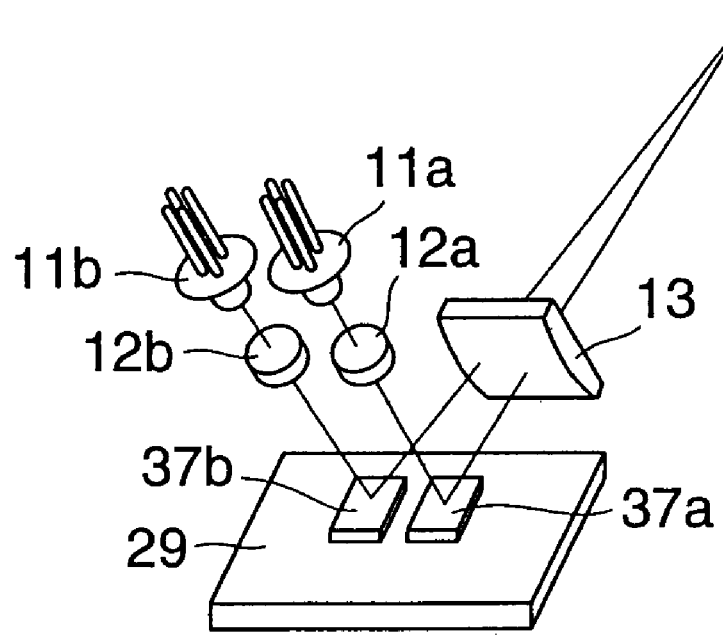
FIGS. 19A and 19B are diagram for explaining further another light path deflecting element formed of a reflective optical element in the optical scanning apparatus.
Figure 19B:
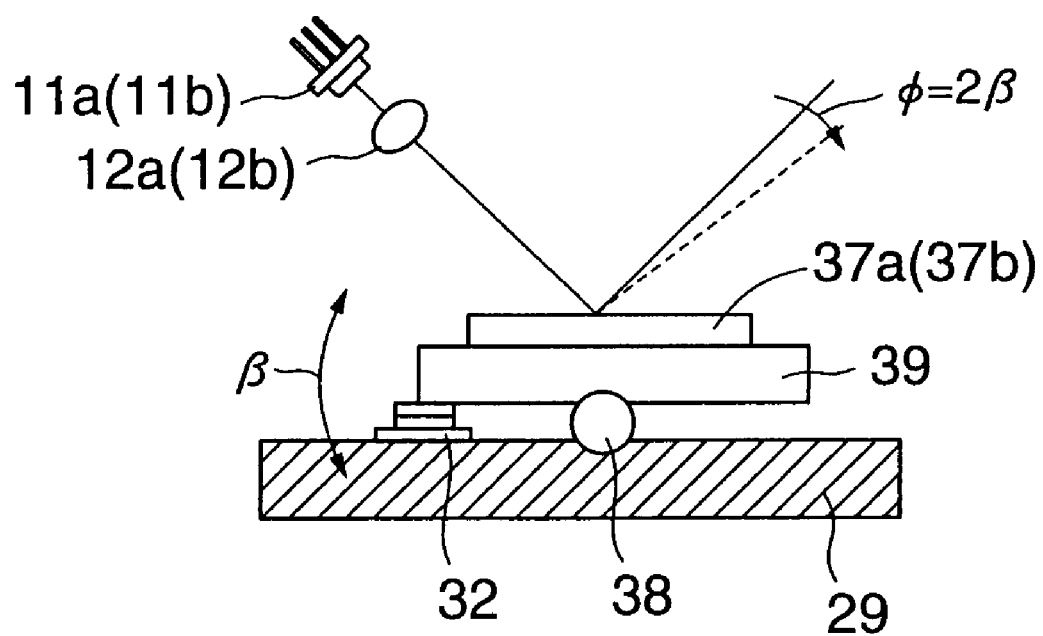

FIG. 19A shows an optical system being in the upper steam side of the optical deflector 14 in the case where reflection optical elements are used as light path deflecting elements of the optical scanning apparatus shown in FIG. 15 and FIG. 16. FIG. 19B is an enlarged view of one of the light path deflecting elements.

Reflection mirrors 37a and 37b are used in the light path deflecting elements. Since the piezoelectric element 32 causes displacement proportionate to an impressed voltage, the reflection mirror 37 mounted to a mirror holder 39 rotates on a roller 38 in the direction pointed at by the arrow β. As a result, it is possible to deflect an optical beam by the angle φ=2×β

Such reflection mirror units are mounted to the common holding member 29 and are integrally provided to the illuminant apparatus 18.

When such a reflection optical element is used in the light path deflecting element, it is possible to set a larger beam deflection angle than a transmission optical element. As a result, it is possible to extend an adjustment range of a beam spot position.

A description will now be given, with reference to FIGS. 20A and 20B, of a light path deflecting element of the illuminant apparatus according to the present invention. In this embodiment, a liquid crystal element (liquid crystal deflecting element) is used in the light path deflecting element.

Figure 20A:
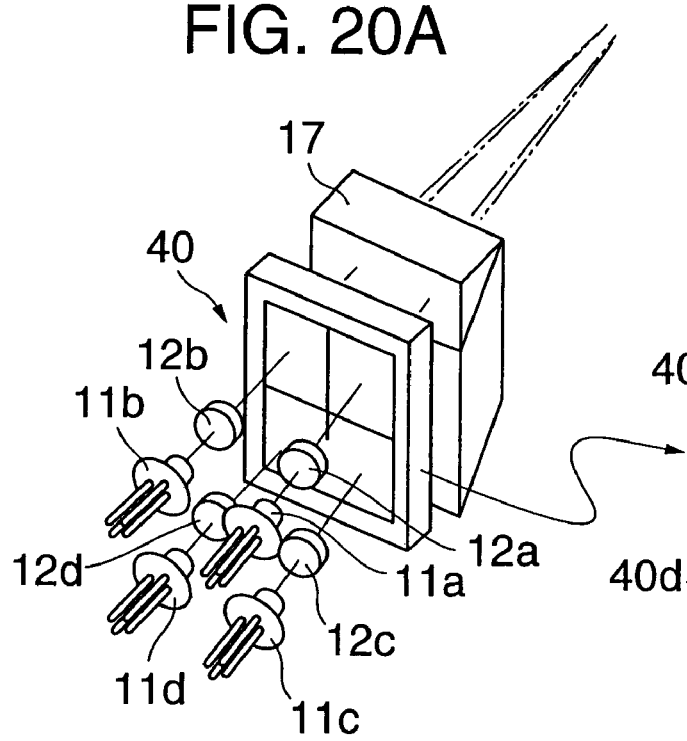
FIGS. 20A and 20B are diagram for explaining further another light path deflecting element formed of a liquid crystal element in the optical scanning apparatus.
Figure 20B:
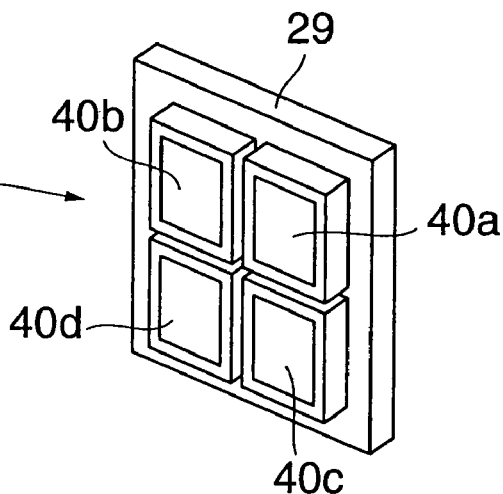

FIGS. 20A and 20B handle a 4-beam illuminant apparatus in which four optical beams from illuminants are synthesized by a beam synthesizing prism to be mentioned later. In FIG. 20A, a liquid crystal element 40 driven by an electronic signal is provided in the upper stream side (illuminant side) of the beam synthesizing prism 17 in a light path as a light path deflecting element. A light transmission part of the liquid crystal element 40 is divided into four parts and the four parts (effective areas) can be independently controlled. In FIG. 20B, four liquid crystal elements 40a through 40d are mounted to the holding member 29.

If a plurality of photoreceptor drums as the scanned surface 16 have distinct sensitivity characteristics (wavelength dependence), semiconductor lasers in the illuminant apparatus need to have distinct oscillation wavelength in accordance with the corresponding photoreceptor drums. In this case, it is necessary to provide a liquid crystal element having the wavelength dependence corresponding to the oscillation wavelength. If the liquid crystal elements 40a through 40d are mounted to the common holding member 29 as shown in FIG. 20B, it is possible to freely deflect distinct laser beams.

In a liquid crystal element whose wavelength dependence is low, that is, which is applicable to a wide range of wavelength, one liquid crystal element 40 can provide a plurality of effective areas each of which can independently be modulated in accordance with individual optical beams.

Conventionally, light path deflecting means have been proposed based on the following methods. The first method is related to a mechanical approach. In this method, for instance, an optical beam is deflected by moving a mirror or a prism in the light path thereof. The second method is related to an approach by means of an electrooptic element. In this method, an optical beam is deflected by using material characteristics of an electrooptic element to change the refractive index of a prism. The third method is related to an approach by means of acousto-optic element. In this method, for instance, an optical beam is deflected by generating a diffraction grating in a piezoelectric body through an ultrasonic wave.

However, any of these methods has some disadvantages. For instance, when the methods are applied to an illuminant apparatus, it is impossible to avoid to scale up the structure thereof. Also, there arise vibration, noise and heat in the illuminant apparatus. In addition, it is hard to drive the illuminant apparatus at a low voltage.

However, when a light path deflecting element (liquid crystal deflecting element) formed of the liquid crystal elements 40a through 40d is used as a light path deflecting part for deflecting an optical beam, it is possible to miniaturize an illuminant apparatus having such a light path deflecting element, suppress vibration and the like, and drive the illuminant apparatus at a low voltage.

Here, the detailed description of the liquid crystal element is omitted because the liquid crystal deflecting element according to this embodiment is similar to the liquid crystal deflecting element provided in FIGS. 5A and 5B or a conventional liquid crystal element described with reference to FIG. 7 through FIG. 9.

Figure 21:
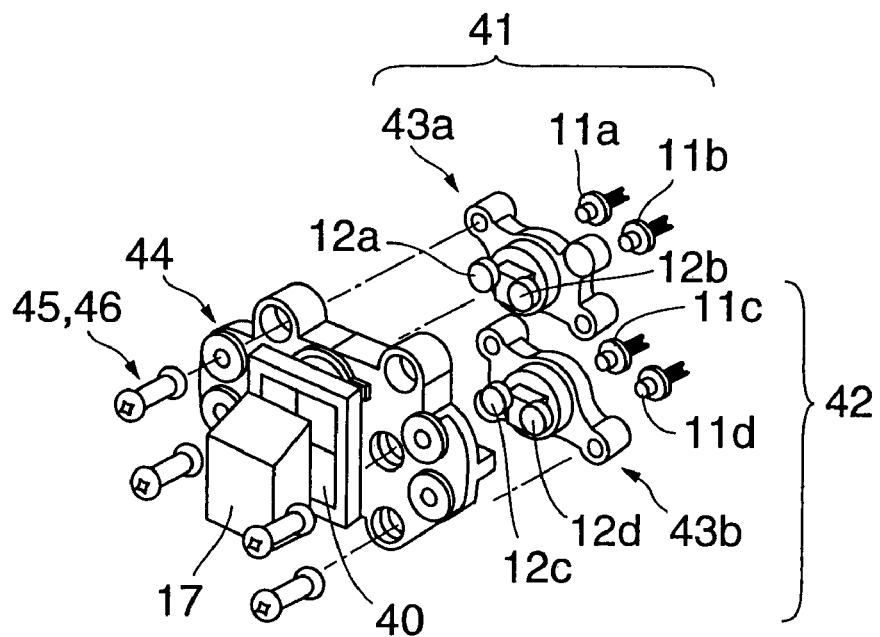
FIG. 21 is a perspective view of an illuminant apparatus according to the present invention.

FIG. 21 is a perspective view of another illuminant apparatus according to the present invention wherein the illuminant apparatus has the similar structure of the lower stream of the cylindrical lens 13 to that in FIG. 15.

As is shown in FIG. 21, the illuminant apparatus comprises a first illuminant part 41 formed of at least two pairs of a semiconductor laser 11a and the corresponding coupling lens 12a and a semiconductor laser 11b and the corresponding coupling lens 12b and a base member 43a for integrally holding these parts in one line in the main scanning direction, a second illuminant part 42 formed of at least two pairs of a semiconductor laser 11c and the corresponding coupling lens 12c and a semiconductor laser 11d and the corresponding coupling lens 12d and a base member 43b for integrally holding these parts in one line in the main scanning direction, a beam synthesizing part (beam synthesizing prism) 17 for synthesizing a plurality of optical beams emitted from the first and the second illuminant parts 41 and 42 and emitting the synthesized optical beams, and a light path deflecting element 40 such as a liquid crystal element provided between the first and the second illuminant parts 41 and 42 and the beam synthesizing part 17.

Laser light emitted from four semiconductor lasers 11a through 11d are coupled by the corresponding coupling lenses 12a through 12d to be four optical beams 21a through 21d. The two beams 21a and 21b emitted from the first illuminant part 41 approach the two beams 21c and 21d emitted from the second illuminant part 42 and then the four beams are synthesized by the beam synthesizing prism 17.

The illuminant apparatus according to this configuration has some advantages. First, the illuminants can be positioned more flexibly. Second, it is possible to make the cross angle Θ between the two optical beams smaller with respect to the main scanning section around a deflecting reflection surface of the polygon mirror 14. Third, it is possible to integrally provide a control substrate for driving/controlling the four semiconductor lasers. Fourth, when the illuminant apparatus and the optical scanning apparatus according to this embodiment are assembled, it is possible to easily adjust the beam pitch on the scanned surface with respect to the subscanning direction.

The base members 43a and 43b are fixed to a flange 44 with a screw 45 and a washer 46. Also, the liquid crystal element 40 is fixed to the flange 44 with some adhesive processes. The beam synthesizing prism 17 is fixed to another holding member that is not illustrated.

A liquid crystal element can be used as a light path deflecting element in the 4-beam illuminant apparatus like FIGS. 20A and 20B. FIGS. 22A and 22B show an example of a 4-beam illuminant apparatus in which a wedge-shaped prism is used as a light path deflecting element.

In FIGS. 22A and 22B, a plurality of wedge-shaped prisms (light path deflecting elements) 30a through 30d are mounted to the common holding member 29 via ring ultrasound motors 31a through 31d similarly to FIG. 17.

When the ring ultrasound motors 31a through 31d separately rotate the wedge-shaped prism 30a through 30d, it is possible to independently adjust positions of four beam spots on the scanned surface 16.

Here, whichever type of light path deflecting element is used, all the four beam spots are not adjusted in the above-mentioned fashion. If one of the four beam spots is specified as a reference beam spot, the other three beam spots may be adjusted relatively to the reference beam spot. In this case, it is possible to omit the beam deflecting element corresponding to the reference beam spot and the actuator for driving the beam deflecting element.

FIG. 23A shows an example of an optical scanning apparatus where the illuminant apparatus shown in FIG. 21 are combined with an optical scanning system. FIG. 23B shows an example of alignment of beam spots on the scanned surface 16.

In this configuration shown in FIG. 23A, it is not necessary to position light paths prior to the optical deflector in parallel with each other in order to secure intervals Q1 through Q3 in the main scanning direction of beam spots BSa through BSd on the scanned surface 16. As is shown in FIG. 23A, for instance, the cross angles Θ1 through Θ3 are set to cross four optical beams around the deflecting reflection surface of the optical deflector 14. Then, the relationship between the cross angles and the intervals satisfies the following formula;

$$Qj = FY \times \Theta j \; (j=1, 2, 3).$$

In addition, if the illuminant apparatus is formed of semiconductor lasers and coupling lenses as mentioned above, it is possible to easily gain optical beam characteristics such as collimate property and optical axis direction in accordance with the optical system in the lower stream.

As is shown in FIG. 10, for instance, the positions of the coupling lenses 12a through 12d are adjusted toward the semiconductor lasers 11a through 11d based on observation results of beam characteristics regarding the optical beams 21a through 21d emitted from the semiconductor lasers 11a through 11d mounted to the base member 22 as mentioned in FIG. 10. Then, the coupling lenses 12a through 12d are fixed to the base member 25 by using ultraviolet sensitive adhesive. As a result, it is possible to easily gain optical beam characteristics.

Furthermore, as is shown in FIG. 11, the relative position is adjusted with respect to the X direction (horizontal direction in FIG. 10; collimate adjustment) by joining a male screw of the lens cell 23 including the coupling lens 12 to a female screw of the holder member 24. The relative positions of the semiconductor lasers 11a through 11d are adjusted with respect to the Y direction and the Z direction.

Such adjustment of the relative positions between the semiconductor lasers and the coupling lenses is often called optical axis/collimate adjustment. In general, the optical axis/collimate adjustment entails an adjustment error. However, if a light path deflecting element according to this embodiment is provided in a light path, it is possible to correct the optical axis adjustment error.

Figure 24:
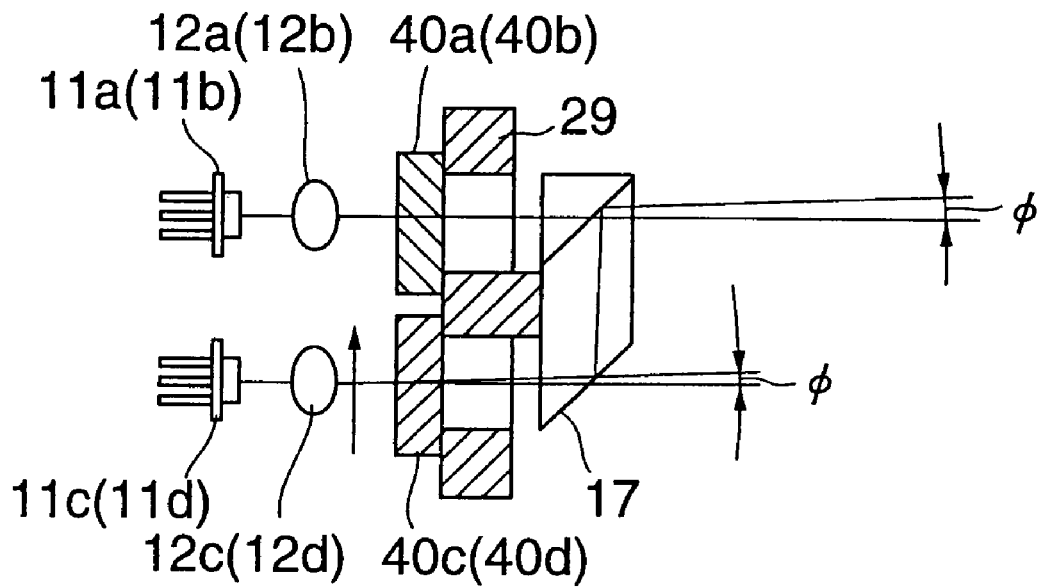
FIG. 24 is a diagram for explaining an optical axis setting method for setting the optical axis in another illuminant apparatus according to the present invention.

Furthermore, as is shown in FIG. 24, if the optical axis of the coupling lens 12c (12d) is shifted by the distance $\delta z$ from the projection axis of the semiconductor laser 11c (11d), it is possible to set the optical axis having the angle $\phi$ with respect to the subscanning direction. The relationship between $\delta z$ and $\phi$ is represented as follows;

$$\delta z = fcol \times \tan \phi,$$

where fcol is the focus distance of the coupling lens 12c (12d).

Here, the above-mentioned semiconductor laser may be formed of a single beam semiconductor laser having a single illuminant point or may be formed of a multi-beam semiconductor laser (semiconductor laser array) having a plurality of illuminant points.

Figure 25:
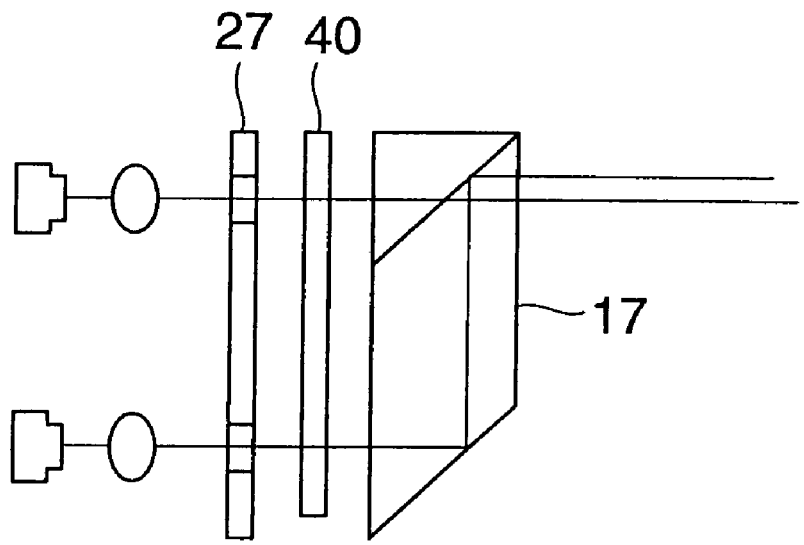
FIG. 25 is a diagram for explaining an aperture member for shaping an optical beam in the illuminant apparatus.

In order to obtain a desired diameter of a beam spot on the scanned surface, an optical beam is often shaped by providing an aperture in the middle of the light path. As is shown in FIG. 25, an aperture member 27 having such an aperture is provided in the upper stream side (illuminant side) of a light path deflecting element such as a liquid crystal element 40 in the light path of the optical beam.

In this configuration, it is possible to narrow an effective area of the light path deflecting element, that is, to avoid to increase the size of parts. Furthermore, it is possible to narrow an optically satisfactory area in the light path deflecting element 40, that is, to simplify the fabrication process and improve the yield of the fabrication process.

In addition, if the light path deflecting element such as the liquid crystal element 40 does not move (parallel shift and rotation), it is unnecessary to add the above-mentioned aperture member for shaping an optical beam on the entrance surface or the exit surface of the light path deflecting element. As a result, it is possible to reduce the number of parts and accurately position the aperture relatively to the effective area of the light path deflecting element.

The aperture can be provided on the entrance surface and the exit surface of the light path deflecting element by using silk screen printing method and the like.

When the relative positions (adjustment value) between individual semiconductor lasers and coupling lenses vary under influences by environmental changes and time passage, there is a probability that misalignment of beam spots arises on the scanned surface.

Even in this case, if a beam spot array detecting part for detecting positions of the beam spots or the scanning line pitch on the scanned surface 16 is provided in the optical scanning apparatus including the above-mentioned illuminant apparatus and an optical beam deflecting element is driven/controlled (modulate) by an electronic signal based on detection results, it is possible to correct variations of the beam spot pitch.

Such a beam spot array detecting part can be provided instead of the synchronization detection plate 19 in FIG. 15.

The light path deflecting element may be driven/controlled through a feedback system so that the beam spot array can have a desired value. Also, when correspondence information between the environmental changes/time passage and the beam spot array variations is obtained in advance, the correspondence table in which variations of the beam spot array are described for individual types of the environmental changes and amounts of the elapsed time is prepared in a memory of the control system of the apparatus. Based on the correspondence table, the light path deflecting element may be driven/controlled.

The beam spot array detecting part 19 can be implemented with a detecting part of a multi-beam scanning apparatus according to Japanese Laid-Open Patent Application No. 09-325288.

Also, if a detecting part of CCD is used as the beam spot array detecting part 19, it is possible to detect not only the beam spot array (relative positions between individual beam spots) on the scanned surface 16 but also absolute positions of the individual beam spots. As a result, the absolute positions of the beam spots can be adjusted by driving/controlling the light path deflecting element.

In the above description, the 2-beam illuminant apparatus and the 2-beam scanning apparatus and the 4-beam illuminant apparatus and the 4-beam scanning apparatus have been described. However, the illuminant apparatus and the optical scanning apparatus according to the present invention may have an arbitrary number of optical beams.

A description will now be given of another optical scanning apparatus according to the present invention.

In the following, the X direction, the Y direction and the Z direction represent the direction along a light path (optical axis), the main scanning direction and the subscanning direction, respectively, like the first and the second embodiments. Also, although the main scanning direction and the subscanning direction generally mean the direction where a beam spot scans a surface and the direction orthogonal to the main scanning direction, respectively, the main scanning direction and the subscanning direction in this embodiment mean the main scanning direction and the subscanning direction with respect to individual spots in a light path, respectively.

Figure 26A:
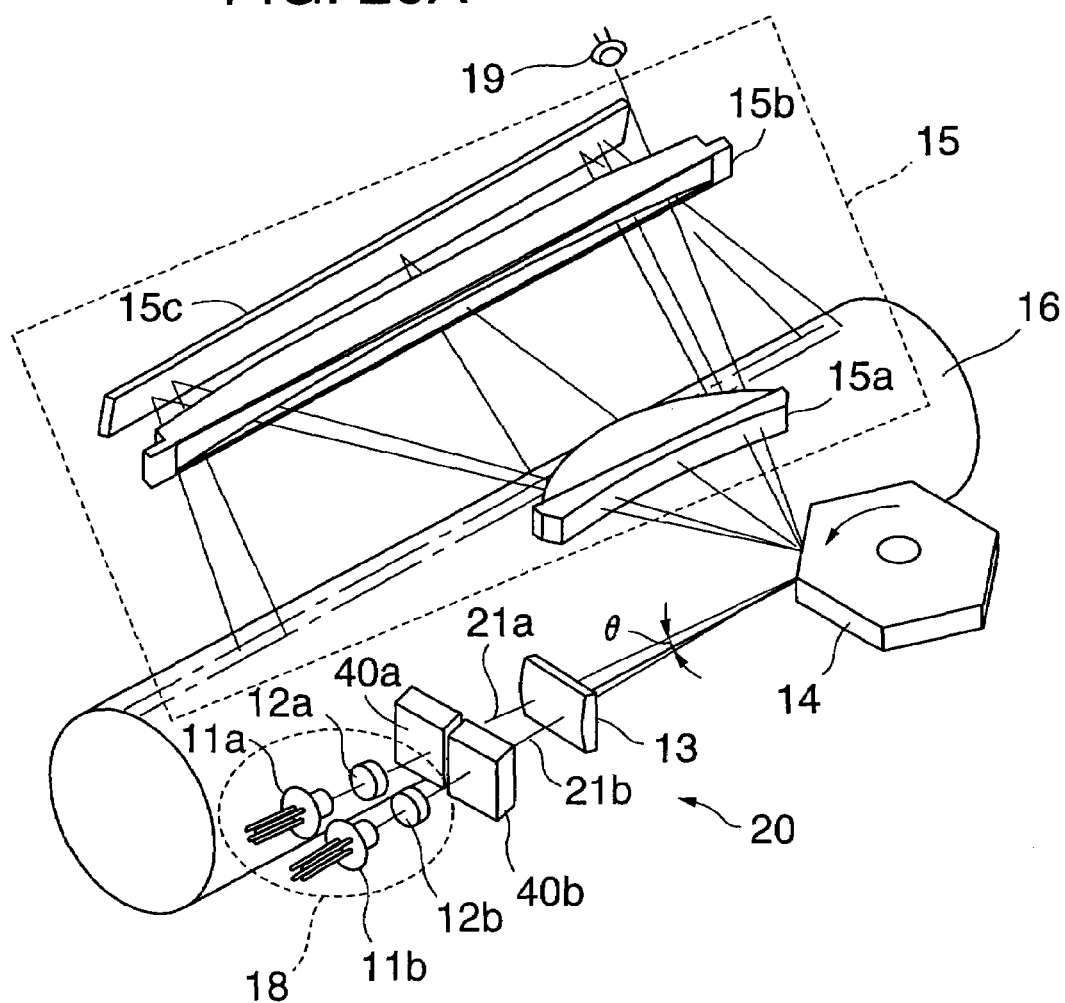
FIG. 26A is a perspective view of another optical scanning apparatus according the present invention.
Figure 26B:
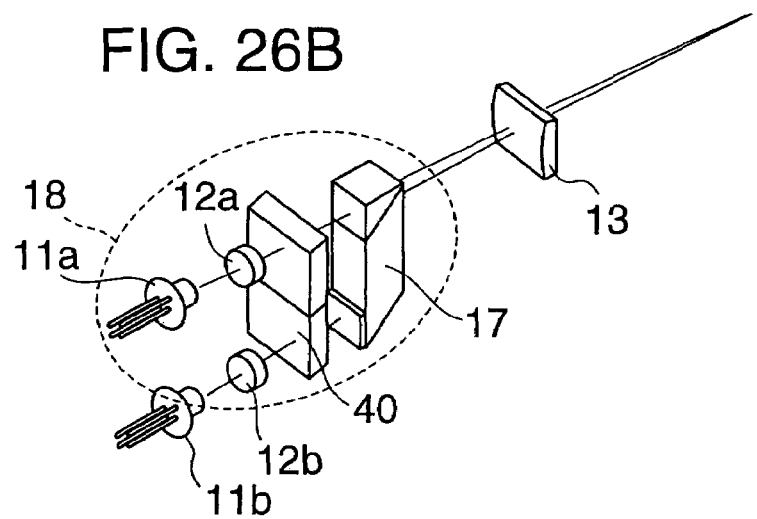
FIG. 26B is a perspective view of a variation of the optical scanning apparatus.

FIG. 26A is a perspective view of an optical scanning apparatus according to this embodiment. FIG. 26B is a perspective view of an illuminant apparatus according to this embodiment wherein a beam synthesizing prism 17 is provided behind a coupling lenses 12a and 12b as the beam synthesizing part.

In FIGS. 26A and 26B, the illuminant apparatus 18 comprises at least two pairs of the semiconductor laser 11a and the coupling lens 12a and the semiconductor laser 11b and the coupling lens 12b. However, the illuminant apparatus 18 is not limited to this configuration. Also, the semiconductor lasers 11a and 11b may be formed of a single beam semiconductor laser having a single illuminant point or be formed of a multi-beam semiconductor laser (semiconductor laser array) having a plurality of illuminant points.

Laser light emitted from the semiconductor lasers 11a and 11b are coupled by the coupling lenses 12a and 12b to be two optical beams (laser beams) 21a and 21b.

The optical beams 21a and 21b are shaped into a linear form by a cylindrical lens 13, and the linear optical beams are projected on a deflecting reflection surface of a polygon mirror 14, which serves as a deflecting system, in order to produce optical beams that are concentrated on the subscanning direction and are linearly formed with respect to the main scanning direction. Then, the deflected linear optical beams are projected to an optical scanning system 15. The optical scanning system 15 comprises two scanning lenses 15a and 15b and a reflecting mirror 15c in order to provide a beam spot for scanning a scanned surface 16, for instance, a photoreceptor drum.

In a case where an optical scanning apparatus 20 according to this embodiment is used as an optical writing apparatus in an image output apparatus, an optical beam is modulated corresponding to output image data. When the optical beam enters a synchronization detection plate (synchronization detecting sensor) 19, an electronic signal (synchronization signal) is provided as the modulation start timing signal.

Although the illuminant apparatus in FIG. 26A has no beam synthesizing part such as the beam synthesizing prism 17 unlike that in FIG. 26B, two optical beams cross by the angle Θ around a deflecting reflection surface of the polygon mirror 14. Thus, the illuminant apparatus in FIG. 26A is considered to have the beam synthesizing part in a broad sense. Furthermore, in this illuminant apparatus, it is possible to not only separately detect a synchronization detection signal but also reduce differences of optical characteristics such as curvature field and magnification error between two optical beams.

In FIG. 26A, an optical scanning apparatus has a light path deflecting part behind the coupling lenses 12a and 12b so as to control positions of the optical beams on the scanned surface 16.

Although liquid crystal elements (liquid crystal deflecting elements) 40a and 40b controlled by an electronic signal are used as the light path deflecting part of the optical scanning apparatus in FIG. 26A, optical beams are deflected by driving the liquid crystal deflecting elements 40a and 40b in order to control beam spot positions on the scanned surface 16. Here, the liquid crystal elements may be separately provided as shown in FIG. 26A or be integrally provided as shown in FIG. 26B.

Figure 27:
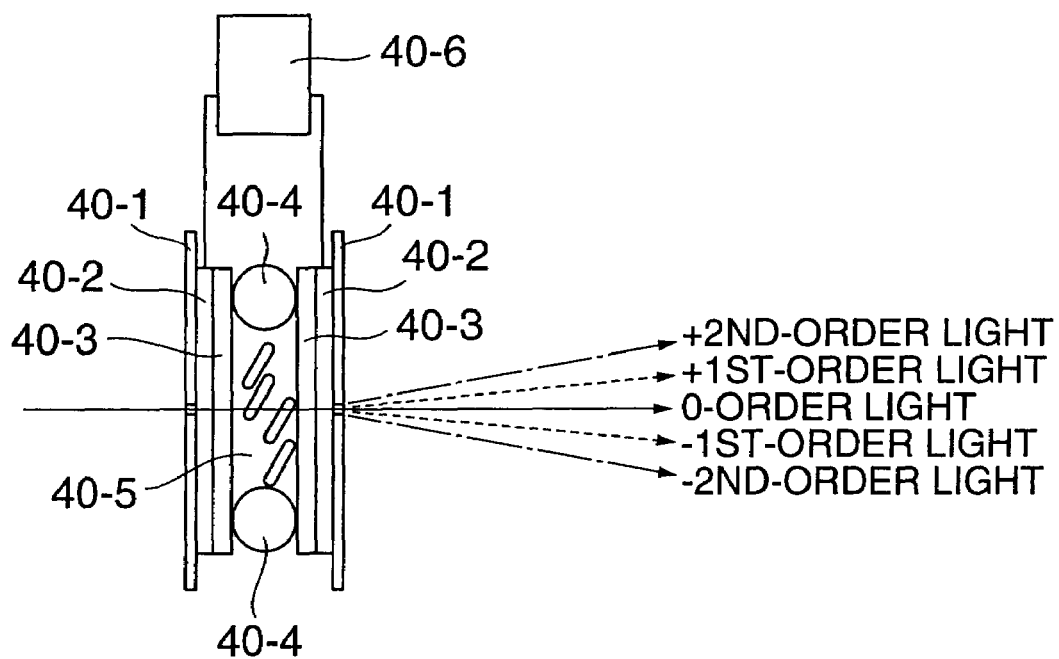
FIG. 27 is a diagram for explaining generation of ghost light in a liquid crystal element.

FIG. 27 shows an example of the structure of a liquid crystal deflecting element 40. The liquid crystal deflecting element 40 comprises two transparent glass substrates 40-1 on which transparent electrodes 40-2 and orientation films 40-3 are formed, spacers 40-4, and liquid crystal 40-5. The two glass substrates 40-1 are provided so that the orientation films can face on each other. The spacers 40-4 are provided between the glass substrates 40-1. The liquid crystal 40-5 fills the space between the two glass substrates 40-1. A drive control system 40-6 is connected to the transparent electrodes 40-2. When a rectangular wave or a sine wave is applied as a driving voltage, an optical beam can be deflected. Furthermore, if the rectangular wave or the sine wave has variable duty or oscillation, it is possible to adjust the deflection angle. Here, when a liquid crystal element is used as the liquid crystal deflecting element, the liquid crystal deflecting element can be preferably implemented with the above-mentioned liquid crystal deflecting element provided in FIG. 7 through FIG. 9.

In a case where the liquid crystal element 40 is used as a light path deflecting part to control beam spot positions on the scanned surface 16, when the beam spot positions are to be moved by ΔZ in the subscanning direction, it is necessary to set the beam deflection angle φZ with respect to the subscanning direction as follows;

$\phi Z=\tan^{-1}(\Delta Z/fcol \times mZ)$

This formula is transformed from the following formula;

$\Delta Z=fcol \times mZ \times \tan \phi z$.

In contrast, when the beam spot positions are to be moved by Δy in the main scanning direction, it is necessary to set the beam deflection angle φY with respect to the main scanning direction as follows;

$\phi Y=\tan^{-1}(\Delta Y/fcol \times mY)=\tan^{-1}(\Delta Y/FY)$.

Meanwhile, the optical scanning apparatus in FIG. 26A has the same structure as the optical scanning apparatus in FIG. 1. If the liquid crystal elements 40a and 40b are used as a light path deflecting part to deflect a light path, it is possible to easily adjust (correct) the beam spot positions on the scanned surface 16. In addition, it is possible to correct the beam spot positions even if the beam spot positions vary under influences by temperature fluctuations and time passage. Furthermore, the optical scanning apparatus has some advantages such as less light loss and low driving electric power.

On the other hand, a liquid crystal element 40 generally has a problem in that ghost light tends to arise due to diffraction. Liquid crystal elements are roughly divided into the following two types. The first type of liquid crystal elements generates a refractive index distribution by applying a voltage to a plurality of electrodes and deflects incident light due to prism effect. The second type of liquid crystal elements generates a striped pattern as a diffraction lattice by applying a voltage to a plurality of electrodes. In this case, the incident light is deflected due to diffraction effect. In any type, it is usually possible to generate diffraction light corresponding to the electrode pitch because the electrodes are provided in an electrode pattern so that the individual electrodes can be located in equal intervals.

FIG. 27 shows an example of ghost light in the liquid crystal element 40. In the liquid crystal element 40, when diffraction light is generated by transparent electrodes 40-2 of the liquid crystal element 40, the 0-order light of the diffraction light is deflected as write data. On the other hand, the ±1-order light, the ±2-order light, . . . of the diffraction light are considered as unnecessary ghost light. If such ghost light appears on the scanned surface 16, an image may include a ghost image. As a result, the image is likely to deteriorate.

Figure 28:
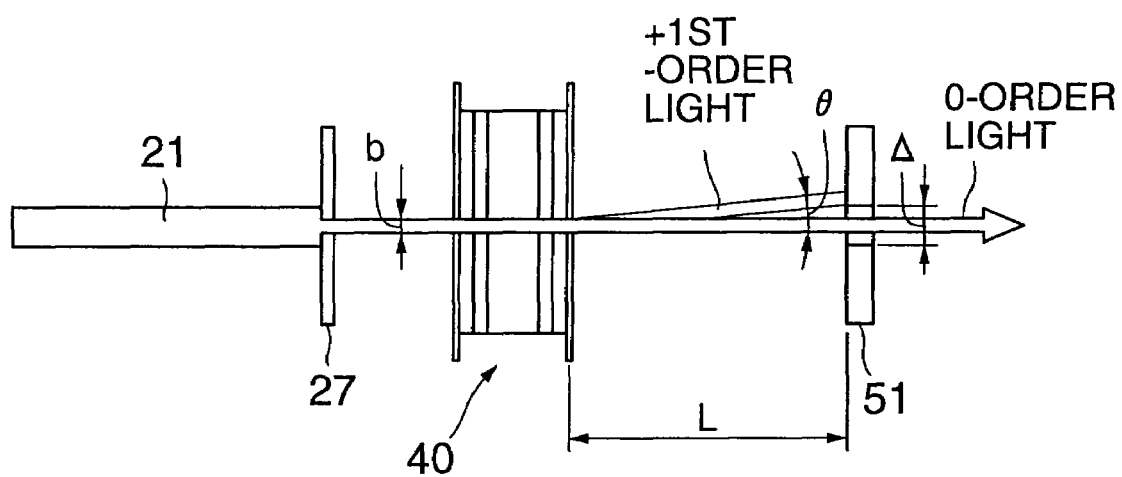
FIG. 28 is a diagram for explaining deletion of ghost light by using a ghost light removing part.

In order to remove the ghost light, a ghost light removing part 51 such as a slit aperture is provided between the liquid crystal element 40 and the deflector 14 as shown in FIG. 28.

When the slit aperture 51 is provided as the ghost light removing part, it is possible to easily remove harmful ghost light such as the ±1-order light, the ±2-order light, . . . that are generated by diffraction of the liquid crystal element 40.

Here, the slit aperture 51 may be formed of any shape such as a rectangular aperture and an aperture formed by closing two light shielding plate, that is, an aperture that is infinitely opened in the longitudinal direction as long as the slit aperture 51 has an aperture in which ghost light is interrupted in the deflection direction of the liquid crystal element 40. Also, the slit aperture 51 may be formed by covering a light shielding film or depositing an evaporated light shielding material on a transparent member such as a glass plate. Also, the slit aperture 51 may be formed by making a rectangular hole on a plane plate by means of a knife-edge. Furthermore, the ghost light shielding member may be provided such that the upper knife edge and the lower knife edge can be mounted at different places with respect to the optical direction.

As is shown in FIG. 28, if the slit aperture 51 satisfies the following formula, it is possible to reduce the ghost light efficiently;

$$L \geq (b+\Delta)/(2 \times \tan \theta),$$

where b is the width of an optical beam deflected by a liquid crystal element, $\Delta$ is the width of a slit aperture, L is the distance between the liquid crystal element and the slit aperture, and $2\theta$ is an angle between +1st-order light and −1st-order light of the ghost light generated by the liquid crystal element.

Here, the ghost light removing part such as the silt aperture 51 may be provided in the upper stream side (the illuminant side) of the beam synthesizing part or the lower stream (the scanned surface side) of the beam synthesizing part.

Figure 29A:
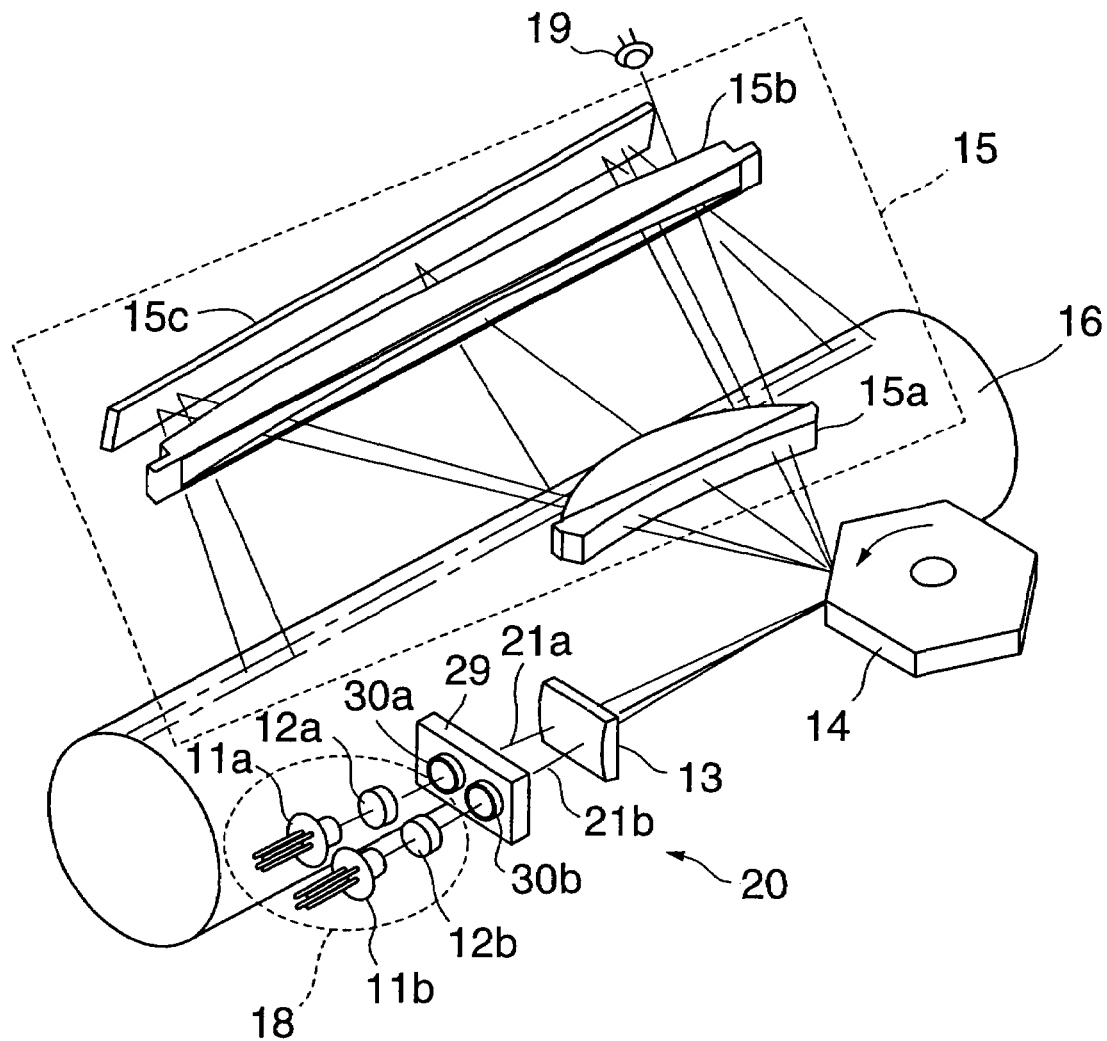
FIG. 29A is a perspective view of another optical scanning apparatus according to the present invention.

FIG. 29A is a perspective view of another optical scanning apparatus according to the present invention. The optical scanning apparatus basically has the same structure as that in FIG. 26A wherein the optical scanning apparatus in FIG. 29A has an eccentric transmission optical element as the light path deflecting part.

Figure 29B:
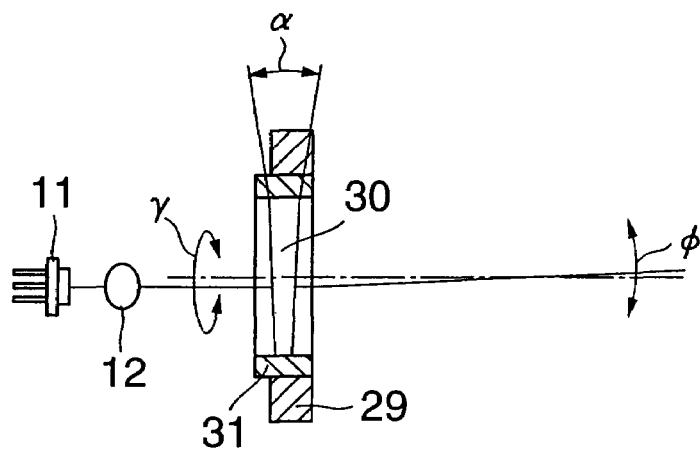
FIG. 29B is an outline sectional view of a light path deflecting part of the optical scanning apparatus.

FIG. 29B is a sectional view of the light path deflecting part (wedge-shaped prism unit) formed of transmission optical elements, wedge-shaped prisms 30a and 30b.

The optical scanning apparatus in FIGS. 29A and 29B basically has the same structure as the optical scanning apparatus in FIGS. 26A and 26B. In the optical scanning apparatus in FIGS. 29A and 29B, the light path deflecting part can deflect an optical beam in the direction pointed at by the arrow $\phi$ in FIG. 29B, that is, the light path deflecting part can change the optical beam with respect to the subscanning direction, by inserting the wedge-shaped prism 30 into the ring ultrasound motor 31 driven by a piezoelectric element and rotating the wedge-shaped prism 30 in the direction pointed at by the arrow y in FIG. 29B. If such two wedge-shaped prism units are mounted to the common holding member 29, it is possible to realize a light path deflecting part capable of deflecting an optical beam without the size increase.

When the wedge-shaped prism 30a and 30b are used as the light path deflecting part, it is possible to suppress generation of ghost light unlike the above-mentioned optical scanning apparatus in which a liquid crystal element is used as the light path deflecting part. As a result, it is unnecessary to install a ghost light removing part.

Figure 30:
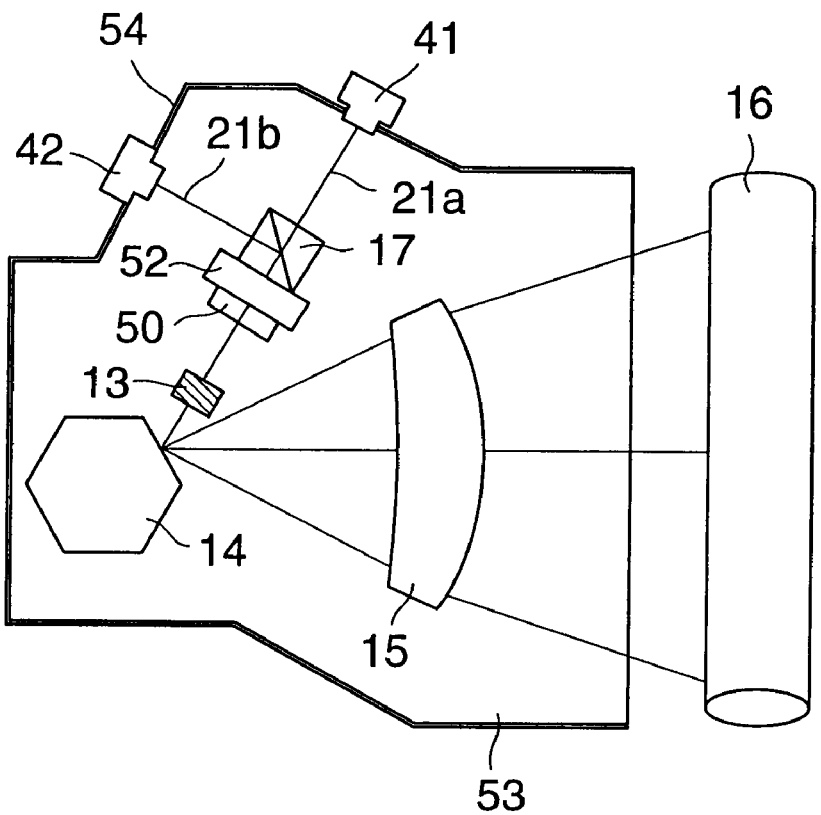
FIG. 30 is an outline plan view of another optical scanning apparatus according to the present invention.

FIG. 30 is a plan view of another optical scanning apparatus according to the present invention. The optical scanning apparatus is accommodated in an optical housing.

As is shown in FIG. 30, two illuminant modules 41 and 42 for emitting optical beams are mounted on side walls of an optical housing 53 of the optical scanning apparatus. The two optical beams 21a and 21b from the illuminant modules 41 and 42 are synthesized by an optical beam synthesizing prism 17, and the synthesized optical beam enters the deflector 14 formed of a polygon mirror via the cylindrical lens 13. The light path deflecting part 50 between the optical beam synthesizing prism 17 and the deflector 14 and the optical beam synthesizing prism 17 are fixed to the common holding member 52.

In the optical scanning apparatus in FIG. 30, the two illuminant modules 41 and 42 serve as the illuminant part such as a pair of a semiconductor laser and a coupling lens. However, the illuminant part and the coupling lens are not necessarily integrated.

In addition, the illuminant modules 41 and 42 are not necessarily fixed to the side wall 54 of the optical housing 53. For instance, the illuminant modules 41 and 42 may be accommodated in the interior of the optical housing 53 via bracket members.

If the optical scanning apparatus adopts the above-mentioned structure, it is possible to more easily replace a badly-performed illuminant or semiconductor laser with the smaller number of parts than the optical scanning apparatus shown in FIG. 21.

Furthermore, the ghost light removing part such as the slit aperture 51 in FIG. 28 is often provided in the lower stream side (the deflector side) of the optical beam synthesizing prism 17. However, even if the light path deflecting part 50 is provided in the upper stream (the illuminant side) of the beam synthesizing prism 17, the ghost light removing part may be provided in the upper stream (the illuminant side) of the beam synthesizing prism 17 as long as such a layout is feasible.

Figure 31A:
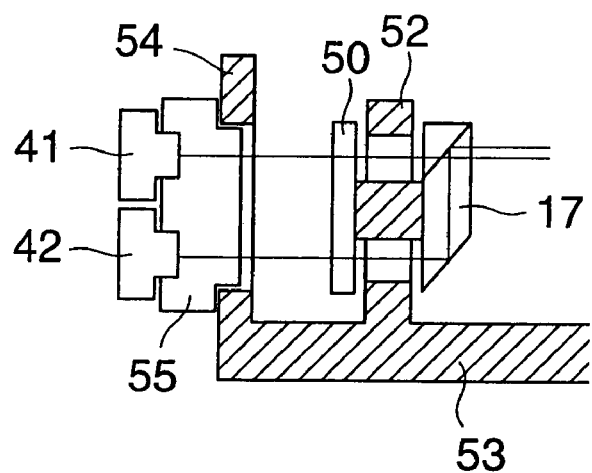
FIGS. 31A and 31B are diagrams illustrating an illuminant in the optical scanning apparatus.
Figure 31B:
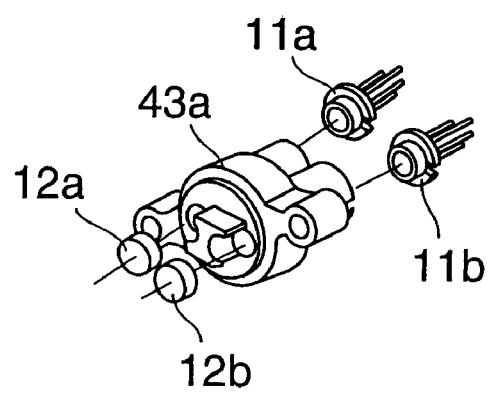

FIGS. 31A and 31B show another optical scanning apparatus according to the present invention.

FIG. 31A is a sectional view of an optical system fixed to an optical housing wherein an illuminant apparatus comprises at least two illuminant modules 41 and 42 and a holding member 55 for holding the illuminant modules 41 and 42.

The two illuminant modules 41 and 42 may comprise a first i. Nalluminant module and a second illuminant modulemely, the first illuminant module 41 comprises semiconductor lasers 11a and 11b, coupling lenses 12a and 12b, and a base member 43a for integrally holding the semiconductor lasers 11a and 11b and the coupling lenses 12a and 12b in lines in the main scanning direction. The second illuminant module 42 comprises semiconductor lasers 11c and 11d, coupling lenses 12c and 12d, and a base member 43b for integrally holding the semiconductor lasers 11c and 11d and the coupling lenses 12c and 12d in lines in the main scanning direction.

Although the optical system in FIG. 31A is formed as a 4-beam scanning apparatus, it is possible to provide a multi-beam scanning apparatus more than 4 beams by increasing the number of illuminant modules or the number of emitted beams per one illuminant module.

Figure 32:
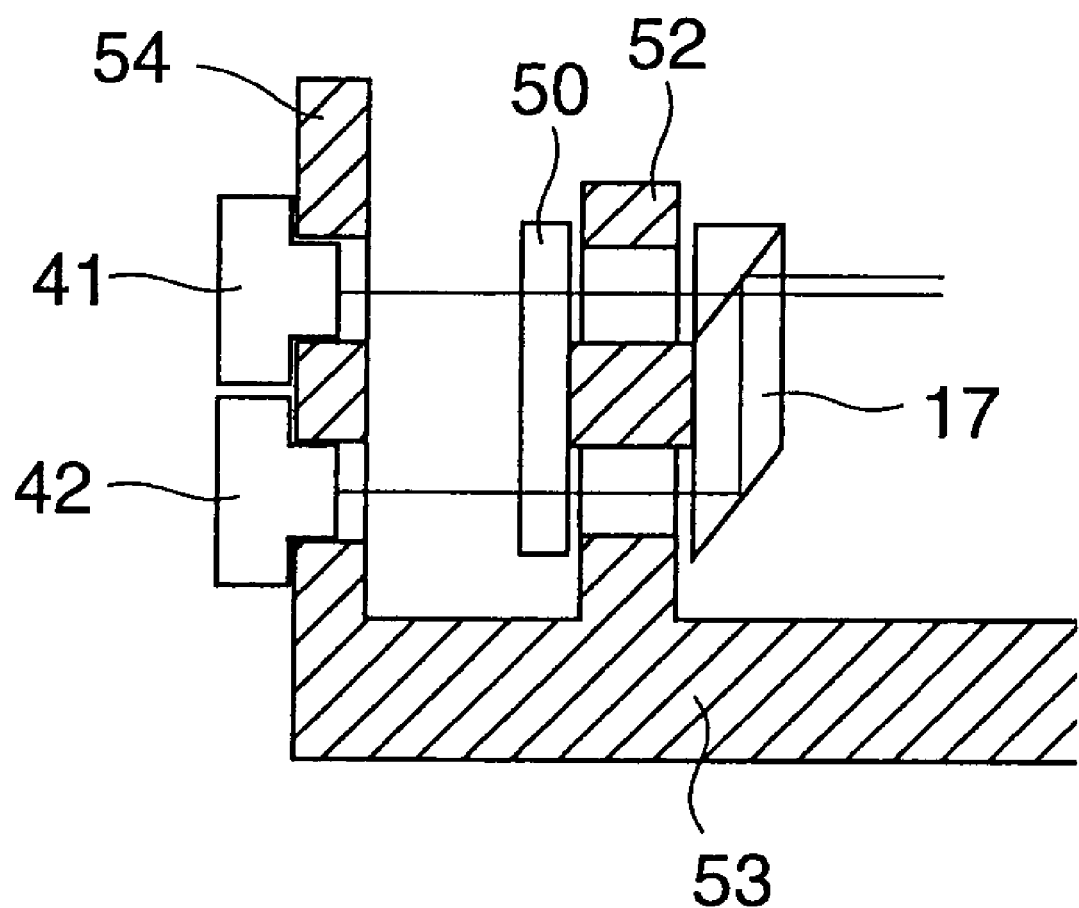
FIG. 32 is a diagram illustrating another illuminant in the optical scanning apparatus.

FIG. 32 shows a variation of the optical system in FIG. 31A. As is shown in FIG. 32, the two illuminant modules 41 and 42 may be directly fixed on a side wall 54 of the optical housing 53 without use of the holding member 55.

A description will now be given of some image forming apparatuses incorporating the above-mentioned optical scanning apparatuses according to the present invention.

An image forming apparatus according to the present invention comprises one of the above-mentioned optical scanning apparatus, a photoreceptor for forming an electrostatic latent image, a developing apparatus for developing the electrostatic latent image with a toner, a transferring apparatus for transferring the developed toner image to a recording paper, and a fixing apparatus for fixing the transferred toner image on the recording paper. In this configuration, the image forming apparatus can improve the printing speed and the printing density by simultaneously scanning an image surface with a plurality of beams. Since the optical scanning apparatus according to the present invention successfully suppresses misalignment of optical spots on the scanned surface 16 or a photoreceptor as mentioned above, the image forming apparatus can create a higher-quality image.

The detection timing of optical spots may be before or after an operator pushes the start button of the image forming apparatus so as to print out the image. Also, when the image forming apparatus prints out a large number of sheets, the optical spot alignment may be detected for every several sheets or every dozens of sheets. In addition, if an electronic signal is not supplied to a liquid crystal element serving as a liquid crystal deflecting element when the printing operation is not being performed, that is, when the beams is not scanning an image surface, the image forming apparatus additionally may include the function for saving the previous adjustment values.

When one of the optical scanning apparatuses according to the present invention is used as an optical writing apparatus of an image forming apparatus, the image forming apparatus can output an evaluation chart (output image) by operator's manipulations through an operation panel on the body of the image forming apparatus. Here, the evaluation chart may follow a pattern according to Japanese Laid-Open Patent Application No. 10-062705.

If an operator can confirm the quality of an image to be printed out with reference to the above-mentioned evaluation chart, it is possible to correct deterioration of the image to be printed due to not only misalignment of beam spots but also troubles of the other processes; the developing process, the transferring process and the fixing process.

In addition, since the optical scanning apparatus according to the present invention may omit either or both of the beam spot alignment detecting part and the control part, it is possible to fabricate the optical scanning at lower cost.

The optical scanning apparatus according to the present invention can detect beam spot alignment and adjust deflection of optical beams for every one sheet of an output image, for every several sheets through every dozens of sheets thereof, or for every one job (batch). Accordingly, even if it takes several milliseconds through several hundreds of milliseconds to adjust deflection of an optical beam, the adjustment time does not matter. As a result, the optical scanning apparatus does not have to possess a multi-layered liquid crystal unlike the image forming device according to Japanese Laid-Open Patent Application No. 2000-047214 because high response speed is not required for the optical scanning apparatus according to the present invention. Also, the optical scanning apparatus does not have to possess a detecting part for detecting the rotational speed of the photoreceptor unlike the image forming device according to Japanese Laid-Open Patent Application No. 2000-003110.

When the image forming apparatus according to the present invention is applied to a multifunction machine serving as both a printer and a copier, it may be necessary to switch the pixel density between a printer mode and a copier mode. For instance, when the pixel density is switched between 600 dpi (dots per inch) under the printer mode and 400 dpi under the copier mode, the multifunction machine can work under the pixel density suitable for each of the modes.

Also, there is a case where an image forming apparatus enables an operator to switch the pixel density, for instance, between high-quality mode (1200 dpi) and high-speed mode (600 dpi) in accordance with operator's purposes through an operation panel on the image forming apparatus. In this case, the image forming apparatus can easily switch the pixel density by driving/controlling a light path deflecting element thereof.

A color image forming apparatus such as a digital color copier and a color printer adopts a tandem form in which photoreceptors (for instance, 5K, 5C, 5M and 5Y) corresponding to individual colors (for instance, black: K, cyan: C, magenta: M and yellow: Y) are aligned in a tandem form in the carrier direction. In this case, individual optical scanning apparatuses (for instance, 10K, 10C, 10M and 10Y) may be provided corresponding to the colors as shown in FIG. 33A. Also, one optical scanning apparatus 10A integrally corresponding to the colors may be provided as shown in FIG. 33B. Furthermore, two optical scanning apparatuses (a pair of 10A1 and 10A2 and a pair of 10B1 and 10B2) may be provided as shown in FIGS. 33C and 33D. Here, although FIGS. 33A through 33D illustrates only the four photoreceptor drums 5K, 5C, 5M and 5Y and the optical scanning apparatuses, the color image forming apparatus includes a conventional charging apparatus, a conventional developing apparatus, a conventional transferring apparatus, a conventional cleaning apparatus and a conventional electricity removing apparatus around each of the photoreceptor drums 5K, 5C, 5M and 5Y. Each toner image corresponding to the colors; black, cyan, magenta and yellow is formed on the individual photoreceptor drums; 5K, 5C, 5M and 5Y through an electrophotographic process including a charging process, an optical writing process and a developing process. These toner images are sequentially superposed and transferred on an image recording medium such as a recording paper that is sequentially carried among the four photoreceptor drums. Then, the recording paper on which the four-color toner image has been transferred is carried to a fixing apparatus that is not illustrated in FIGS. 33A through 33D. Finally, a color image is obtained after the fixing apparatus fixes the four-color toner image on the recording paper.

In such a configuration, the color image forming apparatus produces a color image at four times as speed as an 1-photoreceptor drum type color image forming apparatus, because the 1-photoreceptor drum type color image forming apparatus has to write an image in a recording paper four times corresponding to the four colors.

If an image forming apparatus includes the optical scanning apparatuses 10K, 10C, 10M and 10Y each of which emits just one optical beam, the image forming apparatus can produce a full-color (four colors) image. On the other hand, if an image forming apparatus uses a 4-beam optical scanning apparatus according to the present invention instead of at least one of the optical scanning apparatuses 10K, 10C, 10M and 10Y, for instance, the optical scanning apparatus 10K corresponding to black, it is possible to quadruple the density of the full-color image. Also, if the carrying speed of a recording medium is quadrupled, it is possible to print out the fourfold number of output images. Furthermore, even if a color image forming apparatus is used, there are many opportunities where a character-based image is provided to the color image forming apparatus. In this case, it is required to increase the resolution of the character-based image. Accordingly, the color image forming apparatus can use not only the 4-beam optical scanning apparatus 10K but also the other optical scanning apparatuses simultaneously to produce a higher-quality output image even if the source image is formed of a mixture of characters, photographs and geometrical images.

Figure 34:
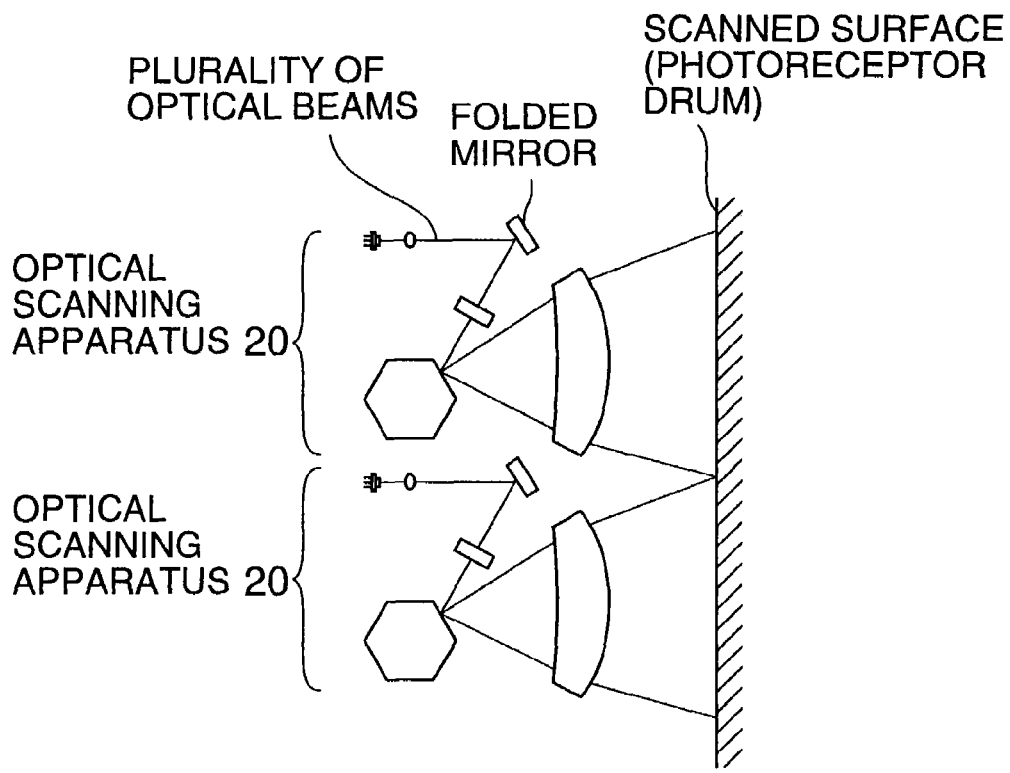
FIG. 34 is an outline plan view of the image forming apparatus.

FIG. 34 shows the structure of an image forming apparatus according to the present invention.

As is shown in FIG. 34, an image forming apparatus adopts two of the above-mentioned optical scanning apparatuses 20. These two optical scanning apparatuses are aligned in parallel with respect to the main scanning direction. Then, the scanned surface 16 is divided into two areas, and each of the optical scanning apparatuses scans one area of the scanned surface 16 as an effective writing breadth of the optical scanning apparatus. When the two optical scanning apparatuses 20 are provided in parallel with respect to the main scanning direction, it is possible to make the effective writing breadth larger. Also, if the effective writing breadth is set as the same size as the original effective writing breadth, it is possible to miniaturize an optical element and a deflector therein. As a result, since beam waist position variation due to mechanical tolerance and temperature fluctuation becomes small, it is possible to reduce wave aberration. Here, although FIG. 34 illustrates only the scanned surface 16 and the two optical scanning apparatuses 20, the image forming apparatus has a conventional charging apparatus, a conventional developing apparatus, a conventional transferring apparatus, a conventional cleaning apparatus and a conventional electricity removing apparatus around the scanned surface 16. In the image forming apparatus, a toner image is formed on the photoreceptor drum 16 through an electrophotographic process including a charging process, an optical writing process and a developing process. This toner image is transferred on an image recording medium such as a recording paper that is sequentially carried among the four photoreceptor drums. Then, the recording paper on which the toner image has been transferred is carried to a fixing apparatus that is not illustrated in FIG. 34. Finally, an output image is obtained after the fixing apparatus fixes the toner image on the recording paper.

A description will now be given of a correction method for correcting beam spot alignment on a surface to be scanned by using a conventional liquid crystal element driven by an electronic signal. In this correction method, a liquid crystal element is used as a light path deflecting element to deflect an optical beam by a slight angle. Such a liquid crystal element is provided at or immediately behind an illuminant part so as to adjust beam spot alignment on a surface to be scanned.

In the case where a liquid crystal element is used to deflect a light path, it is necessary to coincide the plane of polarization of an optical beam with an optical axis of the liquid crystal element. However, the above-mentioned correction method is limited to a situation where the active layer direction, that is, the polarization plane, of a semiconductor laser chip is orthogonal to the optical axis direction of the liquid crystal element.

Figure 35:
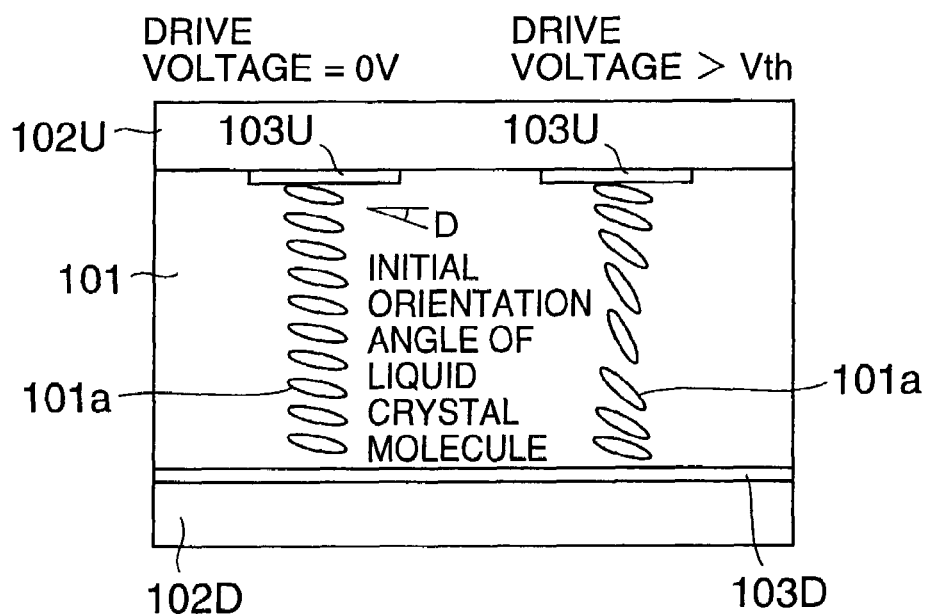
FIG. 35 is a sectional view of a liquid crystal element of another optical scanning apparatus according to the present invention.

FIG. 35 is a sectional view of a conventional liquid crystal element that is used as a light path deflecting element. As is shown in FIG. 35, the liquid crystal element is formed by sandwiching a homogenious molecule arrangement type nematic liquid crystal layer 201 between two glass substrates 2U and 2D. Two transparent metal oxide electrodes 3U and 3D are provided on the inner surfaces of the glass substrates 2U and 2D, respectively.

Figure 36:
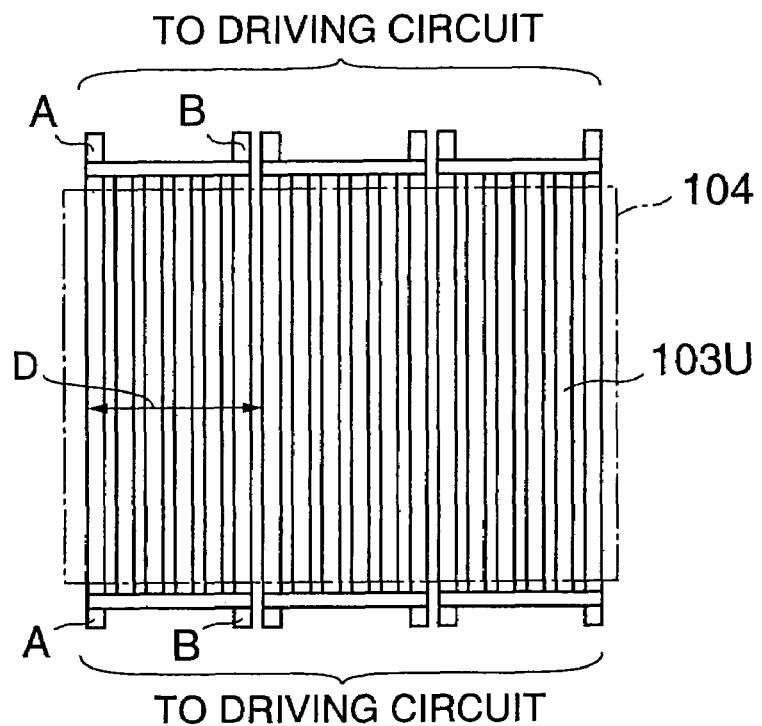
FIG. 36 is an enlarged plan view of an electrode pattern.

Normally, a uniform earth electrode for forming an electronic ground surface is provided on the whole surface of the glass substrate 2D, and on the other hand, an upper surface electrode for forming an electric field distribution necessary for the liquid crystal layer 201 is provided on the glass substrate 2U. In FIG. 35, the earth electrode and the upper surface electrode are designated as the reference numerals 3D and 3U, respectively. As is shown in FIG. 36, for instance, the upper surface electrode 3U has a stripe electrode pattern. Here, the ground electrode 3D and the upper surface electrode 3U are formed as transparent electrodes.

When a driving alternate voltage, for instance, a rectangular wave at several KHz, is applied between the ground electrode 3D and the upper surface electrode 3U, nematic liquid crystal molecules 101a are inclined along the electric field in the nematic liquid crystal layer 101 having a birefringent index, that is, a refractive index difference between the major axis and the minor axis of the nematic liquid crystal molecules 101a. FIG. 35 schematically shows this situation. In FIG. 35, the left side shows nematic molecules 101a in a case where the applied driving voltage is equal to 0V. In this case, the nematic molecules 101a persist an initial orientation angle p thereof. In contrast, the right side shows nematic molecules 101a in a case where the applied driving voltage is more than Vth (the threshold value). In this case, the nematic molecules 101a are partially inclined toward the initial orientation angle p.

In such inclined nematic molecules 101a, the nematic liquid crystal layer 101 is equivalent to a medium having a locally different refractive index in accordance with the electric field for single-color light having straight polarization parallel with the optical axis of the liquid crystal molecules. Thus, spatial wave modulation or spatial phase modulation is added to a wave front of light transmitting the nematic liquid crystal layer 101 in accordance with a surface distribution of an applied voltage to the liquid crystal.

Figure 37:
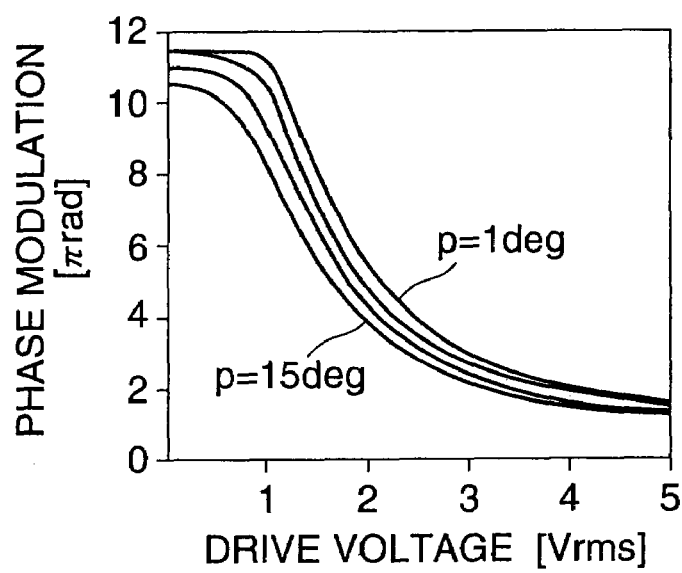
FIG. 37 is a diagram illustrating an electronic optical characteristic of nematic liquid crystal.

FIG. 37 shows an electronic optical characteristic of a homogeneous alignment type nematic liquid crystal. In FIG. 37, an effective birefringence index Dn, which is a birefringence index under which entrance light that varies in accordance with a gradient of the major axis of the liquid crystal molecule is effectively influenced, is illustrated with respect to levels of the phase modulation and levels of the applied voltage. The shape of the electronic optical characteristic is determined based on an elastic constant, anisotropy of a dielectric constant, and the initial orientation angle p of the liquid crystal molecule when a voltage is not applied. Regarding the liquid crystal molecule having the small initial orientation angle p less than 5 deg, the electronic optical characteristic drastically decreases at a point (threshold) in a low-voltage area. As the applied voltage is increased, the curve becomes approximate linear and then the electronic optical characteristic is saturated toward a constant value. In contrast, regarding the liquid crystal element having the large initial orientation angle p equal to 15 deg, the electronic optical characteristic does not have such a threshold. In a low-voltage area, the curve approximates to a quadratic curve.

As is shown in FIG. 36, the upper surface electrode 3U has the stripe pattern in which a large number of thread-shaped electrodes are arranged in a stripe form. Some researchers in U.S. have designed such a stripe pattern electrode in which a predetermined level of voltage is applied to each of the thread-shaped electrodes. In such an electrode, it is possible to achieve a high-speed response, high spatial resolving power and wide freedom of wave modulation in that a complicated wave modulation is possible through other means other than beam deflection and lens functions.

When a liquid crystal element is used as a light path deflecting part, the liquid crystal element adopts stripe-shaped electrode design as shown in FIG. 36 so as to make use of the linear area of the electronic optical characteristic. The upper surface electrode 3U is formed by arranging thread-shaped electrodes having a breadth at an interval on a beam irradiation area 104 of the liquid crystal element depending on the resolving power under the current exposure technology.

In FIG. 36, the symbols A and B indicate end parts of the period D of the stripe upper surface electrode 3U. The end parts A and B are connected to two inclined potential electrodes extending in the horizontal direction outside the irradiation area 104. Accordingly, the upper surface electrode 3U has the overall structure in which several electrodes are aligned as a ladder. The number of bundled thread-shaped electrodes is determined based on a maximum beam deflection angle needed in the area.

Figure 38:
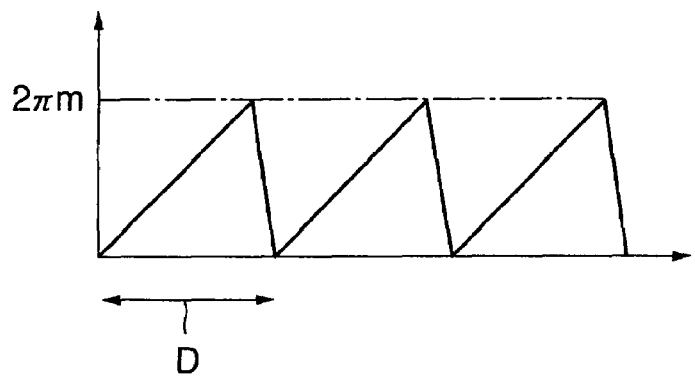
FIG. 38 is a diagram illustrating a phase distribution.

FIG. 38 shows an example of a phase distribution. When a driving circuit, which is not illustrated in FIG. 36, applies two distinct levels of voltage within the linear areas of electronic optical characteristics to the end parts A and B, an obtained blade-shaped phase profile as shown in FIG. 38 is equivalent to a microprism array. As is shown in a reference, the blade angle is changed by controlling the applied voltage, it is possible to control the direction of an optical beam vertically entering the nematic liquid crystal layer 101.

In general, the main scanning direction and the subscanning direction mean the direction where a beam spot scans a surface and the direction orthogonal to the main scanning direction, respectively. However, in the following, the main scanning direction and the subscanning direction mean the main scanning direction and the subscanning direction with respect to individual spots in a light path, respectively.

Figure 39:
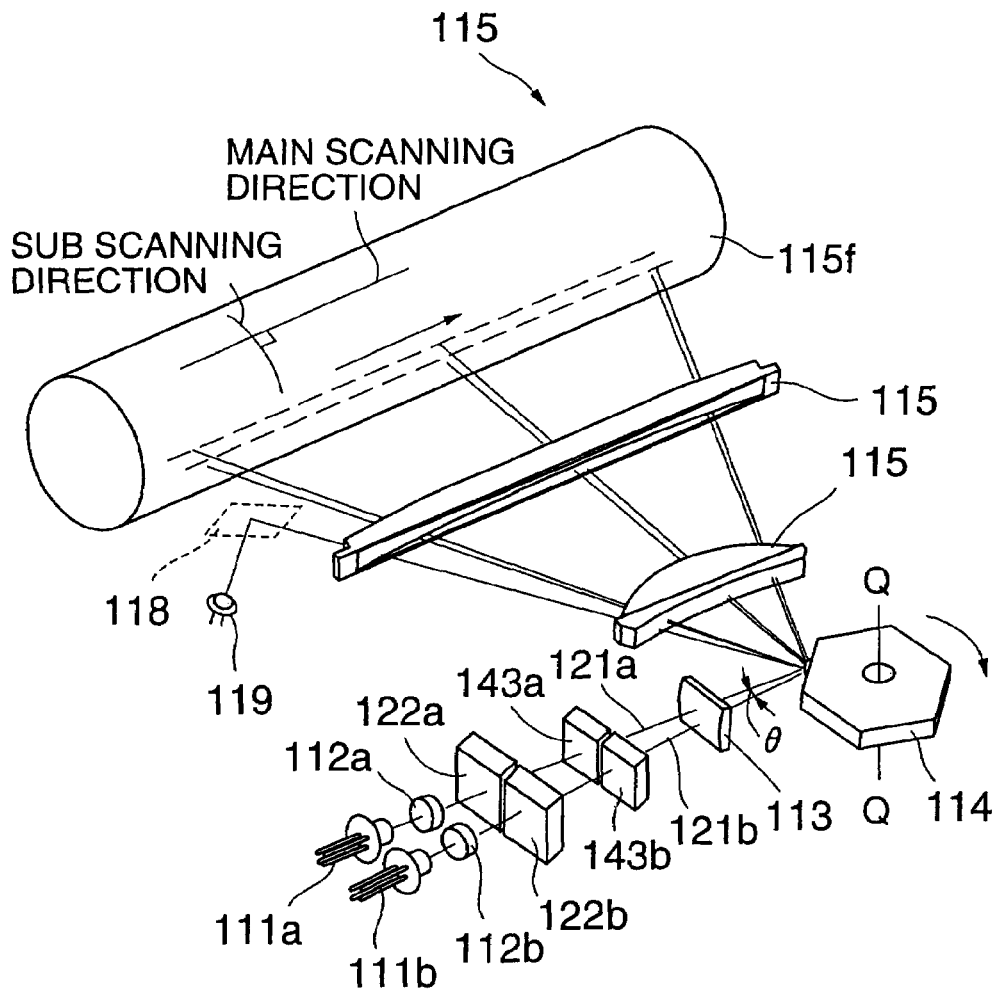
FIG. 39 is a perspective view of the optical scanning apparatus.

FIG. 39 is a perspective view of an optical scanning apparatus according to the fourth embodiment. Here, the optical scanning apparatus is formed of a 2-beam scanning apparatus for scanning a surface to be scanned by simultaneously using two optical beams. However, the optical scanning apparatus may be formed of a multi-beam scanning apparatus using more than 2 beams.

Two semiconductor lasers 11a and 11b emit laser light. Two coupling lenses 112a and 112b couple the emitted laser light, and the coupled laser light results in two optical beams 121a and 121b. The optical beams 121a and 121b are shaped into a linear form by a cylindrical lens 113, and the linear optical beam is projected on a deflecting reflection surface of a polygon mirror 114, which serves as a deflector, in order to produce an optical beam that is focused on the subscanning direction and is linearly formed with respect to the main scanning direction. Then, the deflected linear optical beam is projected to an optical scanning system 115 formed of a scanning lens such as an fθ lens and a toroidal lens in order to provide beam spots on a scanned surface 116f formed of the outer surface of a photoreceptor drum 16. This scanning direction is parallel with the axis direction of the photoreceptor drum 116 and is called the main scanning direction. Furthermore, the direction orthogonal to the main scanning direction on the outer surface of the photoreceptor drum 116 is called the subscanning direction.

In this fashion, an optical scanning apparatus 120 scans the scanned surface 116f by using beam spots formed of the optical beams 121a and 121b emitted from an illuminant formed of the semiconductor lasers 111a and 111b.

Here, the optical scanning apparatus 120 is designed so that the two optical beams 121a and 121b cross with each other around the deflecting reflection surface of the polygon mirror 114 with respect to a main scanning section parallel with a virtual plane orthogonal to the rotation axis Q-Q of the polygon mirror 114. In this configuration, it is possible to suppress difference of optical characteristics such as a imaging position and magnification between the two optical beams caused by difference between reflection points thereof on the polygon mirror 114.

In order to correct initial arrangement of beam spot positions or optical beam pitches on a scanned surface and misalignment caused by environmental fluctuation and time passage, an optical beam position correcting part is often provided in an optical scanning apparatus including a multibeam scanning apparatus for scanning the scanned surface by using a large number of optical beams.

For this optical beam position adjustment, there are some conventional light path deflecting methods for deflecting a light path of the optical beam by a slight angle. As the first method, the light path is deflected by rotating a folded mirror. As the second method, the light path is deflected by shifting or rotating a cylindrical lens. As the third method, the light path is deflected by shifting or rotating a prism. As the fourth method, the light path is deflected by using an electronic optical element or AOM (Acousto-Optic light Modulator). As the fifth method, the light path is deflected by rotating a plane plate provided between a semiconductor laser and a coupling lens.

As is shown in FIG. 39, in the optical scanning apparatus according to this embodiment, liquid crystal elements 143a and 143b are provided between the coupling lenses 112a and 112b and the cylindrical lens 113. The liquid crystal element has some advantages. If the liquid crystal element is used as the light path deflecting part, it is possible to provide a small, lightweight, and energy-saving optical scanning apparatus. In addition, the liquid crystal element generates no noise and no heat.

Desired refractive indexes are obtained for the liquid crystal elements 143a and 143b by properly controlling an applied driving voltage. As a result, it is possible to adjust irradiation positions of optical beams on the scanned surface.

When the liquid crystal element is used as the light path deflecting part, it is possible to provide an optical scanning apparatus that can enjoy the above-mentioned greater advantages than optical scanning apparatus using conventional light path deflecting parts.

As mentioned above, when a liquid crystal element is used to deflect a light path, it is necessary to coincide the optical axis of the liquid crystal element with the polarization plane of the optical beam having linear polarization.

In this embodiment, a light rotating part is used to rotate the polarization plane of the optical beam and coincide the polarization plane of the optical beam with the optical axis of the liquid crystal element. When the light rotating part is used to rotate the polarization plane of the optical beam and coincide the polarization plane of the optical beam with the optical axis of the liquid crystal element, it is possible to efficiently deflect the light path of the optical beam and adjust controllable beam spot positions on the scanned surface.

In this embodiment, a ½ wavelength plate is used as the light rotating part. In detail, the liquid crystal elements 143a and 143b are provided in a light path of the optical beams 121a and 121b between the coupling lenses 112a and 112b and the cylindrical lens 113, and ½ wavelength plates 122a and 122b are provided as the light rotating part for rotating the polarization plane of an optical beam in the upper stream side of the liquid crystal elements 143a and 143b.

Here, the optical beam 121a passes through the coupling lens 112a, the ½ wavelength plate 122a and the liquid crystal element 143a in the sequence. On the other hand, the optical beam 121b passes through the coupling lens 112b, the ½ wavelength plate 122b and the liquid crystal element 143b in the sequence.

Such a ½ wavelength plate is affordable and small. As a result, when the ½ wavelength plates 122a and 122b are used as the light rotating part, it is possible to not only easily rotate the polarization plane of an optical beam but also fabricate a smaller optical scanning apparatus at lower cost.

The ½ wavelength plates 122a and 122b rotates the polarization planes of the optical beams 121a and 121b by a fixed angle. Now, it is supposed that the optical axis direction of the liquid crystal elements and the oscillation direction of the optical beam emitted from the illuminant are known. Also, the fixed rotation angle of the polarization plane is supposed to be known. Therefore, if the ½ wavelength plates are mounted at appropriate angles, it is possible to coincide the polarization plane of the optical beam with the optical axis direction.

The installation of the ½ wavelength plates involves some mechanical errors. A rotation adjusting part holds the ½ wavelength plates 122a and 122b so as to slightly adjust the installation angles. As a result, it is possible to adjust the rotation in the optical axis direction.

In the case where the ½ wavelength plates 122a and 122b rotates by setting the optical axis of the optical beam as the central axis of the rotation, even if the polarization plane rotates in response to rotation adjustment of the semiconductor lasers 111a and 111b, it is possible to coincide the optical axis of the liquid crystal element with the polarization plane of the optical beam entering the liquid crystal element by adjusting the rotation of the ½ wavelength plates 122a and 122b.

A description will now be given, with reference to FIG. 40 and FIG. 41, of the rotation adjusting part wherein a body part of the optical scanning apparatus 120 and a rotation holding member for holding the ½ wavelength plate 122a are designated by the reference numbers 105 and 106, respectively. The rotation holding member 106 is formed as a stepped cylinder and holds the ½ wavelength plate 122a in the interior of a cylinder part 106a.

Figure 40:
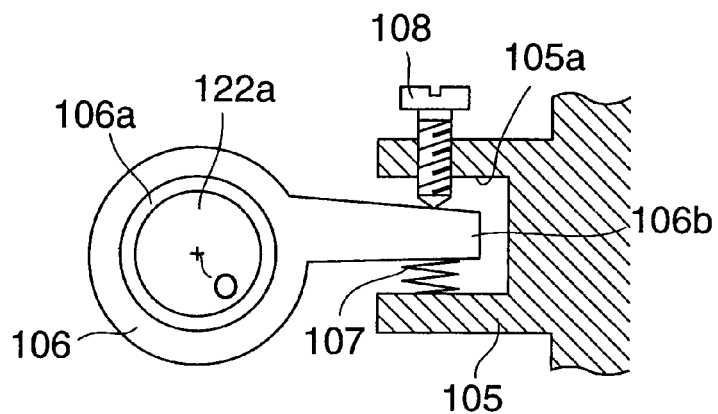
FIG. 40 is an outline front view of a rotation adjusting part of the optical scanning apparatus.
Figure 41:
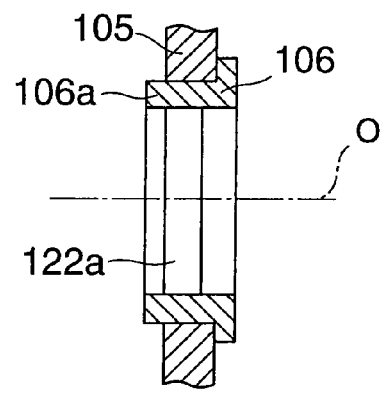
FIG. 41 is an outline sectional view of the rotation adjusting part of the optical scanning apparatus.

As is shown in FIG. 40 and FIG. 41, the cylinder part 106a is joined at the external diameter part with a holding hole formed in the body part 105 in such a manner that the ½ wavelength plate 22a can rotate. Furthermore, the direction of the axis line O of the cylinder part 106a is positioned by pressing a stepped part of the cylinder part 106a to an edge part of the holding hole by means of an appropriate elastic part.

As is shown in FIG. 40, an arm 106b extends from the rotation holding member 106 in the radius direction of the cylinder part 106a and is located in the interior of the concave part 105a formed in the body part 105. The arm 106b in the concave part 105a is pressed from the lower side to the upper side by a spring 107 and an adjusting screw 107 receives the pressure. As mentioned above, the rotation adjusting part according to this embodiment comprises the rotation holding member 106, the spring 107, the adjusting screw 108 and so on.

In this configuration, if the screw 108 is turned, it is possible to rotate the rotation holding member 106 via the cylinder part 106a. As a result, it is possible to rotate the ½ wavelength plate 122a by an arbitrary angle by the axis line O. ½ wavelength plate 122b can be rotated in the similar configuration to the ½ wavelength plate 122a.

A description will now be given, with reference to FIG. 42 and FIG. 43, of a rotation mechanism of the polarization plane by using the ½ wavelength plate.

Figure 42:
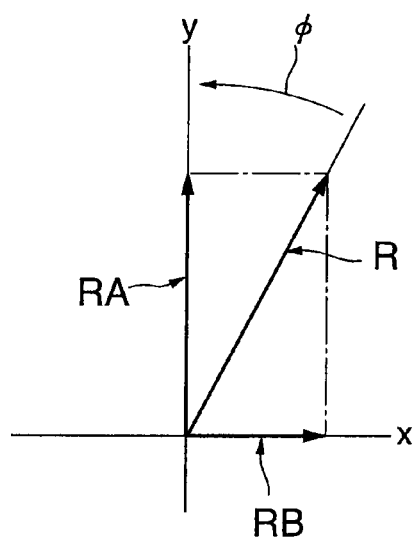
FIG. 42 is a diagram for explaining linear polarization with a ½ wavelength plate before the rotation.
Figure 43:
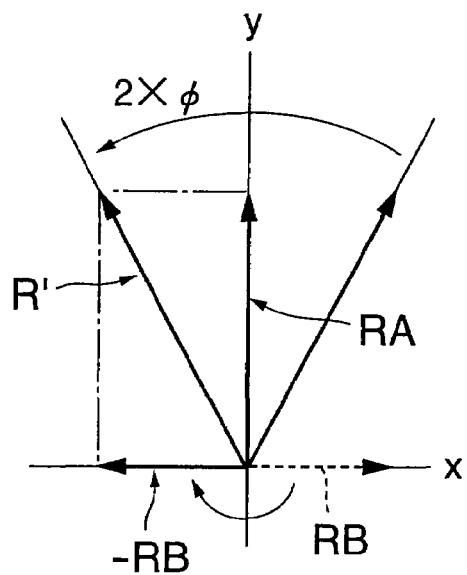
FIG. 43 is a diagram for explaining linear polarization with a ½ wavelength plate after the rotation.

In orthogonal coordinate systems in FIG. 42 and FIG. 43, the y axis is an arbitrary crystal axis of a ½ wavelength plate and the x axis is an orthogonal axis to the crystal axis of the ½ wavelength plate. In FIG. 42, a linearly-polarized optical beam is radiated at the angle $\phi$ with respect to the y axis in the first quadrant. Namely, an optical beam prescribed by a vector R enters the ½ wavelength plate wherein the vector R is inclined by the angle $\phi$ with respect to the polarization plane. The vector R is decomposed to the vector RA with respect to the y axis component and the vector RB with respect to the x axis component.

When this optical beam passes through the ½ wavelength plate, the vector RA does not receive the influence of the ½ wavelength plate. As a result, the vector RA is not transformed persists the length and the direction of RA as shown in FIG. 43. On the other hand, the vector RB receives the influence of the ½ wavelength plate and the phase delay of $\lambda/2$ (=180°) is caused. As a result, as is shown in FIG. 43, the vector RB rotates by 180° from the position before the passage of the optical beam, which is illustrated by the dotted line in FIG. 43 and is transformed into the vector –RB. Accordingly, the polarization plane of the composite vector R' rotates from the position in the first quadrant before the transformation as shown in FIG. 42 to the position, which is rotated by the angle $2\phi$, in the third quadrant after the transformation as shown in FIG. 43. In this fashion, the polarization plane can be adjusted. Also, if the rotation adjusting part is used to rotate the polarization plane of the optical beam by slightly rotating the ½ wavelength plate, it is possible to coincide the optical axis of the liquid crystal element with the polarization plane of the optical beam at higher accuracy.

In a case where a single liquid crystal element is used to deflect a light path, it is difficult to separately deflect an optical beam with respect to the main scanning direction and the subscanning direction because the deflection uses the polarization characteristic of the optical beam. However, the deflection primarily intends to shift positions of beam spots on a scanned surface in the subscanning direction. Thus, it is sufficient that a light path can be deflected in only the subscanning section, that is, in a virtual section orthogonal to the optical beam. For instance, as is shown in FIG. 39, the ½ wavelength plates 122a and 122b are positioned orthogonally to the optical beams 121a and 121b, and the liquid crystal element is positioned so that the optical beam can be shifted in the subscanning direction on the scanned surface. In this example, since the light path is deflected in the subscanning section only in the subscanning direction, it is possible to virtually adjust the positions of the optical beams only in the subscanning direction on the scanned surface. As a result, it is possible to eliminate some problems caused by misalignment in the subscanning direction.

In the example shown in FIG. 39, a semiconductor laser array in which a plurality of illuminant points are arranged in an array form may be used to emit optical beams instead of the semiconductor lasers 111a and 111b. When a semiconductor laser array having n illuminant points is used as an illuminant, it is possible to easily implement a multi-beam scanning by using n times as many optical beams as a single beam semiconductor laser. In this case, it is possible to easily improve the speed of image forming and the image density without increasing rotational speed of a polygon motor for rotating a polygon mirror as a deflector. In this fashion, since it is unnecessary to increase the rotational speed of the polygon motor, it is possible to reduce some environmental load such as large electricity consumption, heat generation and noise.

In the case where a semiconductor laser array is used as an illuminant of an optical scanning apparatus, there is a probability that the array pitch of the illuminant points of the semiconductor laser array does not coincide with a desired array pitch of beam spots on a scanned surface. Even in the case, it is possible to use the semiconductor laser array to obtain the desired array pitch of beam spots on the scanned surface as mentioned later. In order to obtain the desired array pitch, the semiconductor laser array is inclined in the optical axis direction of an optical beam emitted from the semiconductor laser array. In other word, the array direction of the illuminant points is inclined in the subscanning direction.

Figure 44:
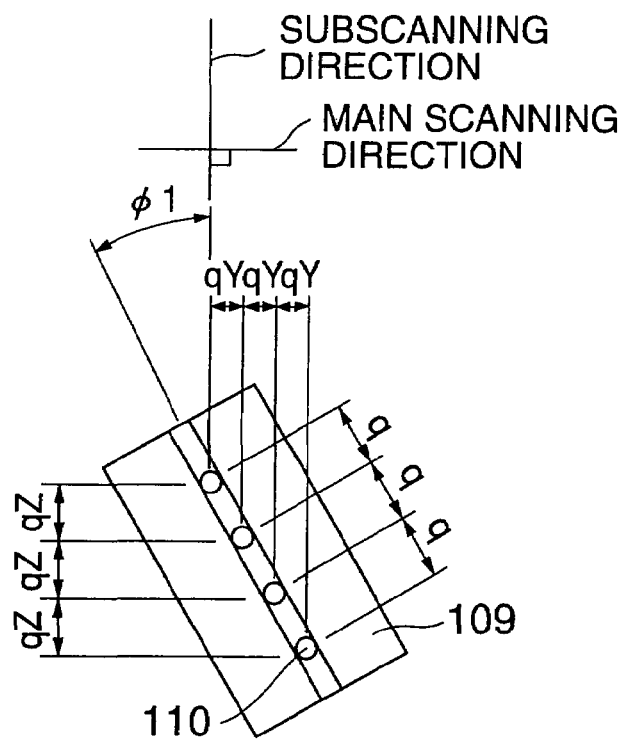
FIG. 44 is a front view of illuminant points of a semiconductor laser array.

FIG. 44 is a front view of a semiconductor laser array having an array of illuminant points. As is shown in FIG. 44, for instance, it is supposed that four illuminant points 10 of a semiconductor laser array 9 are aligned in a line at an equal pitch. Here, the pitch between adjacent illuminant points is q in length. The alignment direction of the four illuminant points 10 is inclined by the angle $\phi$ with respect to the subscanning direction and is mounted to the body part of the optical scanning apparatus. In other word, the four illuminant points 10 is inclined in the optical axis direction of the optical beams emitted from the semiconductor laser array.

In this case, the pitch qZ between the illuminant points with respect to the main scanning direction satisfies the following formula;

$$qZ = q \times \cos(\phi 1).$$

Furthermore, the pitch qY between the illuminant points with respect to the subscanning direction satisfies the following formula;

$$qY = q \times \sin(\phi 1).$$

Figure 45:
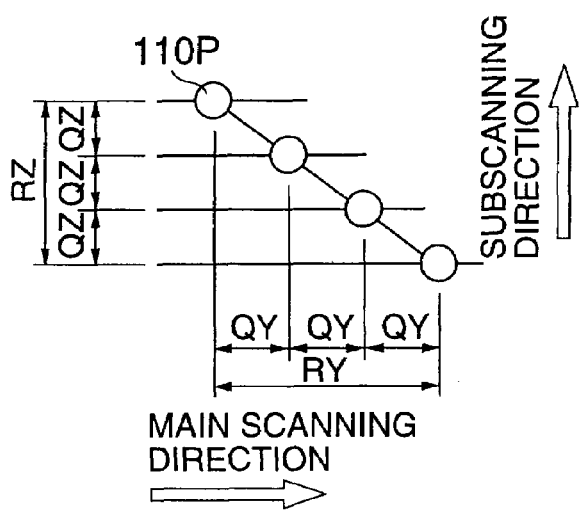
FIG. 45 is an enlarged view of alignment of beam spots on a surface to be scanned.

Then, a subscanning magnification and a main scanning magnification of the optical scanning system with which the semiconductor laser 9 is combined are designated by the notations mZ and mY, respectively. FIG. 45 shows alignment of the beam spots radiated on the scanned surface. The pitch QZ between adjacent beam spots 10P with respect to the main scanning direction satisfies the following formula;

$$QZ = qz \times mz = q \times \cos(\phi 1) \times mz.$$

The pitch QY between adjacent beam spots 10P with respect to the subscanning direction satisfies the following formula;

$$QY = qY \times mY = q \times \sin(\phi 1) \times mY.$$

In this fashion, it is possible to set the pitch QZ by using the inclination angle $\phi 1$ of the semiconductor laser array 9 in accordance with the subscanning magnification mZ of the optical scanning system for the semiconductor laser array 9.

According to this embodiment, it is possible to obtain a desired beam pitch by inclining the semiconductor laser array regardless of the magnification of the optical scanning system.

Even if a semiconductor laser or a semiconductor laser array is inclined in the optical axis direction as mentioned above, the polarization plane of an optical beam does not necessarily coincide with the optical axis of a liquid crystal element. However, in this case, a ½ wavelength plate and others can be used to rotate the polarization plane of the optical beam.

Here, a beam spot magnification RZ with respect to the subscanning direction satisfies the following formula;

$$RZ = (n-1)QZ = (n-1) \times q \times \cos(\phi 1) \times mz.$$

A beam spot magnification RY with respect to the main scanning direction satisfies the following formula;

$$RY = (n-1)QY = (n-1) \times q \times \sin(\phi 1) \times mY.$$

Figure 46:
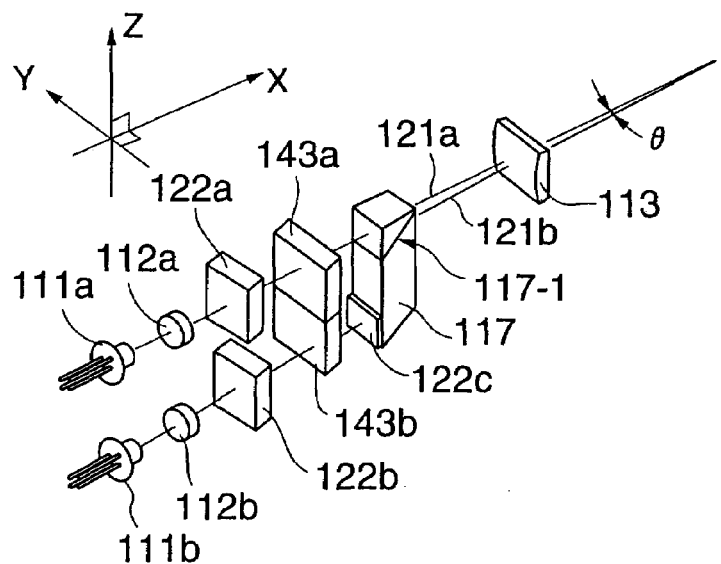
FIG. 46 is a perspective view of an illuminant part and an optical system of another optical scanning apparatus according to the present invention.
Figure 47:
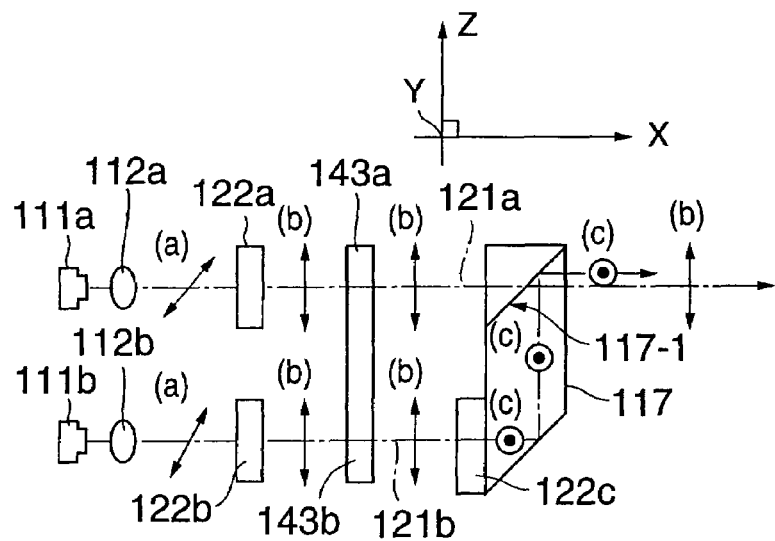
FIG. 47 is a diagram for explaining beam synthesis by a beam synthesizing prism.

FIG. 46 is a perspective view of an optical scanning apparatus according to another embodiment. FIG. 47 is a diagram illustrating the structure the optical scanning apparatus according to the embodiment. In FIG. 46 and FIG. 47, the optical scanning apparatus differs from the optical scanning apparatus shown in FIG. 39 in the optical system in the upper stream side of the polygon mirror 114. Namely, the optical scanning apparatus shown in FIG. 46 and FIG. 47 uses PBS (Polarization Beam Slitter) of a beam synthesizing prism as a beam synthesizing part to synthesize al least two optical beams emitted from two semiconductor lasers. The optical beams from the optical system scan a scanned surface via the polygon mirror 114.

In the optical scanning apparatus shown in FIG. 39, two optical beams cross with each other around a deflecting reflection surface of the polygon mirror 114 on a main scanning section, that is, a virtual plane parallel with a plane orthogonal to the rotation axis Q-Q. In this configuration, it is possible to reduce differences of some optical characteristics. Furthermore, in order to maintain satisfactory optical charac-teristics, that is, to decrease the difference between the two optical beams, it is preferable to make the cross angle θ between the two optical beams smaller. However, since two pairs of the semiconductor laser 111*a* and the coupling lens 112*a* and the semiconductor laser 111*b* and the coupling lens 112*b* are aligned in parallel with respect to the main scanning direction, it is necessary to set the angle θ as more than a predetermined value.

Also, in the optical scanning apparatus shown in FIG. 46 and FIG. 47, the two pairs of the semiconductor lasers 111*a* and 111*b* and the coupling lenses 112*a* and 112*b* are misaligned in the subscanning direction unlike the optical scanning apparatus in FIG. 39. Subsequently, the ½ wavelength plates 122*a* and 122*b* and the liquid crystal elements 143*a* and 143*b* are also misaligned in the subscanning direction.

In this case, since the semiconductor lasers 111*a* and 111*b* and the coupling lenses 112*a* and 112*b* do not interfere with each other, it is possible to make the angle θ smaller substantially to 0°

Here, it is necessary to synthesize the two optical beams misaligned with respect to the subscanning direction. A beam synthesizing prism 117 including a PBS surface 117-1 serves as a synthesizing part. FIG. 47 shows the structure of the optical system in FIG. 46 with respect to a subscanning section. In FIG. 47, a P polarization component of an optical beam is allowed to transmit the PBS surface 117-1, and an S polarization component is reflected by an optical film on the PBS surface 117-1.

In FIG. 47, the optical axis of the liquid crystal element 143*a* directs the Z direction, that is, the subscanning direction, and a light path is deflected in a subscanning section. In this configuration, a position of an optical beam can be shifted in only the subscanning direction on a scanned surface.

In a case where a polarization plane, that is, active layers of a laser chip, of the semiconductor lasers 111*a* and 111*b* are inclined in the optical axis, it is possible to coincide the optical axis of the liquid crystal element 143 with the inclined polarization plane of the optical beams by rotating the ½ wavelength plate 122*a* and 122*b*. Also, if necessary, the rotation adjusting part may be used.

After the optical beam 121*a* from the semiconductor laser 111*a* transmits the liquid crystal element 143*a*, the optical beam 121*a* enters the beam synthesizing prism 117. In the PBS surface 117-1 of the beam synthesizing prism 117, the optical beam 121*a* transmits the PBS surface because the optical beam 121*a* is P-polarized toward the PBS surface 117-1. Then, the optical beam 121*a* is radiated from the beam synthesizing prism 117.

On the other hand, after the optical beam 121*b* from the semiconductor laser 111*b* transmits the liquid crystal element 143*b*, the polarization plane of the optical beam 121*b* is rotated by the angle 90° through another ½ wavelength plate 122*c* that serves as the light rotating part. The optical beam 121*b* is reflected on the PBS surface 117-1 of the beam synthesizing prism 117 because the optical beam 121*b* is S-polarized toward the PBS surface 117-1. Then, the reflected optical beam 121*b* is radiated from the beam synthesizing prism 117.

A supplemental description will be given, with reference to FIG. 48, of the beam synthesis by rotating the above polarization plane. In the orthogonal coordinate system shown in FIG. 48, the arrow (a) indicates oscillation of an optical beam under a case where the optical beam oscillates on a plane defined by the original point of the coordinate system and the intermediate direction between the Z direction and the Y direction. The arrow (b) indicates oscillation of an optical beam under a case where the optical beam oscillates on a plane defined by the original point of the coordinate system and the Z direction. The arrow (c) indicates oscillation of an optical beam under a case where the optical beam oscillates on a plane defined by the original point of the coordinate system and the Y direction.

Figure 48:
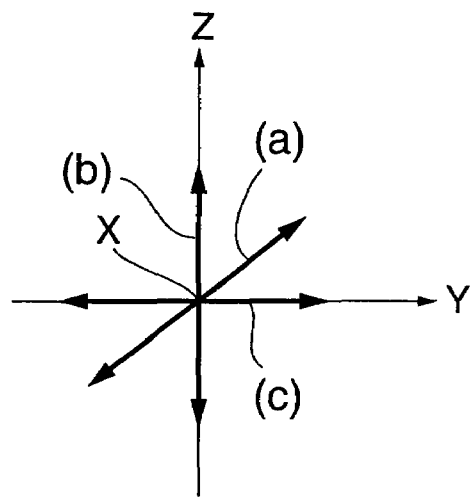
FIG. 48 is a diagram for explaining oscillation directions of linear polarization.

Regarding the optical beam 121a, when the optical beam 121a emits from the coupling lens 112a, the optical beam 121a oscillates in the direction indicated by the arrow (a) in FIG. 48. Then, when the optical beam 121a emits from the ½ wavelength plate 122a, the optical beam 121a oscillates in the oscillation direction indicated by the arrow (b) in FIG. 48. Also, when the optical beam 121a emits from the liquid crystal element 143a and the beam synthesizing prism 117, the optical beam 121a persists the oscillation direction (b). Thus, only the optical beam oscillating in the direction (b) is allowed to transmit the PBS surface 117-1.

On the other hand, regarding the optical beam 121b, when the optical beam 121b emits from the coupling lens 112b, the optical beam 121b oscillates in the direction indicated by the arrow (a) in FIG. 48. When the optical beam 112b emits from the ½ wavelength plate 122a, the optical beam 112b oscillates in the oscillation direction indicated by the arrow (b) in FIG. 48. Then, when the optical beam 112b emits from the ½ wavelength plate 122c, the oscillation direction (b) rotates to the direction indicated by the arrow (c) in FIG. 48. Since only the optical beam oscillating in the direction (b) is allowed to transmit the PBS surface 117-1, the optical beam 112b from the ½ wavelength plate 122c is reflected and then is synthesized with the optical beam 121a.

Figure 49:
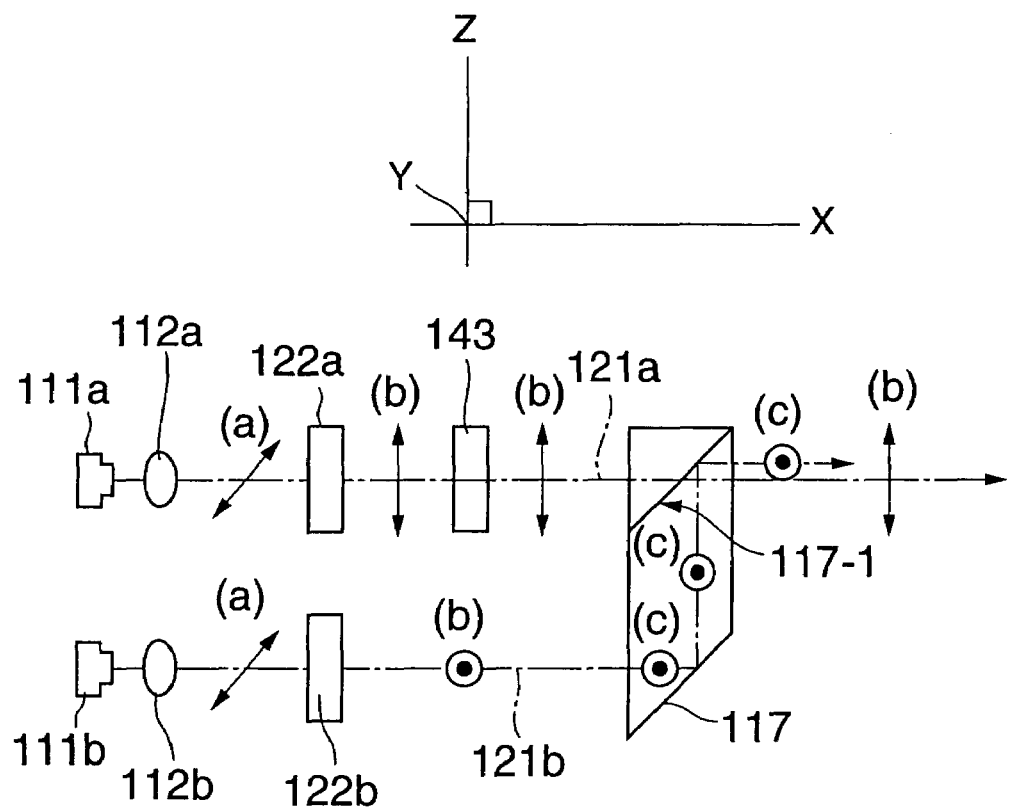
FIG. 49 is a diagram illustrating an outline of an optical scanning apparatus by using a beam synthesizing prism to synthesize optical beams.

FIG. 49 shows another example of the beam synthesis by the beam synthesizing prism having the PBS surface.

FIG. 49 illustrates an illuminant and an optical system in this example. If the illuminant and the optical system are provided in the upper stream side of the deflector of the optical scanning apparatus shown in FIG. 39, an optical scanning apparatus according to this example is obtained. Also, the optical scanning apparatus according to this example differs from the optical scanning apparatus shown in FIG. 47 in that the former does not have the liquid crystal element 143b and the ½ wavelength plate 122c in the light path of the optical beam 121b and has a liquid crystal element 143 and the ½ wavelength plate 122a in the light path of the optical beam 121a.

In this configuration, the optical beam 121a from the semiconductor laser 111a oscillates in the direction (a). When the optical beam 121a transmits the ½ wavelength plate 122a, the optical beam 121a oscillates in the direction (b) and then transmits the PBS surface 117-1.

On the other hand, the optical beam 121b from the semiconductor laser 111b oscillates in the direction (a). When the optical beam 121b transmits the ½ wavelength plate 122b, the oscillation direction (a) rotates to the direction (c) perpendicular to the sheet of FIG. 49. Here, the inclination of the ½ wavelength plate 122b is set so that the oscillation direction can be properly rotated.

Since only the optical beam oscillating in the direction (b) is allowed to transmit the PBS surface 117-1, the optical beam 112b from the ½ wavelength plate 122b is reflected and then is synthesized with the optical beam 112a. In this example, a beam position of the optical beam 121b is adjusted relatively to the optical beam 121a. The beam position is adjusted by changing the refractive index of the liquid crystal element 143 through control of the driving voltage thereto.

Figure 50:
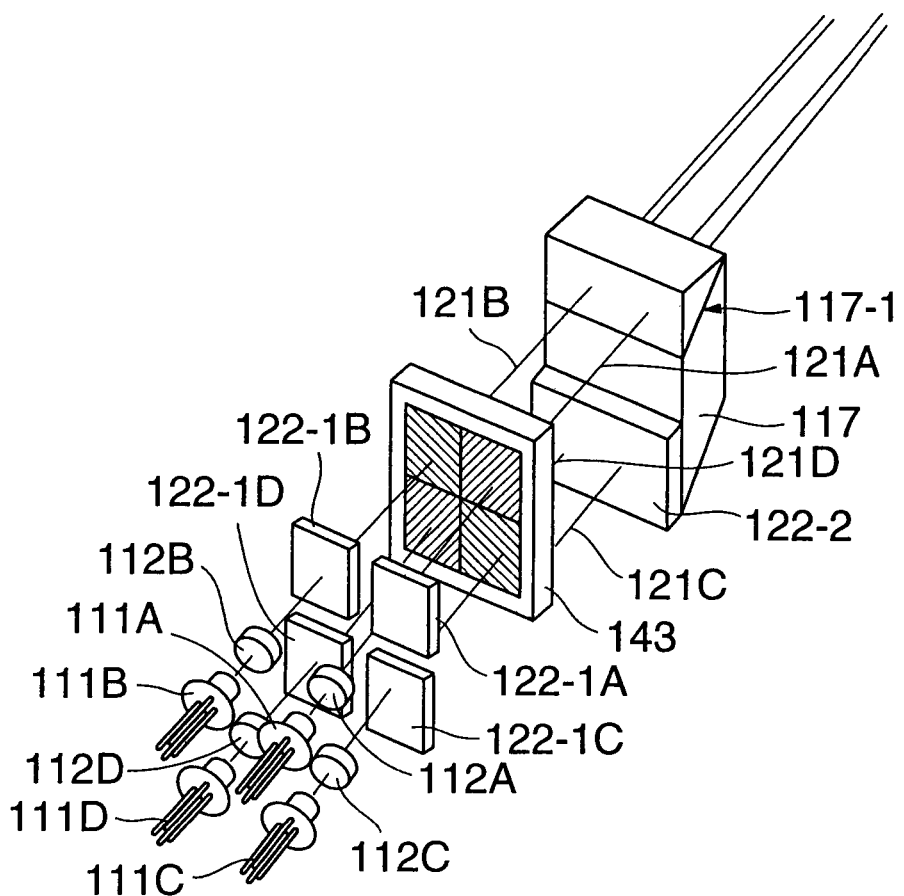
FIG. 50 is a diagram illustrating an outline of a 4-beam scanning apparatus by using a beam synthesizing prism to synthesize optical beams.

FIG. 50 shows the structure of an illuminant and an optical system of a 4-beam scanning apparatus to which the above-mentioned illuminants and the optical systems provided in FIG. 47 and FIG. 49, that is, the illuminants and the optical systems for synthesizing optical beams by using ½ wavelength plates and PBS surfaces, are applied. The 4-beam scanning apparatus is formed by mounting the illuminant and the optical system shown in FIG. 50 to the upper stream side of the deflector of the optical scanning apparatus shown in FIG. 39. In FIG. 50, optical beams 121A through 121D from semiconductor lasers 111A through 111D are coupled by coupling lenses 112A through 112D, respectively. Then, individually positioned ½ wavelength plates 122-1A through 122-1D serves as a first light rotating part to rotate light paths of the optical beams 121A through 121D so that the light paths can coincide with the optical axis of the liquid crystal element 143.

Among the four optical beams 121A through 121D whose light paths have been deflected according to necessity, the polarization planes of the optical beams 121C and 121D are rotated by the angle 90° by a ½ wavelength plate 122-2 as a second light rotating part.

Accordingly, the polarization planes of the optical beams 121A and 121B are orthogonal to those of the optical beams 121C and 121D. If the PBS surface 117-1 corresponding to each pair of the polarization planes is provided to the beam synthesizing prism 117, the beam synthesizing prism synthesizes the optical beam 121A with the optical beam 121B and the optical beam 121C with the optical beam 121D, respectively. Here, the optical beams 121A and 121B correspond to the optical beam 121a in FIG. 47 because the optical beams 121A and 121B can transmit the beam synthesizing prism 117. On the other hand, the optical beams 121C and 121D correspond to the optical beam 121b in FIG. 47 because the optical beams 121C and 121D are reflected on the PBS surface 117-1.

As mentioned above, if the liquid crystal element 143 is provided so that optical beams from the liquid crystal element 143 can be S-polarized or P-polarized toward the PBS surface of a beam synthesizing prism, that is, the optical beams from the liquid crystal element 143 can be reflected or transmitted toward the PBS surface, it is possible to deflect light paths of the optical beams and synthesize the optical beams without the installation of an additional light rotating part such as ½ wavelength plates between the liquid crystal element 143 and the beam synthesizing part. Furthermore, since the beam synthesizing part uses polarization to synthesize the optical beams, it is possible to reduce energy loss in the beam synthesizing part.

Figure 51:
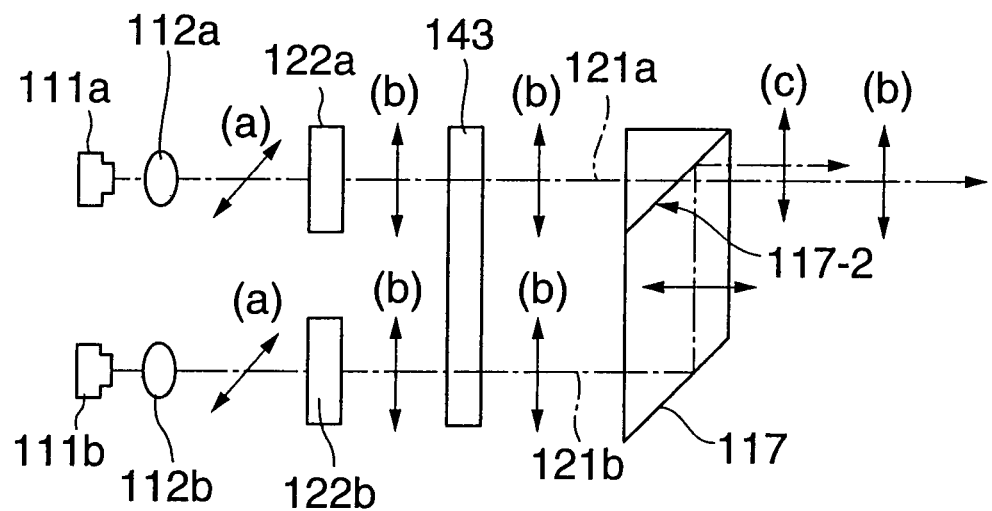
FIG. 51 is a diagram illustrating an outline of an optical scanning apparatus by using a half-mirror to synthesize optical beams.

FIG. 51 shows the structure of an illuminant and an optical system of another optical scanning apparatus in which a half-mirror 117-2 is used as the beam synthesizing prism 117 instead of a PBS surface. The optical scanning apparatus is formed by mounting the illuminant and the optical system shown in FIG. 51 to the upper stream of the deflector of the optical scanning apparatus shown in FIG. 39.

In FIG. 51, an optical beam 121a from a semiconductor laser 111a is coupled by a coupling lens 112a. After that, the polarization plane of the optical beam 121a is rotated to the direction (b) by a ½ wavelength plate 122a so that the optical axis of the liquid crystal element can coincide with the polarization plane. Then, the optical beam 121a transmits the half-mirror 117-2 of the beam synthesizing prism 117 and travels to the scanned surface.

An optical beam 121b from a semiconductor laser 111b is coupled by a coupling lens 112b. After that, the polarization plane of the optical beam 121b is rotated to the direction (b) by a ½ wavelength plate 122a so that the optical axis of the liquid crystal element 143 can coincide with the polarization plane. Then, the optical beam 121b transmits the half-mirror 117-2 of the beam synthesizing prism 117 and travels to the scanned surface.

In this fashion, when a beam synthesizing prism uses a half-mirror to synthesize optical beams, it is possible to synthesize the optical beams without dependency on the directions of the polarization planes of the optical beams unlike the PBS surface. As a result, since it is unnecessary to provide a light rotating part such as a ½ wavelength plate between the liquid crystal element 143 and the beam synthesizing prism 117, it is possible to reduce the fabrication cost due to the smaller number of parts.

A description will now be given of an image forming apparatus to which the above-mentioned optical scanning apparatuses are applied. In the following, such an image forming apparatus has a photoreceptor forming an electrostatic latent image, a developing part developing the electrostatic latent image with a toner, and a transferring part transferring the developed toner image on a recording paper.

Figure 52:
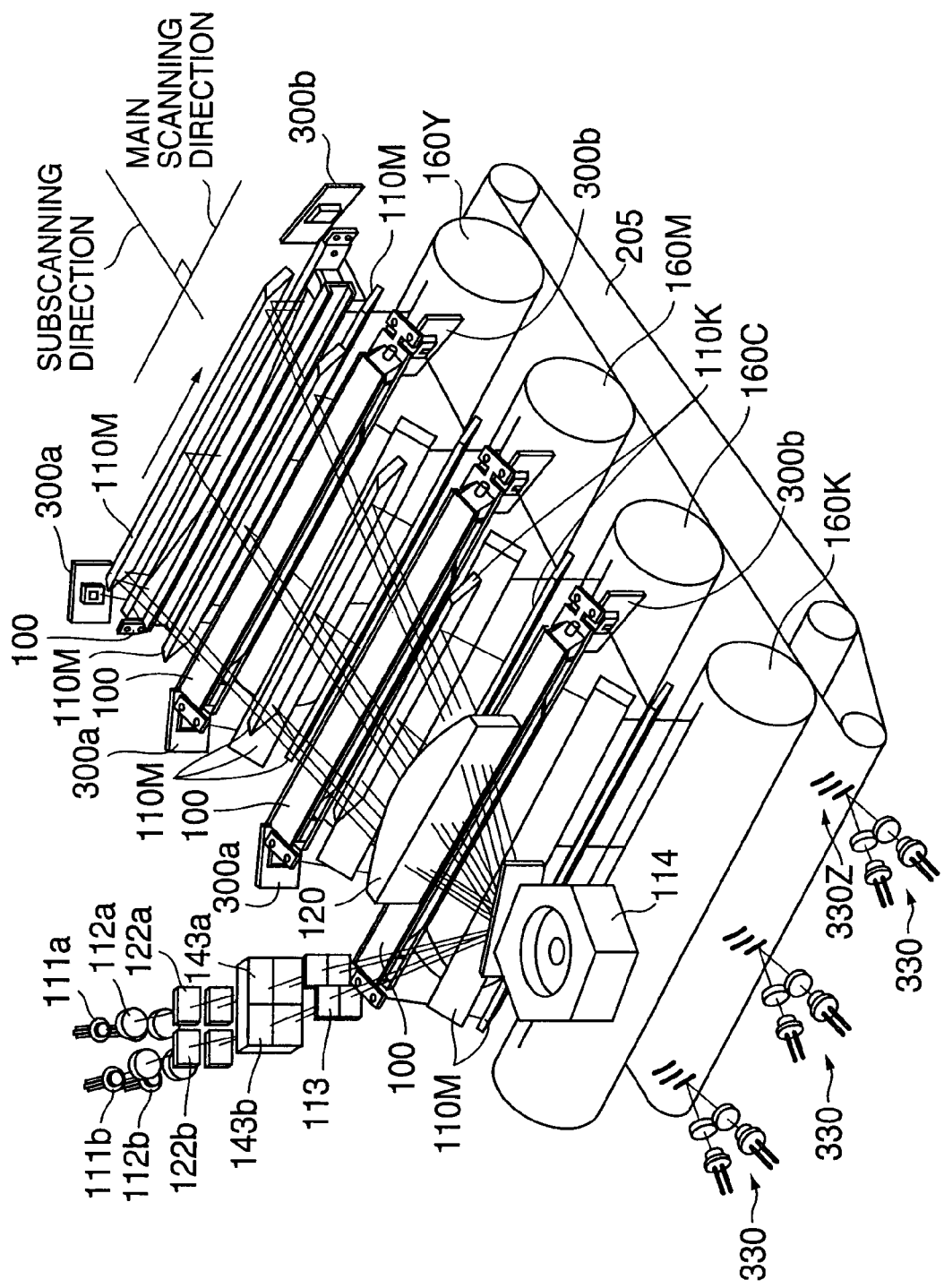
FIG. 52 is a perspective view of a tandem type color image forming apparatus.

In FIG. 52, process members such as a charging part, a developing part, a transferring part, a cleaning part for cleaning remaining toner and others are provided around the photoreceptor in accordance with an electrophotographic process. In addition, a sheet feeding part for accommodating and supplying recording sheets such as a paper feed cassette is provided beneath a transferring belt 205. The transferring part is provided at the position opposite to the photoreceptor in the interior of the transferring belt 205. A belt charging part is provided in the upper side of the transferring belt 205 with respect to the rotational direction indicated by the arrow in FIG. 52. A belt separate charger, a fixing part and the like are provided in the lower side of the transferring belt 205. These parts are formed of conventional parts and are not illustrated in FIG. 52 for simplicity.

In the image forming apparatus according to this embodiment, the optical scanning apparatus thereof exposes a plurality of photoreceptors in order to form an electrostatic latent image. Then, individual visible images on the photoreceptors are transferred and superposed on the transferring belt 205. After that, all the superposed images on the transferring belt 205 are transferred on one recording sheet so as to obtain a color image.

In order to form a color difference detecting toner image, an optical beam is radiated for every predetermined sheets. When color difference detecting toner images 330Z are provided at three portions of the transferring belt 205 as shown in FIG. 52, color difference detecting sensors 330 detect a color difference of a toner image.

The optical scanning apparatus, which is formed as a unit, is located in the upper area of photoreceptors 160Y, 160M, 160C and 160K. As is shown in FIG. 52, an illuminant and an optical system of the optical scanning apparatus are formed by double-layering the structure comprising semiconductor lasers 111a and 111b, coupling lenses 112a and 112b, ½ wavelength plates 122a and 122b, and liquid crystal elements 143a and 143b of the illuminant and the optical system as shown in FIG. 39. In this double layered configuration, the optical scanning apparatus uses four optical beams to scan the surface to be scanned.

These four optical beams scan the four photoreceptors 160Y, 160M, 160C and 160K that are aligned in a line and are rotationally driven. When an image is formed, the latent image is formed by the four optical beams as distinct color toner images by using the four color photoreceptors 160Y, 160M, 160C and 160K. After the latent image is developed, these color toner images are superposed and transferred on the transferring belt 205 as an intermediate transferred image.

Optical beams from the optical scanning apparatus travel toward the polygon mirror 114. The optical beams are deflected by the polygon mirror 114 and then scan the photoreceptors 160Y, 160M, 160C and 160K via the fθ lens 120, a folded mirror 110M, troidal lens 100.

The longitudinal directions of the photoreceptors 160Y, 160M, 160C and 160K correspond to the main scanning direction, and beam spot position detecting parts 300a and 300b are faced on each other corresponding to both outer sides of effective image areas of the individual photoreceptors. The beam spot position detecting part 300a serves to detect a write starting position, and the beam spot position detecting part 300b serves to detect a write end position.

The image forming apparatus has a charging part uniformly charging the photoreceptors 160Y, 160M, 160C and 160K before optical beams scan the photoreceptors, a developing part developing electrostatic latent images formed on the photoreceptors with toners through the scanning by the optical beams, a transferring part transferring the developed toner images on a recording paper, and a fixing part fixing unfixed toner images on the recording paper, around the photoreceptors. In the image forming apparatus, it is possible to use a beam spot position adjusting function such as a liquid crystal element and a light rotating part of the optical scanning apparatus to adjust beam spot positions on the photoreceptors according to necessity. As a result, it is possible to output a high-quality image. Furthermore, since the optical scanning apparatus according to this embodiment is formed of a multi-beam scanning apparatus capable of simultaneously scanning the photoreceptors by using a plurality of optical beams, it is possible to enhance the printing speed and the image density.

When the above-mentioned image forming apparatus is used in practice as a printer, a digital copier or the like, there is a probability that the beam spot pitch adjusted before shipment is disturbed due to vibration caused when the image forming apparatus is carried out of a factory and constraints on the installation location. Also, in a customer side, there is a probability that the scanning pitch is disturbed over time due to high temperature therein caused by installation environments and by usage conditions such as pressrun.

In this case, if a detection system for detecting the scanning pitch is provided in the image forming apparatus, it is possible to detect the disorder of the scanning pitch resulting from the above-mentioned causes and correct the inappropriate scanning pitch by driving the liquid crystal element based on detection results. Thus, it is possible to provide the image forming apparatus that can produce a high-quality image by correcting the inappropriate scanning pitch caused by time passage and temperature fluctuation.

When the above-mentioned image forming apparatus is used as a multifunction machine serving as both a printer and a copier, it may be necessary to switch the pixel density between a printer mode and a copy mode. For instance, if the pixel density is switched between 600 dpi in the printer mode and 400 dpi in the copier mode, it is possible to offer the pixel density suitable to each mode.

Also, the image forming apparatus may be required to enable an operator to switch the pixel density to levels suitable to operator's purposes, for instance, between high-quality mode (1200 dpi) and high-speed mode (600 dpi) by providing pixel density switch instruction from an operation panel of the image forming apparatus. In this case, it is possible to easily switch the pixel density by controlling the driving voltage to the liquid crystal element in the optical scanning apparatus of the image forming apparatus. For instance, in the above-mentioned multifunction machine, when an operator switches between the printer mode and the copier mode, it is possible to switch the pixel density. In such an image forming apparatus having two image forming functions whose pixel densities are different from each other, when an operator switches between the two image forming functions, it is possible to switch the pixel density.

The above-mentioned image forming apparatus intends to produce a high-quality image by adjusting the beam pitch of a plurality of optical beams for scanning a photoreceptor drum. In addition, the image forming apparatus shown in FIG. 52 can correct the scanning line position of a plurality of photoreceptors, that is, a color difference among a plurality of image stations.

In a conventional image forming apparatus, the movement of the transferring belt 205 is not synchronized with the phase of the rotation of the polygon mirror 114. Accordingly, there is a probability that the image write start position with respect to the subscanning direction is delayed by at most one scanning line among the image stations.

In the image forming apparatus shown in FIG. 52, the liquid crystal elements 143a and 143b are provided in light paths of optical beams traveling to the photoreceptor drums 160K, 160C, 160M, 160Y. Each of the liquid crystal elements 143a and 143b may have a plurality of effective areas therein or may have one effective area for each laser beam.

In this configuration, when the liquid crystal elements 143a and 143b adjust beam spot positions on the photoreceptor drums, it is possible to correct differences of write start positions among image stations, that is, relative beam spot positions among the photoreceptors, caused by the asynchronism between the movement of the transferring belt 205 and the phase of the rotation of the polygon mirror 114.

For instance, if the color difference detecting sensor 330 on the transferring belt 205 detects a color difference detection toner image 330Z for detecting color differences among the image stations and the liquid crystal elements 143a and 143b are driven in accordance with detection results related to the degree of color differences among the image stations, it is possible to correct the write start timing, that is, the write start position, with respect to the subscanning direction.

Here, it is unnecessary to provide the liquid crystal element in all light paths of the optical beams. A color, for instance, black, is determined as the reference color, and the other colors, in this case, cyan, magenta and yellow, are positioned relatively to the reference color. Therefore, it is sufficient to provide liquid crystal elements in only light paths of the other colors.

In this fashion, it is possible to suppress color differences of the color difference detection toner image 330Z on the transferring belt 205 and obtain a high-quality color image. As mentioned above, the tandem type color image forming apparatus according to this embodiment can produce a high-quality color image by coinciding among the write start positions of the image stations with respect to the paper feeding direction.

A description will be given of another example of the above-mentioned image forming apparatus shown in FIG. 52. In this example, the photoreceptors 160Y, 160M, 160C and 160K and the transferring belt 205 are twice as long as those in FIG. 52 with respect to the main scanning direction, and the optical scanning apparatus, the optical system and the polygon mirror are additionally provided in the main scanning direction.

Figure 53:
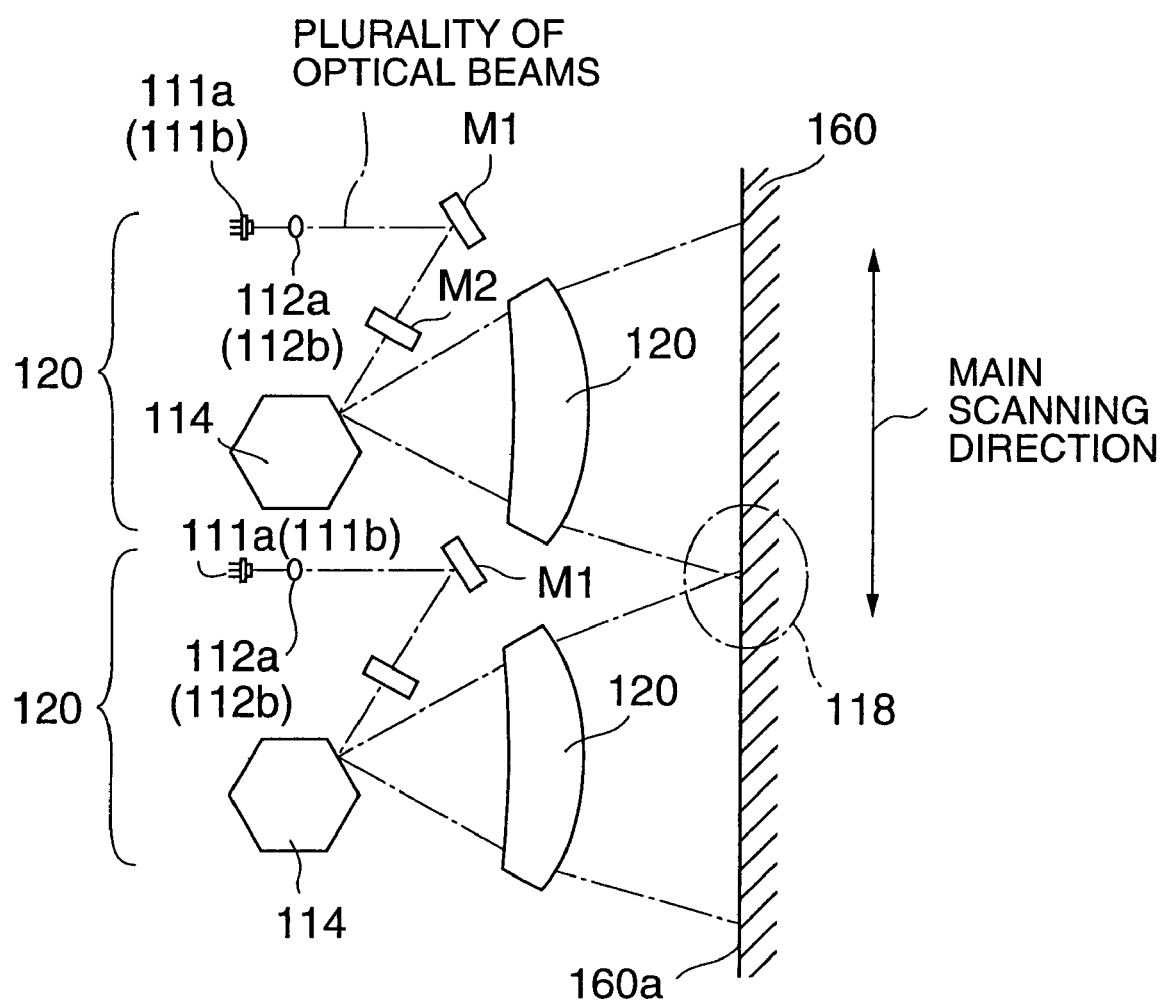
FIG. 53 is a diagram roughly illustrating the structure of an image forming apparatus in which a plurality of optical scanning apparatuses are aligned in line with respect to the main scanning direction.

FIG. 53 shows the structure of the image forming apparatus according to this example. Two optical scanning apparatuses 120 and 120' having identical structures are aligned toward one of the photoreceptors, for instance, the photoreceptor 160, in a line with respect to the main scanning direction. In this configuration, it is possible to correct misalignment around a connecting area of the two beam spot positions.

The optical scanning apparatus 120 has semiconductor lasers 111a and 111b, coupling lenses 112a and 112b, folded mirrors M1 and M2, a polygon mirror 114, a troidal lens 120 and others. Here, when these optical systems are used, it is possible to scan the photoreceptor 160 with a plurality of optical beams. Here, although the optical scanning apparatus 120 also has a liquid crystal element, a light rotating part and the like, these parts are omitted in FIG. 52 for simplicity. The other optical scanning apparatus 120' has the same structure as the optical scanning apparatus 120.

The optical scanning apparatuses 120 and 120' aligned in a line with respect to the main scanning direction scan a divided effective write breadth. If a liquid crystal element is used to adjust beam spot positions with respect to the subscanning direction, it is possible to correct the misalignment around the connection area 118 in FIG. 52. It is noted that the correction of the beam spot misalignment is related to only the subscanning direction, that is, the scanning line position. According to a division scanning type image forming apparatus using the above-mentioned optical scanning apparatuses, it is possible to coincide among beam spot positions around the connection areas between every two image stations and produce a high-quality image.

In this fashion, when several optical scanning systems are aligned in line, it is possible to extend the effective write breadth. Also, if the effective write breadth is unchanged, it is possible to miniaturize an optical element and a deflector in the optical scanning apparatus. Furthermore, it is possible to decrease an amount of misalignment of beam positions caused by mechanical tolerance and temperature fluctuation and reduce wave front aberration. As a result, the image forming apparatus can produce a high-quality image.

The present invention is not limited to the specifically disclosed embodiments, and variations and modifications may be made without departing from the scope of the present invention.

The present application is based on Japanese priority applications No. 2002-072656 filed Mar. 15, 2002, No. 2002-256704 filed Sep. 2, 2002 and No. 2002-348581 filed Nov. 29, 2002, the entire contents of which are hereby incorporated by reference.

The invention claimed is:

1. An optical scanning apparatus for scanning a surface to be scanned in a main scanning direction by simultaneously using a plurality of optical spots formed of a plurality of optical beams emitted from an illuminant via a polygon mirror, comprising:

a light path deflecting part deflecting a light path of at least one of said optical beams, wherein said light path deflecting part is provided in light paths of said optical beams between the illuminant and the polygon mirror, wherein said light path deflecting part includes a plurality of liquid crystal deflecting elements formed of a liquid crystal element being separately controllable by an electronic signal to deflect the light path of said optical beams.

2. The optical scanning apparatus as claimed in claim 1, wherein said liquid crystal deflecting element is capable of deflecting optical beams separately in two directions orthogonal to each other.

3. The optical scanning apparatus as claimed in claim 1, wherein said liquid crystal deflecting element has a plurality of effective areas each of which is separately modulated.

4. The optical scanning apparatus as claimed in claim 3, wherein said liquid crystal deflecting element has a plurality of effective areas where said liquid crystal deflecting elements are capable of deflecting different optical beams separately, and the plurality of effective areas are two-dimensionally arranged.

5. The optical scanning apparatus as claimed in claim 1, wherein said illuminant comprises at least a semiconductor laser serving as an illuminant point and a coupling lens coupling laser light emitted from said semiconductor laser.

6. The optical scanning apparatus as claimed in claim 1, further comprising a beam synthesizing part synthesizing optical beams emitted from a plurality of illuminants.

7. The optical scanning apparatus as claimed in claim 6, wherein each of said illuminants comprises at least a semiconductor laser serving as an illuminant point and a coupling lens coupling laser light emitted from said semiconductor laser, and said semiconductor and said coupling lens are arranged so as to correct a synthesis error by said beam synthesizing part.

8. The optical scanning apparatus as claimed in claim 1, further comprising an aperture member having an aperture for shaping an optical beam wherein said aperture member is provided in an upper stream side, that is, in an illuminant side, of the liquid crystal deflecting element in the light paths of the optical beams.

9. The optical scanning apparatus as claimed in claim 8, wherein said aperture for shaping an optical beam is formed on one of an entrance surface and an exit surface of said liquid crystal deflecting element.

10. The optical scanning apparatus as claimed in claim 1, further comprising a detecting part detecting positions of said optical spots for simultaneously scanning said surface to be scanned and a driving part driving/controlling a liquid crystal deflecting element based on a detection result of said detecting part so as to adjust a position of at least one of said optical spots.

11. An illuminant apparatus for emitting a plurality of optical beams and serving an optical scanning apparatus for scanning a surface to be scanned in a main scanning direction by simultaneously using a plurality of optical spots formed of said optical beams emitted from a plurality of illuminants therein, wherein said optical scanning apparatus comprises a light path deflecting part, which is provided in light paths of said optical beams, deflecting a light path of at least one of said optical beams, said light path deflecting part configured to adjust a deflecting direction of the optical beams, comprising:
  a plurality of light path deflecting parts separately provided for deflecting one of said optical beams corresponding to each of said light path deflecting parts to enable a light path emitted from one illuminant to be deflected separately from the other illuminants,
  wherein said light path deflecting parts are integrally provided.

12. The illuminant apparatus as claimed in claim 11, wherein said light path deflecting part is formed of a transmission type optical element and is provided in light paths of the optical beams.

13. The illuminant apparatus as claimed in claim 11, wherein said light path deflecting part is formed of a reflection type optical element and is provided in light paths of the optical beams.

14. The illuminant apparatus as claimed in claim 12, wherein said transmission type optical element is driven by a driving part using a piezoelectric element.

15. The illuminant apparatus as claimed in claim 13, wherein said reflection type optical element is driven by a driving part using a piezoelectric element.

16. The illuminant apparatus as claimed in claim 12, wherein said transmission type optical element is driven by a driving part using one of a pulse motor capable of rotating by a predetermined angle in accordance with an input pulse signal and a pulse motor capable of moving straight by a predetermined distance in accordance with an input pulse signal.

17. The illuminant apparatus as claimed in claim 13, wherein said reflection type optical element is driven by a driving part using one of a pulse motor capable of rotating by a predetermined angle in accordance with an input pulse signal and a pulse motor capable of moving straight by a predetermined distance in accordance with an input pulse signal.

18. The illuminant apparatus as claimed in claim 11, wherein said light path defecting part is formed of a liquid crystal element driven by an electronic signal.

19. The illuminant apparatus as claimed in claim 11, further comprising a first illuminant part integrally having a plurality of illuminants aligned in line in the main scanning direction, a second illuminant part integrally having a plurality of illuminants aligned in line in the main scanning direction, and a beam synthesizing part making optical beams emitted from said first illuminant part and said second illuminant part close to each other and emitting said close optical beams.

20. The illuminant apparatus as claimed in claim 11, wherein said illuminants comprises a plurality of semiconductor lasers and a plurality of coupling lenses corresponding to said semiconductor lasers.

21. The illuminant apparatus as claimed in claim 11, further comprising an aperture member having an aperture for shaping an optical beam, wherein said aperture member is provided in an upper steam side, that is, an illuminant side, of said light path deflecting parts.

22. An optical scanning apparatus for scanning a surface to be scanned in a main scanning direction by simultaneously using a plurality of optical spots formed of a plurality of optical beams emitted from a plurality of illuminants in an illuminant apparatus wherein said illuminant apparatus comprises a plurality of light path deflecting parts, which is integrally provided therein, separately provided for deflecting one of said optical beams corresponding to each of said light path deflecting parts to enable a light path emitted from one illuminant to be deflected separately from the other illuminants, comprising:
  a detecting part detecting positions of said optical spots for simultaneously scanning said surface to be scanned; and
  a driving part driving/controlling said light path deflecting parts based on a detection result of said detecting part so as to adjust a position of at least one of said optical spots;
  a deflector deflecting said optical beams emitted from said illuminants; and
  a scanning type imaging system scanning said surface to be scanned by using said optical spots formed of said optical beams deflected,
  wherein said optical beams from said illuminants enter said deflector non-parallel with each other with respect to the main scanning section.

23. The optical scanning apparatus as claimed in claim 22, further comprising a deflector deflecting said optical beams emitted from said illuminants and a scanning type imaging system scanning said surface to be scanned by using said optical spots formed of said optical beams deflected, wherein said optical beams from said illuminants enter said deflector non-parallel with each other with respect to the main scanning section.

24. The optical scanning apparatus as claimed in claim 1, further comprising an illuminant apparatus formed of a plurality of illuminants, a beam synthesizing part synthesizing a plurality of optical beams emitted from said illuminant apparatus, a deflector deflecting said optical beams synthesized by said beam synthesizing part, and a scanning part leading said optical beams deflected by said deflector on said surface to be scanned, wherein said light path deflecting part is provided between said illuminants and said beam synthesizing part so as to adjust positions of said optical beams on said surface to be scanned.

25. The optical scanning apparatus as claimed in claim 24, wherein said light path deflecting part is formed of a transmission type optical element that is eccentrically provided.

26. The optical scanning apparatus as claimed in claim 24, wherein said light path deflecting part is formed of a liquid crystal element controllable by an electronic signal.

27. The optical scanning apparatus as claimed in claim 26, further comprising a ghost light removing part removing ghost light caused by said liquid crystal element, wherein said ghost light removing part is provided as a slit aperture between said liquid crystal element and said deflector.

28. The optical scanning apparatus as claimed in claim 27, further comprising an aperture shaping an optical beam, wherein said aperture is provided in an upper stream side, that is, an illuminant side, of said light path deflecting part and the following formula is satisfied;

$$L \geq (b+\Delta)/(2 \times \tan \theta),$$

where b is a width of optical beams deflected by said liquid crystal element, $\Delta$ is a width of said slit aperture, L is a distance between said liquid crystal element and said slit aperture, and $2\theta$ is an angle between +1st-order light and −1st-order light of said ghost light caused by said liquid crystal element.

29. The optical scanning apparatus as claimed in claim 24, further comprising an optical housing accommodating parts thereof, wherein said optical housing holds said illuminant apparatus on a side wall thereof and holds said light path deflecting part and said beam synthesizing part on a common holding part therein.

30. An image forming apparatus for forming an image, comprising:
an optical scanning apparatus for scanning a surface to be scanned in a main scanning direction by simultaneously using a plurality of optical spots formed of a plurality of optical beams emitted from an illuminant including a plurality of light path deflecting parts deflecting a light path of at least one of said optical beams, wherein said light path deflecting parts are provided in light paths of said optical beams and enable a light path emitted from one illuminant to be deflected separately from the other illuminants;
a photoreceptor forming an electrostatic latent image scanned by said optical scanning apparatus;
a developing apparatus developing said electrostatic latent image as a toner image with a toner; and
a transferring apparatus transferring said toner image in a recording medium.

31. An image forming apparatus for forming an image, comprising:
an optical scanning apparatus for scanning a surface to be scanned in a main scanning direction by simultaneously using a plurality of optical spots formed of a plurality of optical beams emitted from a plurality of illuminants in an illuminant apparatus wherein said illuminant apparatus comprises a plurality of light path deflecting parts, which are integrally provided therein, deflecting one of said optical beams corresponding to each of said light path deflecting parts separately to enable a light path emitted from one illuminant to be deflected separately from the other illuminants, comprising a detecting part detecting positions for simultaneously scanning said surface to be scanned and a driving part driving/controlling said light path deflecting parts based on a detection result of said detecting part so as to adjust a position of at least one of said optical spots;
a photoreceptor forming an electrostatic latent image scanned by said optical scanning apparatus;
a developing apparatus developing said electrostatic latent image as a toner image with a toner; and
a transferring apparatus transferring said toner image in a recording medium.

32. The image forming apparatus as claimed in claim 30, wherein said light path deflecting part is driven/controlled by an operator based on an output image on said recording medium.

33. The image forming apparatus as claimed in claim 30, further comprising a plurality of said photoreceptors serving as a plurality of surfaces to be scanned.

34. The image forming apparatus as claimed in claim 30, further comprising a plurality of said optical scanning apparatuses wherein said optical scanning apparatuses are aligned in line in the main scanning direction for said photoreceptor.

35. The image forming apparatus as claimed in claim 30, wherein said image has variable pixel density.

36. An optical scanning apparatus as claimed in claim 1, further comprising:
a light rotating part rotating a polarization plane of said optical beam in such a way that the polarization plane of said optical beam is parallel with an optical axis of the liquid crystal element.

37. The optical scanning apparatus as claimed in claim 36, wherein said light rotating part is formed of a ½ wavelength plate.

38. The optical scanning apparatus as claimed in claim 37, wherein said ½ wavelength plate is held by a rotation adjusting part and is capable of rotating upon an optical axis.

39. The optical scanning apparatus as claimed in claim 36, wherein a position of said optical spot is adjusted on the surface to be scanned by deflecting a light path of said optical beam in a subscanning section of said liquid crystal element.

40. The optical scanning apparatus as claimed in claim 36, wherein said semiconductor laser is formed of a semiconductor laser array having a plurality of illuminant points.

41. The optical scanning apparatus as claimed in claim 40, wherein said semiconductor laser array is inclined toward an optical axis of said optical beam emitted.

42. The optical scanning apparatus as claimed in claim 39, wherein said surface to be scanned is scanned by an optical beam synthesized from at least two optical beams emitted from at least two semiconductor lasers by using a PBS (Polarization Beam Splitter) surface, and said liquid crystal element is arranged so as to convert an optical beam emitted from said liquid crystal element into one of an S-polarized optical beam or a P-polarized optical beam toward said PBS surface.

43. The optical scanning apparatus as claimed in claim 39, wherein said surface to be scanned is scanned by an optical beam synthesized from at least two optical beams from at least two semiconductor lasers by using a half-mirror.

44. An image forming apparatus for forming an image, comprising:
- an optical scanning apparatus for scanning a surface to be scanned by using an optical spot formed of an optical beam emitted from a semiconductor laser, the optical scanning apparatus comprising a light path deflecting part including a plurality of liquid crystal elements deflecting a light path of said optical beam on said surface to be scanned and a light rotating part rotating a polarization plane of said optical beam in such a way that the polarization plane of said optical beam is in parallel with an optical axis of the liquid crystal element;
- a photoreceptor forming an electrostatic latent image scanned by said optical scanning apparatus;
- a developing part developing said electrostatic latent image as a toner image with a toner; and
- a transferring part transferring said toner image in a recording medium.

45. The image forming apparatus as claimed in claim 44, wherein said optical scanning apparatus scans said photoreceptor by using a plurality of beam spots formed of a plurality of optical beams and is capable of adjusting a scanning line pitch on said photoreceptor.

46. The image forming apparatus as claimed in claim 44, wherein said optical scanning apparatus scans said photoreceptor by using a plurality of optical beams and is capable of switching a pixel density of the image.

47. A tandem type image forming apparatus for forming an image, comprising:
- an optical scanning apparatus for scanning a surface to be scanned by using a beam spot formed of an optical beam emitted from a semiconductor laser, the optical scanning apparatus comprising a plurality of liquid crystal deflecting elements deflecting a light path of said optical beam on said surface to be scanned; and
- a light rotating part rotating a polarization plane of said optical beam in such a way that the polarization plane of said optical beam is in parallel with an optical axis of the liquid crystal element;
- a photoreceptor forming an electrostatic latent image scanned by said optical scanning apparatus;
- a developing part developing said electrostatic latent image as a toner image with a toner; and
- a transferring part transferring said toner image in a recording medium,
- wherein a plurality of said photoreceptors are provided, said optical scanning apparatus scans said photoreceptors with a plurality of optical beams, and misalignment of a write start position between said photoreceptors is corrected.

48. A division scanning type image forming apparatus for forming an image, comprising:
- an optical scanning apparatus for scanning a surface to be scanned by using a beam spot formed of an optical beam emitted from a semiconductor laser, the optical scanning apparatus comprising a plurality of liquid crystal deflecting elements deflecting a light path of said optical beam on said surface to be scanned and a light rotating part rotating a polarization plane of said optical beam;
- a photoreceptor forming an electrostatic latent image scanned by said optical scanning apparatus;
- a developing part developing said electrostatic latent image as a toner image with a toner; and
- a transferring part transferring said toner image in a recording medium,
- wherein a plurality of said optical scanning apparatuses are aligned in line with respect to a main scanning direction for each photoreceptor and misalignment of said beam spot with respect to a main scanning direction around a connection area between scanning beams from said optical scanning apparatuses is corrected.

49. The division scanning type image forming apparatus as claimed in claim 48, wherein said misalignment of the beam spot around a connection area between scanning beams is corrected with respect to a subscanning direction.

50. The illuminant apparatus as claimed in claim 12, wherein the transmission type optical element is driven by a ring ultrasound motor.

51. The illuminant apparatus as claimed in claim 13, wherein the reflection type optical element is driven by a ring ultrasound motor.

52. The illuminant apparatus as claimed in claim 18, wherein the liquid crystal element has a plurality of effective areas where different optical beams are enabled to be individually deflected, and the plurality of effective areas are two dimensionally arranged.

* * * * *